(12) United States Patent
Lam et al.

(10) Patent No.: US 10,024,490 B2
(45) Date of Patent: Jul. 17, 2018

(54) VIDEO WALL MOUNT

(71) Applicant: Peerless Industries, Inc., Aurora, IL (US)

(72) Inventors: Derrik Lam, Chicago, IL (US); Michael A. Graef, Naperville, IL (US); Edward T. Eaton, Eola, IL (US); Steven Coan, Naperville, IL (US); Jay Sipek, Naperville, IL (US); Matthew William Stifal, Portage, IN (US)

(73) Assignee: Peerless Industries, Inc., Aurora, IL (US)

( * ) Notice: Subject to any disclaimer, the term of this patent is extended or adjusted under 35 U.S.C. 154(b) by 0 days.

(21) Appl. No.: 15/307,297

(22) PCT Filed: Apr. 30, 2015

(86) PCT No.: PCT/US2015/028545
§ 371 (c)(1),
(2) Date: Oct. 27, 2016

(87) PCT Pub. No.: WO2015/168422
PCT Pub. Date: Nov. 5, 2015

(65) Prior Publication Data
US 2017/0059087 A1 Mar. 2, 2017

Related U.S. Application Data

(60) Provisional application No. 61/986,649, filed on Apr. 30, 2014.

(51) Int. Cl.
*F16M 13/08* (2006.01)
*F16M 13/02* (2006.01)
(Continued)

(52) U.S. Cl.
CPC .......... *F16M 13/02* (2013.01); *F16M 11/046* (2013.01); *F16M 11/048* (2013.01);
(Continued)

(58) Field of Classification Search
USPC ........ 248/917, 918, 919, 922, 923, 371, 395
See application file for complete search history.

(56) References Cited

U.S. PATENT DOCUMENTS

| 2,005,953 A * | 6/1935 | Nicles ..................... E05D 15/44 292/101 |
| 6,532,147 B1 * | 3/2003 | Christ, Jr. ............. G06F 1/1615 248/917 |

(Continued)

OTHER PUBLICATIONS

International Search Report and Written Opinion issued for PCT/US2015/028545, dated Jul. 22, 2015, 16 pages.

*Primary Examiner* — Alfred Wujciak
(74) *Attorney, Agent, or Firm* — Foley & Lardner LLP

(57) ABSTRACT

A mounting system comprising a surface mount configured to operatively couple to an attachment surface, a movable mount, at least one adjustable arm assembly, at least one device mount, a latch coupled to one of the surface mount and the movable mount, and a catch coupled to the other of the surface mount and the movable mount. Each arm assembly includes at least one arm having a first end operatively coupled to the surface mount and a second end operatively coupled to the movable mount, wherein the second end is movable relative to the first end to move the movable mount relative to the surface mount in a first direction. Each device mount is configured to support a display device and is operatively coupled to the movable mount, such that each device mount is movable in a second direction.

6 Claims, 41 Drawing Sheets

(51) Int. Cl.
*F16M 11/04* (2006.01)
*F16M 11/10* (2006.01)
*F16M 11/20* (2006.01)

(52) U.S. Cl.
CPC ........... *F16M 11/10* (2013.01); *F16M 11/105* (2013.01); *F16M 11/2021* (2013.01); *F16M 11/2092* (2013.01); *F16M 2200/061* (2013.01)

(56) References Cited

U.S. PATENT DOCUMENTS

| | | |
|---|---|---|
| 8,333,355 B2 | 12/2012 | Stifal et al. |
| 8,523,129 B2 | 9/2013 | Stifal et al. |
| 8,905,365 B2 | 12/2014 | Stifal et al. |
| 9,395,043 B2 | 7/2016 | Stifal et al. |
| 2007/0007409 A1 | 1/2007 | Huang |
| 2008/0054147 A1 | 3/2008 | Muday et al. |
| 2010/0187385 A1 | 7/2010 | Luijben et al. |
| 2010/0309615 A1 | 12/2010 | Grey et al. |
| 2011/0163052 A1 | 7/2011 | Kim et al. |
| 2011/0198460 A1 | 8/2011 | Stifal et al. |
| 2013/0146727 A1* | 6/2013 | Oh .................. F16M 13/02 248/277.1 |
| 2013/0206943 A1 | 8/2013 | Molter |
| 2017/0105529 A1* | 4/2017 | Kozlowski, Jr. ....... F16M 13/02 |

* cited by examiner

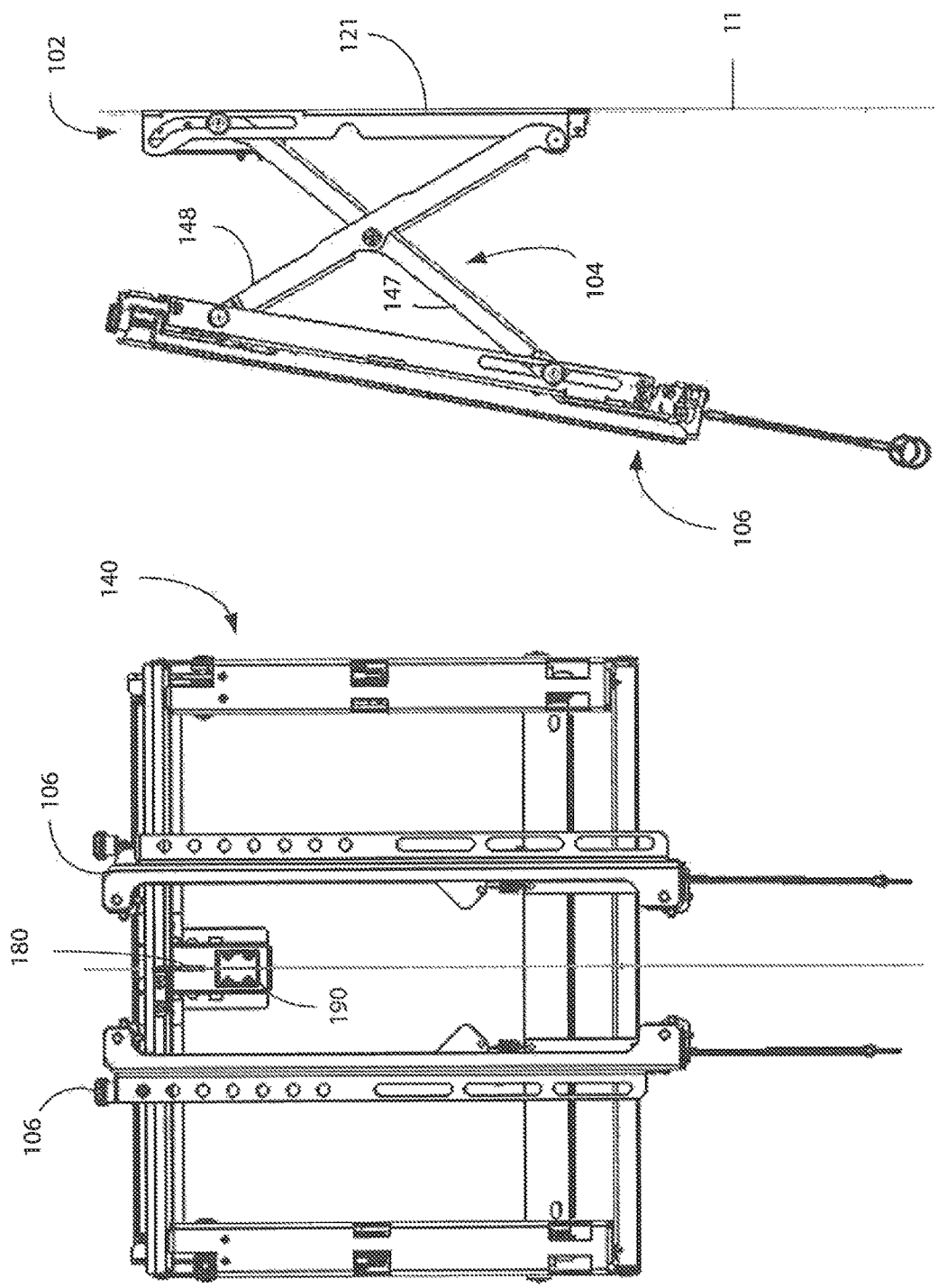

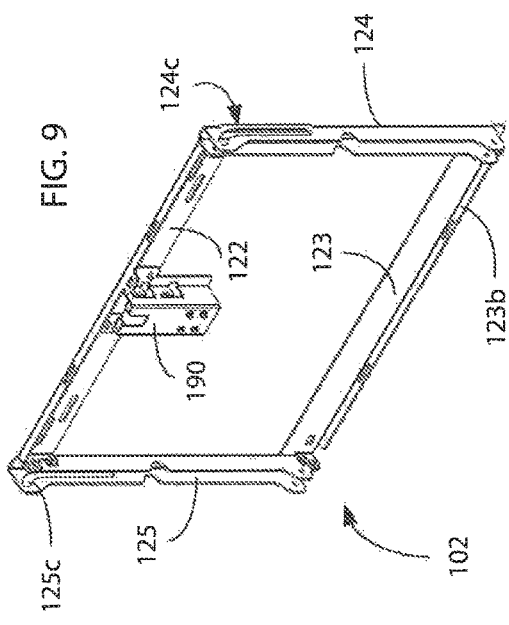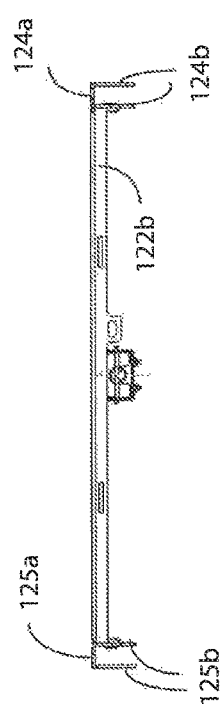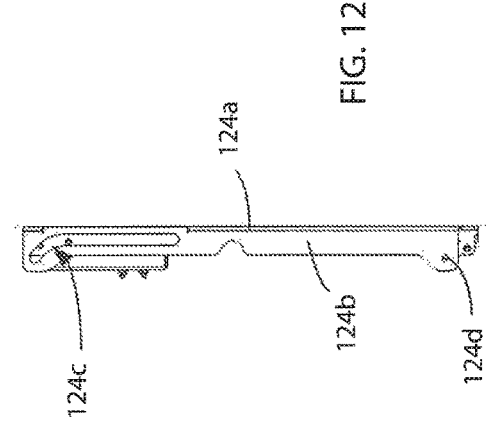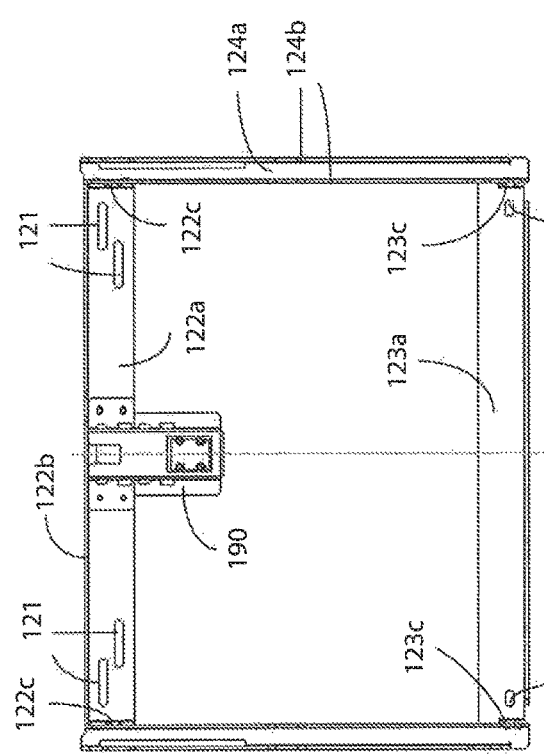

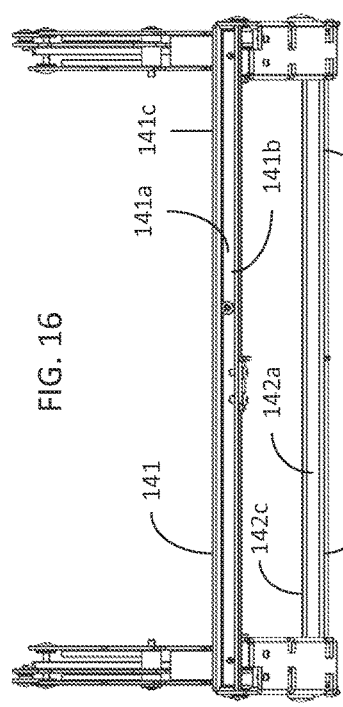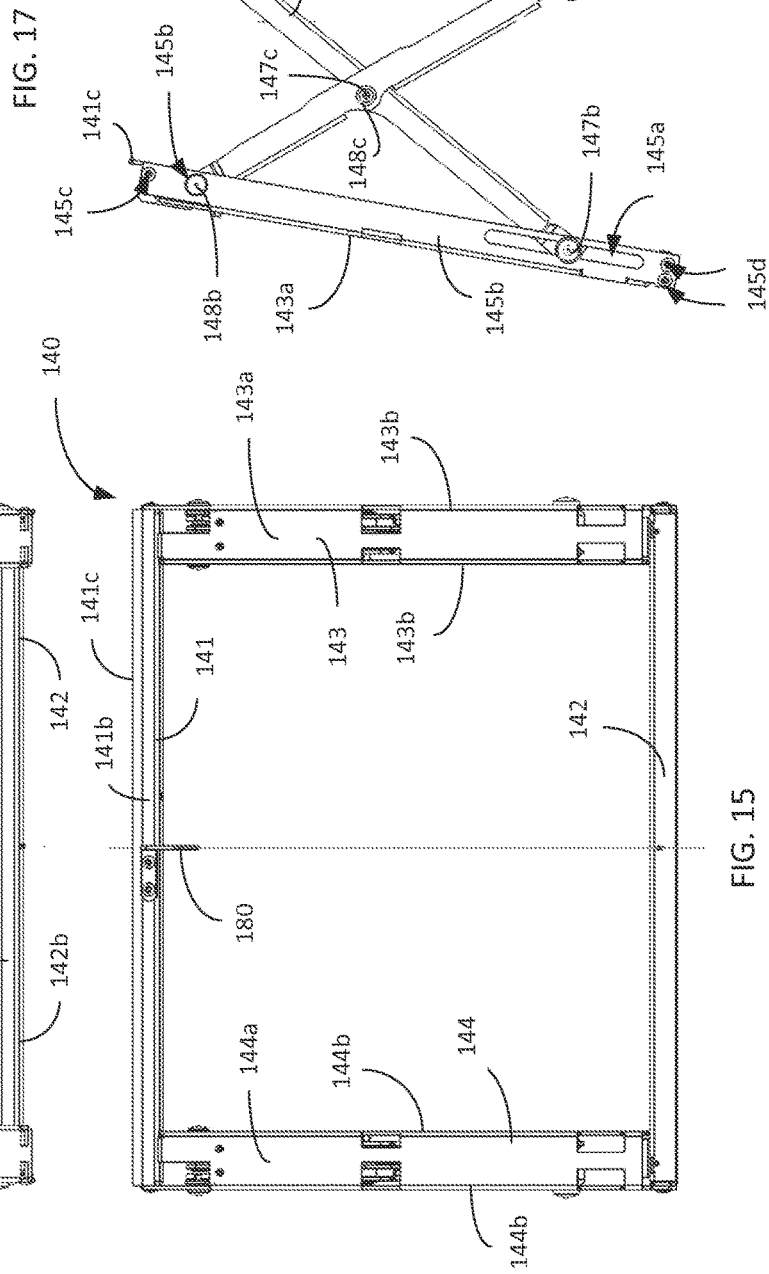

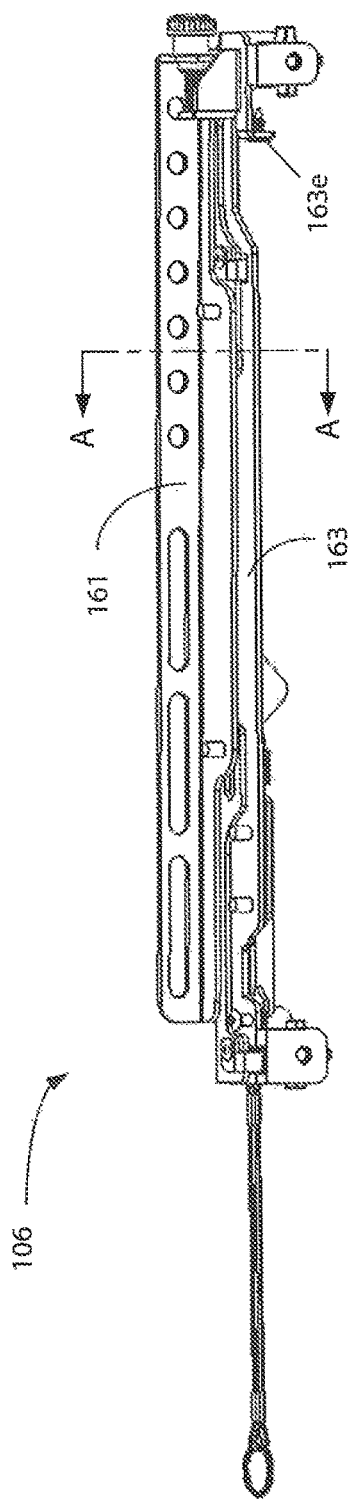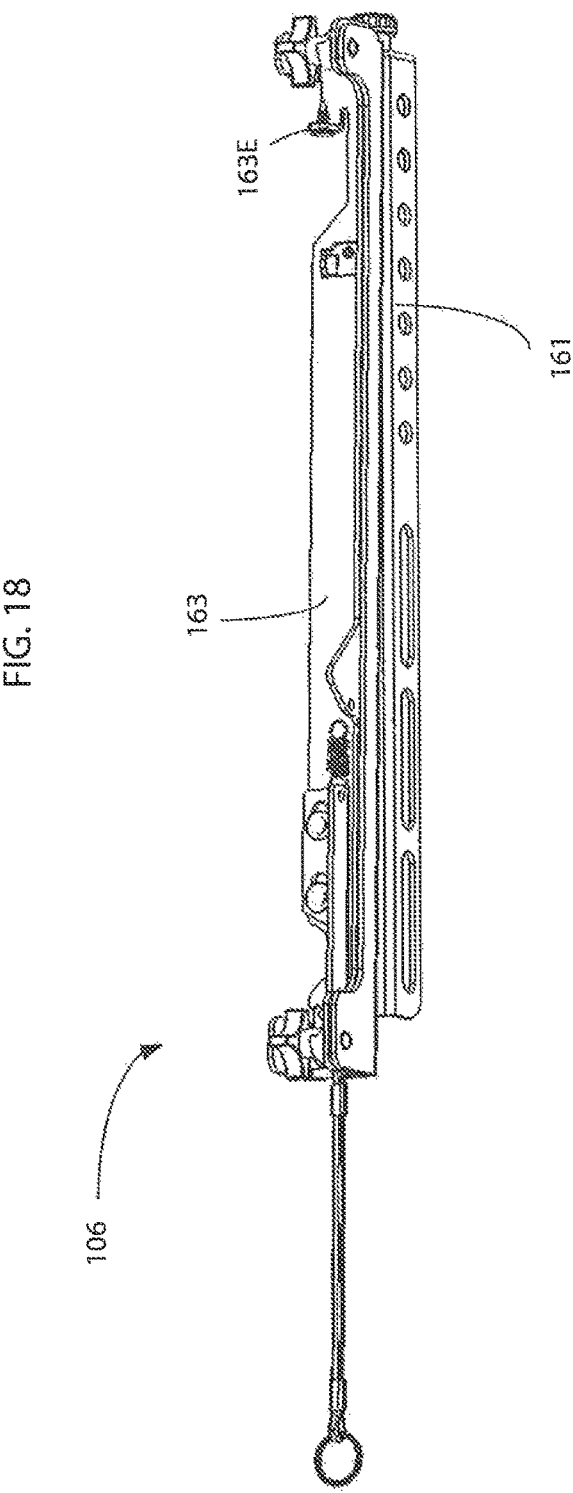
FIG. 18
FIG. 19

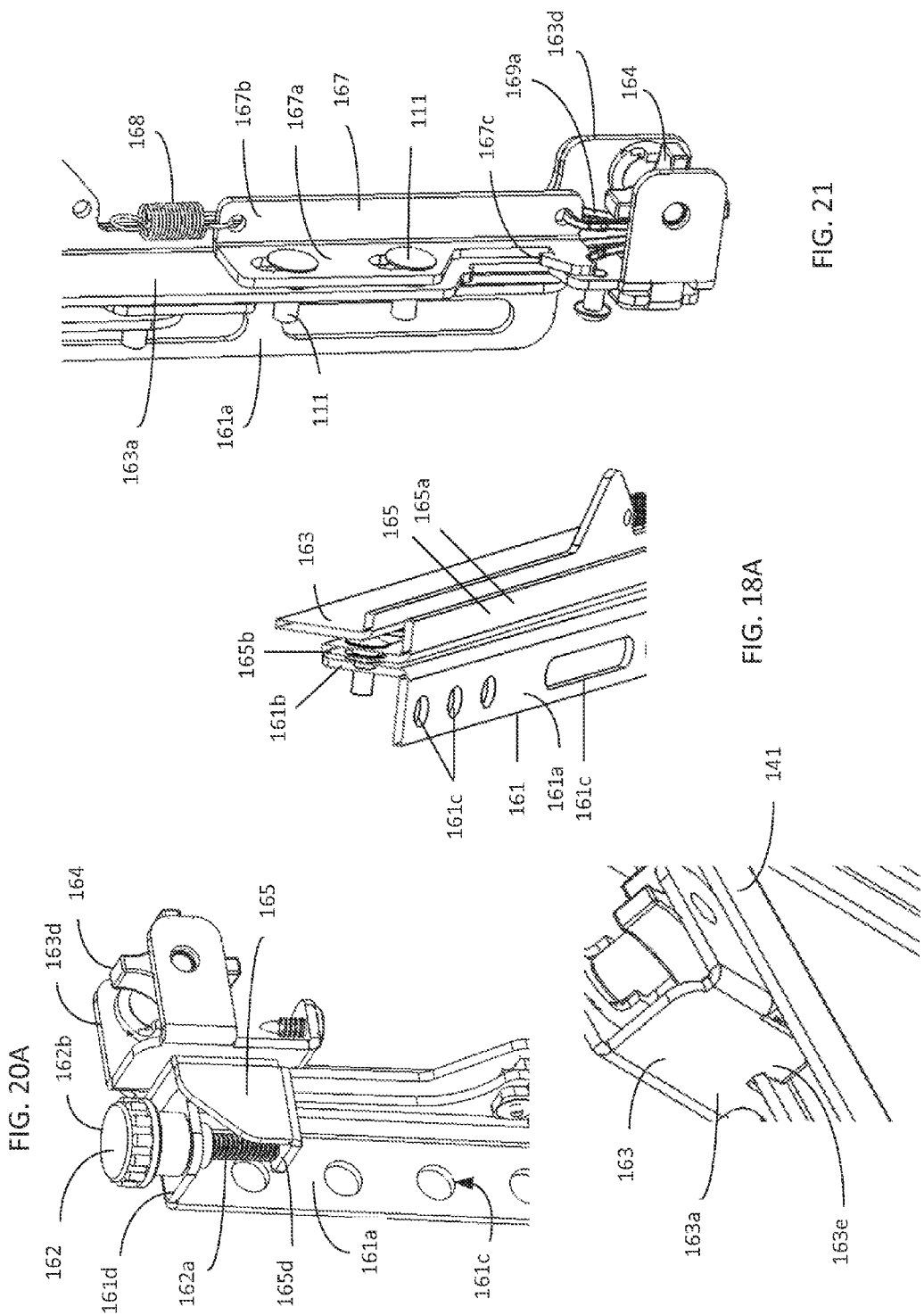

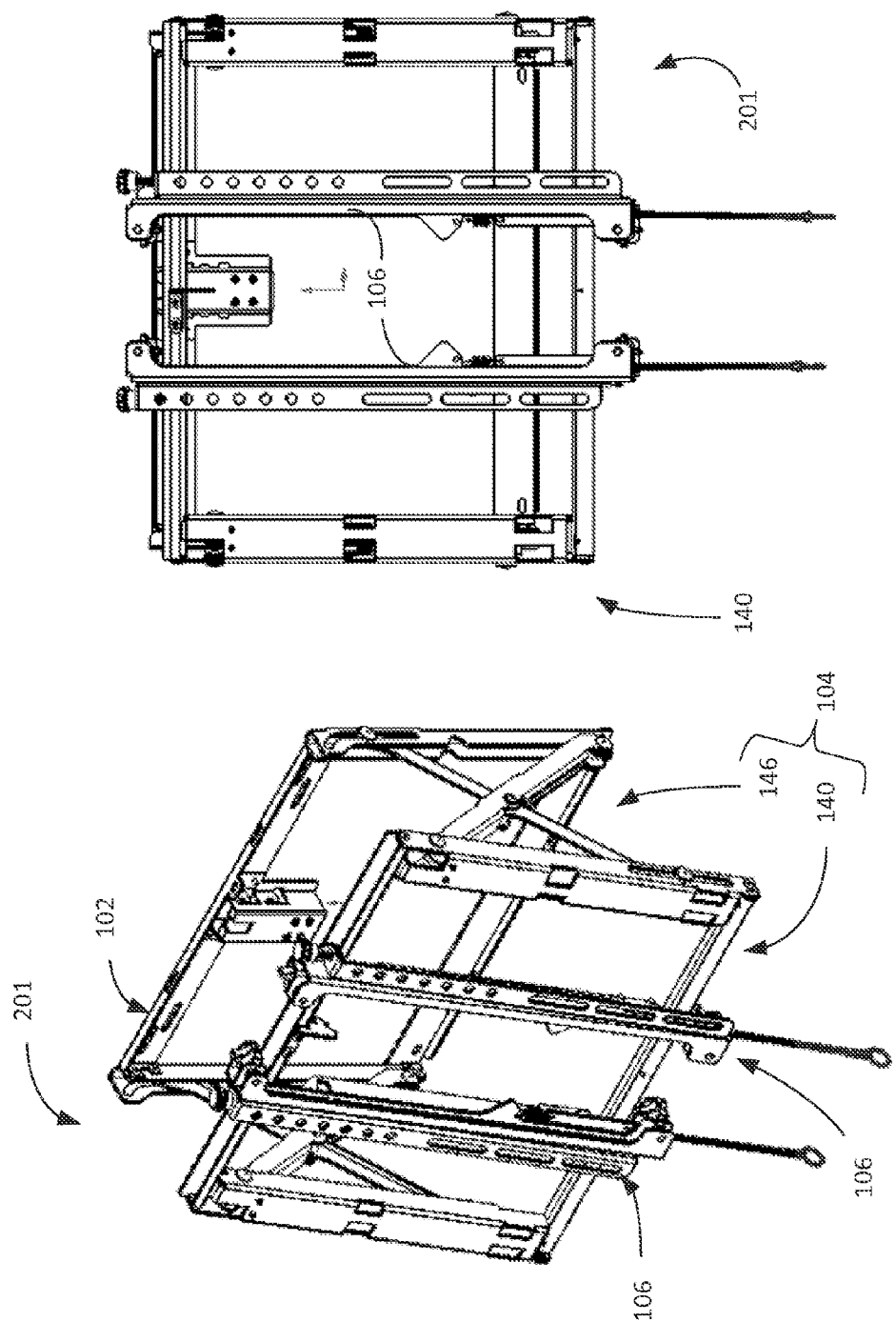

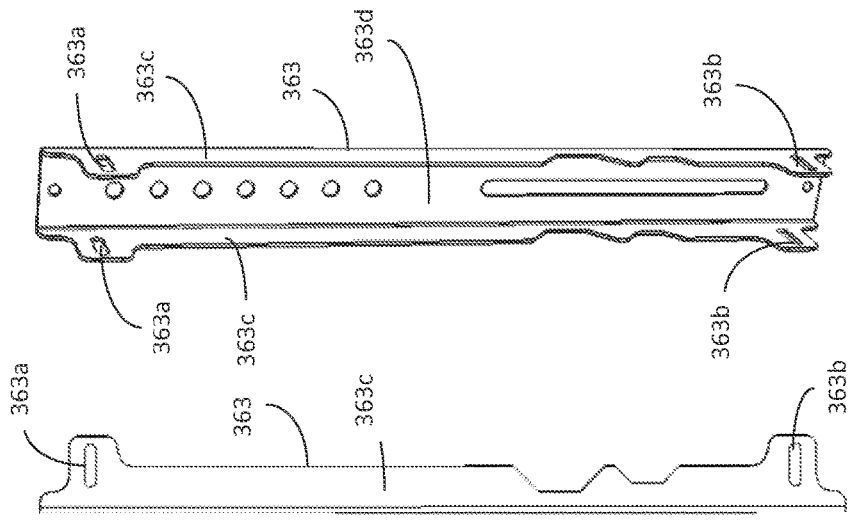
FIG. 45
FIG. 46
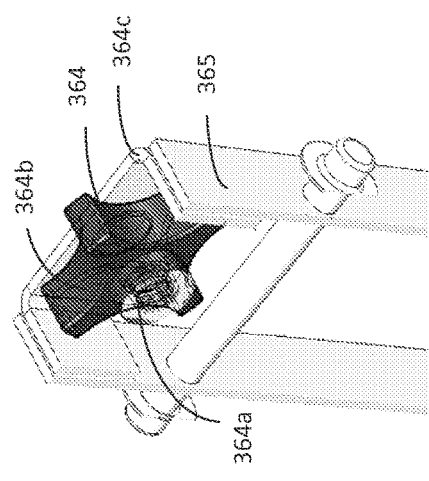
FIG. 43
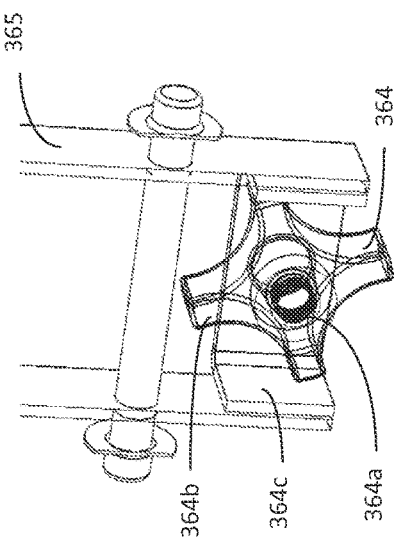
FIG. 44

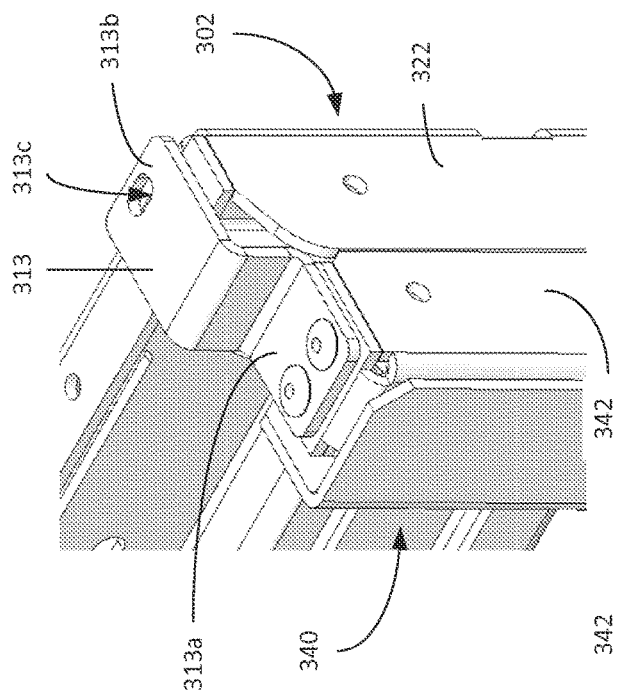
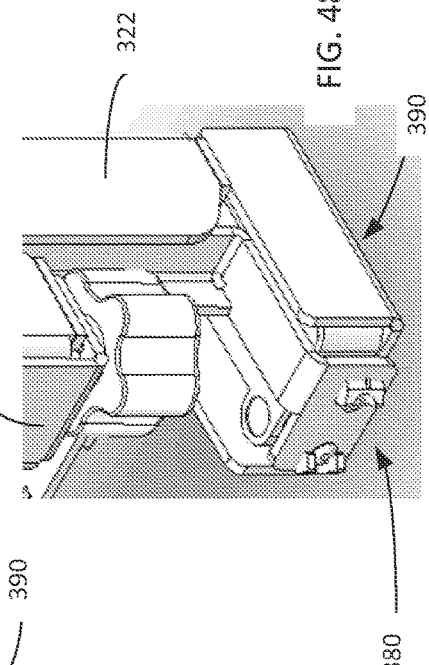
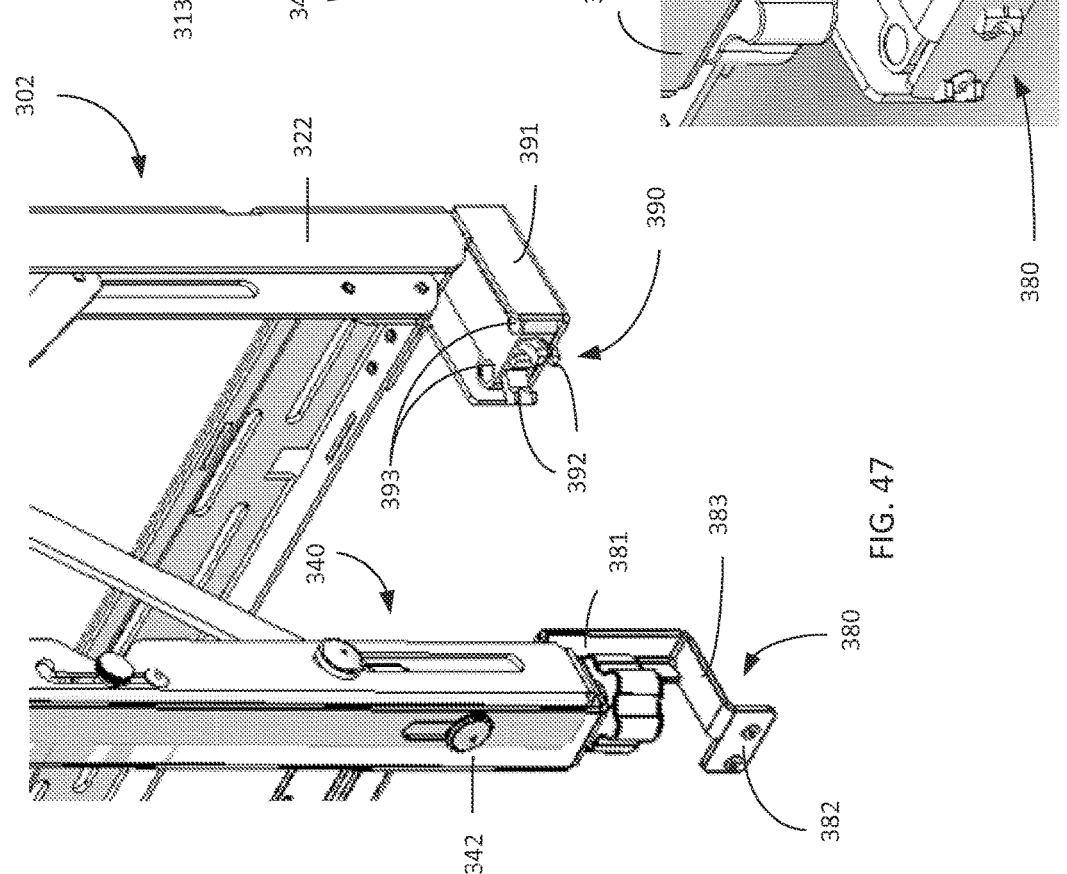

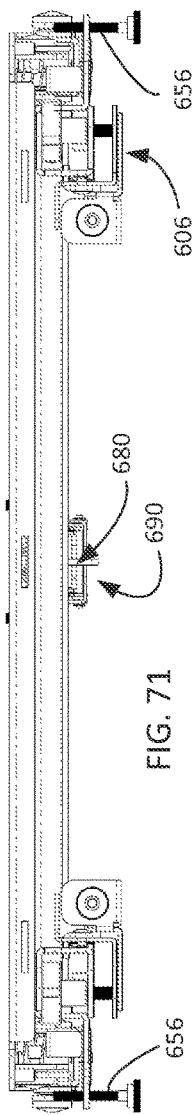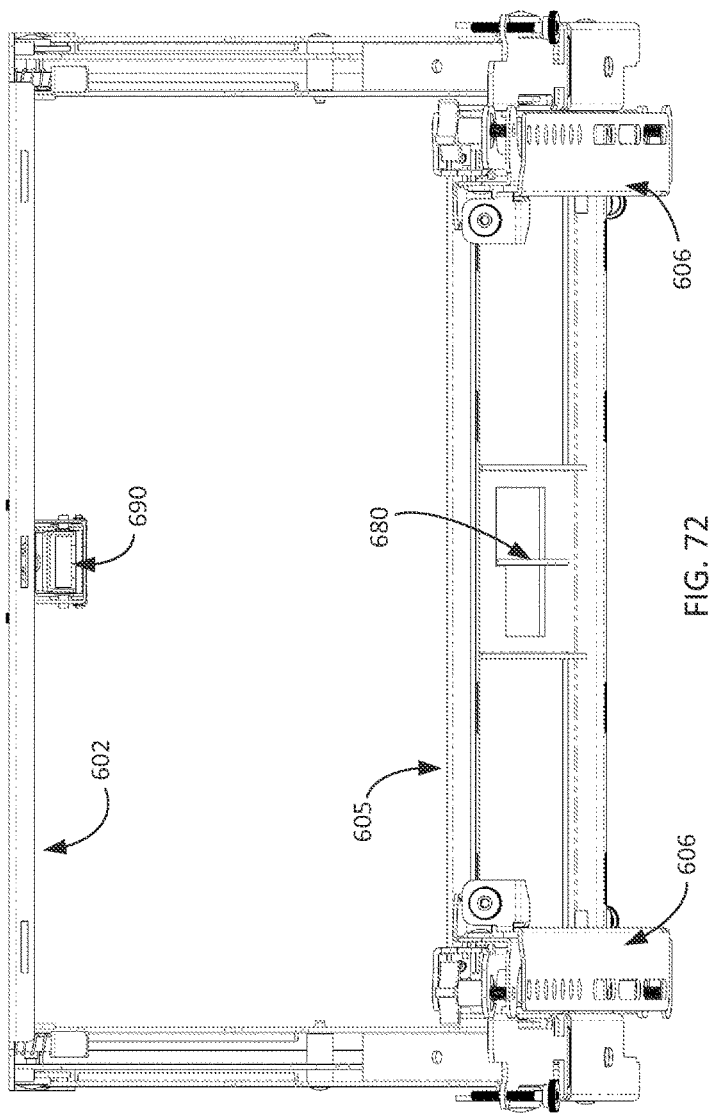

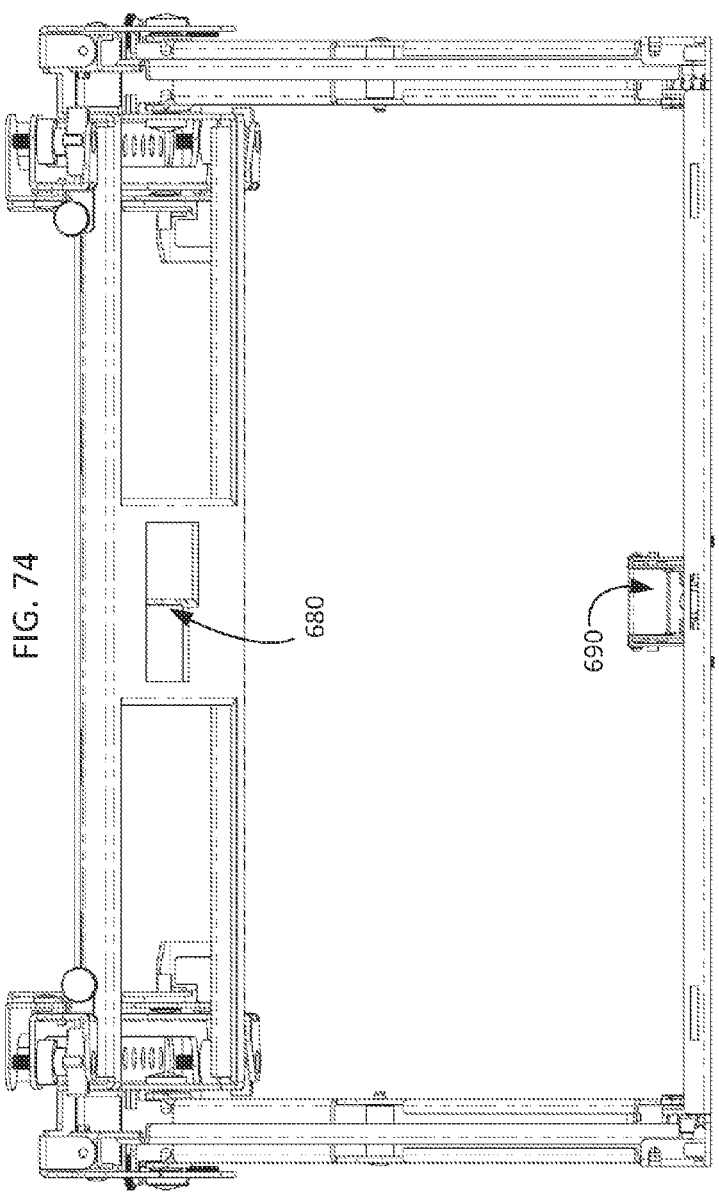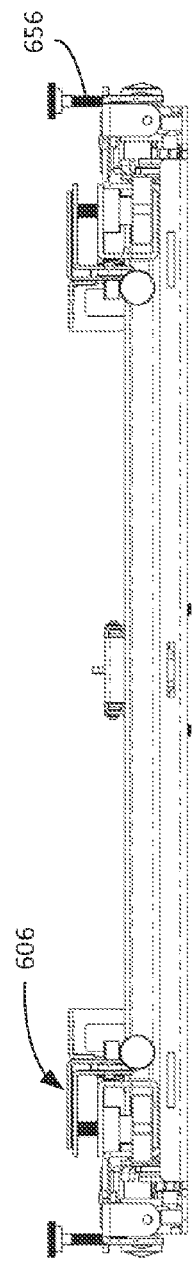

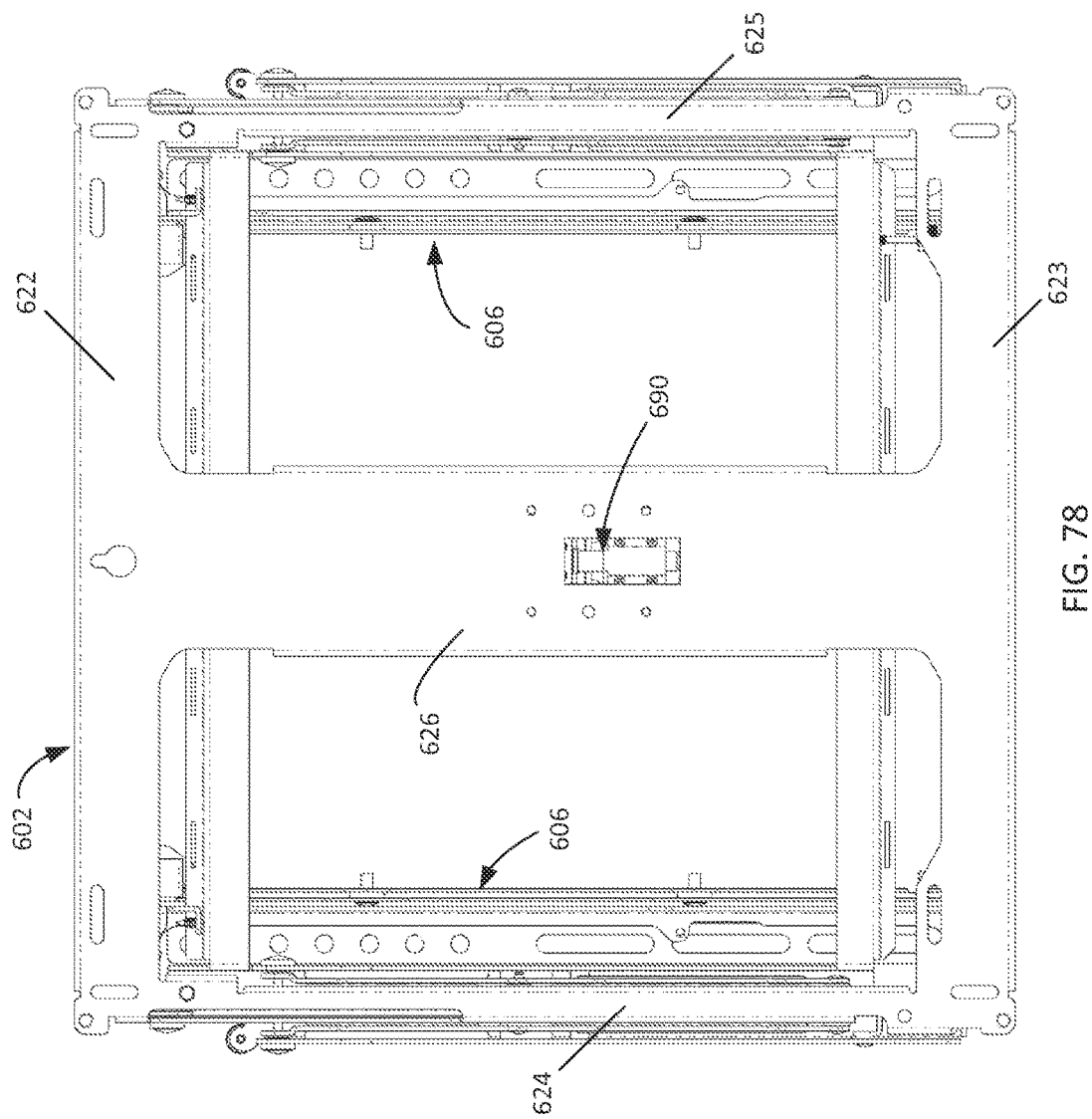

VIDEO WALL MOUNT

CROSS-REFERENCE TO RELATED PATENT APPLICATIONS

The present application is a U.S. national stage application claiming the benefit of International Application No. PCT/US2015/028545, filed on Apr. 30, 2015, which claims the benefits of and priority to U.S. Provisional Patent Application 61/986,619 which was filed on Apr. 30, 2014. The entire contents of these applications are incorporated herein by reference in their entirety.

TECHNICAL FIELD

The present application relates generally to mounting systems for devices. More particularly, the present invention relates to adjustable mounting systems for mounting a flat-panel display and similar devices.

BACKGROUND

Various adjustable display mounts have been developed that permit adjustment of the position and/or orientation of the attached display in various degrees of freedom. Some of these adjustable mounts permit a user to move aspects of the mount to reposition the location of a display in space relative to a mounting surface. Other mounts allow an attached display to pivot about an axis and/or provide for adjustment of the rotational (i.e., skew) and/or tilt orientation of the display. Such display mounts enable gross positioning of a display device to obtain a preferred viewing position and orientation for the device relative to a viewer.

SUMMARY

One embodiment relates to a mounting system that includes a surface mount configured to operatively couple to an attachment surface, a movable mount, at least one arm assembly, at least one device mount, a latch, and a catch. The at least one arm assembly includes at least one arm having a first end operatively coupled to the surface mount and a second end operatively coupled to the movable mount. Each arm assembly is adjustable, such that the second end is movable relative to the first end to move the movable mount relative to the surface mount in a first direction. The at least one device mount is configured to support a display device and operatively coupled to the movable mount, such that each device mount is movable in a second direction that is different than the first direction. The latch is coupled to one of the surface mount and the movable mount, and the catch is coupled to the other of the surface mount and the movable mount. The latch is configured to detachably engage the catch to secure the relative position between the movable mount and the surface mount.

Another embodiment relates to a mounting system for supporting a display device. A surface mount is configured to operatively couple to an attachment surface. A support mount is movably coupled to the surface mount via an adjusting assembly, the support mount movable relative to the surface mount between a collapsed position and an extended position. At least one device mount is configured to support the display device and is movably coupled to the support mount so as to allow adjustment of each device mount relative to the support mount. A latch is coupled to one of the surface mount and the support mount, the latch including a body and a detent extending away from the body and defining a recess between the body and the detent. A catch is coupled to the other of the surface mount and the support mount, the catch including a latching element that is movable relative to at least one side wall. The latching element detachably engages the recess to secure the support mount relative to the surface mount when the support mount is in the collapsed position.

Yet another embodiment relates to a mounting system for supporting a display device. A surface mount is configured to operatively couple to an attachment surface. A support mount is configured to move relative to the surface mount between a collapsed position and an extended position by way of an adjusting assembly interconnecting the surface mount and the support mount. A latching device is configured to secure the support mount and the surface mount when in the collapsed position. The latching device includes a latch and a catch. The includes a body and a detent extending from the body, wherein the detent includes a leading surface and a trailing surface. The catch includes a frame and a latching element that is supported by and movable relative to the frame between locking and non-locking positions. One of the latch and the catch is associated with the surface mount, and the other of the latch and the catch is associated with the support mount. When the support mount is moved from the extended position toward the collapsed portion, the leading surface of the latch moves the latching element to the non-locking position to allow the detent to pass by the latching element. The latching element returns to the locking position when the support mount is in the collapsed position, such that the trailing surface of the detent and the latching element prevent moving the support mount to the extended position by contacting one another until released.

BRIEF DESCRIPTION OF THE DRAWINGS

FIG. 3 is a front view of the mounting system of FIG. 1.

FIG. 4 is a right-side view of the mounting system of FIG. 1.

FIG. 9 is a perspective view of an exemplary embodiment of a surface mount for use in a mounting system, such as the mounting system of FIG. 1.

FIG. 10 is a front view of the surface mount of FIG. 9.

FIG. 11 is a top view of the surface mount of FIG. 9.

FIG. 12 is a side view of the surface mount of FIG. 9.

FIG. 15 is a front view of the extension assembly of FIG. 13.

FIG. 16 is a top view of the extension assembly of FIG. 13.

FIG. 17 is a side view of the extension assembly of FIG. 13.

FIG. 18 is a perspective view of an exemplary embodiment of device mount for use in a mounting system, such as the mounting system of FIG. 1.

FIG. 18A is a cross-sectional view taken along line A-A of FIG. 18.

FIG. 19 is another perspective view of the device mount of FIG. 18.

FIG. 20A is a detail view of a portion of the device mount of FIG. 18.

FIG. 20B is another detail view of the device mount engaging the movable mount.

FIG. 21 is another detail view of a portion of the device mount of FIG. 18.

FIG. 26 is a perspective view of a mounting system, according to another exemplary embodiment.

FIG. 27 is a front view of the mounting system of FIG. 26.

FIG. 43 is a perspective view of a portion of the device mount of FIG. 36.

FIG. 44 is a perspective view of a portion of the device mount of FIG. 36.

FIG. 45 is a side view of an exemplary embodiment of a device mounting bracket.

FIG. 46 is a perspective view of the device mounting bracket of FIG. 45.

FIG. 47 is a perspective view of another exemplary embodiment of a latch and catch for a mounting system, shown in the disengaged position.

FIG. 48 is the latch and catch of FIG. 47 shown in the engaged position.

FIG. 49 is a perspective view of another portion of the device mount of FIG. 36.

FIG. 71 is a top view of the mounting system of FIG. 69, shown in the collapsed position.

FIG. 72 is another top view of the mounting system of FIG. 69, shown in the expanded position.

FIG. 74 is a bottom view of the mounting system of FIG. 69, shown in the collapsed position.

FIG. 75 is another bottom view of the mounting system of FIG. 69, shown in the extended position.

FIG. 78 is a rear view of the mounting system of FIG. 69, shown in the collapsed position.

DETAILED DESCRIPTION

Figure 1:
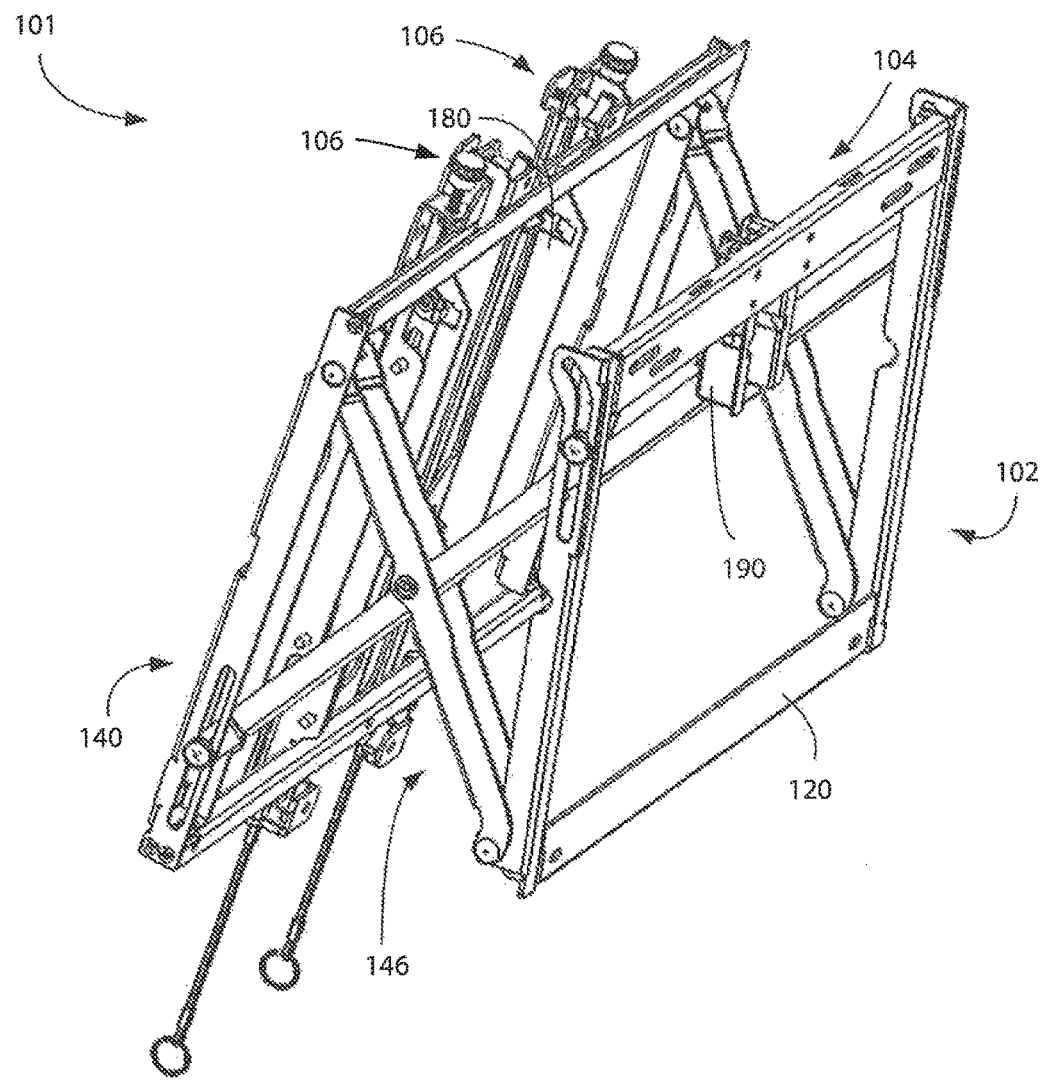
FIG. 1 is a perspective view of a mounting system, according to an exemplary embodiment.

Referring generally to the Figures, disclosed herein are mounting systems (e.g., mounts) that are configured to adjustably couple an audio/visual device (e.g., a flat panel display, a display device, etc.) to a mounting surface, such as, for example, a wall, a support or other surface capable of supporting the mounting system and the audio/visual device coupled thereto.

FIGS. 1-25 illustrate an exemplary embodiment of a mounting system 101. The mounting system 101 is configured to attach a display device (not shown) to a mounting surface 11 (as shown in FIG. 4), such as a wall or other surface. The mounting system 101 may also be used to operatively attach one or more display devices to a stand or other portable unit. Various portions of the mounting system 101 are selectively movable in relation to each other, such that the position and orientation of the attached display may be adjusted in a plurality of dimensions or degrees of freedom. The various features of the mounting system 101 provide for independent control of translational and rotational degrees of freedom of the attached display relative to the mounting surface. Through adjustment of the various features of the mounting system 101, optimization of the position and orientation of the attached display can be achieved relative to a mounting surface and/or adjacent displays, such as when the mounting system 101 is used in the context of a video wall application comprising an array of display devices.

The mounting system 101 may include a surface mount 102 configured to couple (e.g., operatively attach) the mounting system 101 to a mounting surface (e.g., the surface 11 shown in FIG. 4), a device mount 106 configured to couple a display device to the mounting system 101, and an extension assembly 104 configured to provide adjustment of the display device relative to the mounting surface. As shown in FIGS. 1-8, the mounting system 101 includes a surface mount 102, an extension assembly 104, and a plurality of device mounts 106. The surface mount 102 may be detachably affixed (e.g., secured, coupled, etc.) to the mounting surface through one or more connecting element (e.g., bolt, screw, other fasteners, hook, etc.) or other suitable elements. The display device may be detachably affixed to the one or more device mounts 106 through one or more connecting element or other suitable elements. The one or more device mounts 106 may be adjustably and/or detachably affixed to the extension assembly 104 to allow relative adjustment of each device mount 106 relative to the surface mount 102, such as to allow a user to adjust the position (e.g., alignment, location, etc.) of the display device coupled to the mounting system 101.

The surface mount 102 includes one or more members that define an attachment surface 120 configured to be secured to a mounting surface. For example, the attachment surface 120 may be detachably affixed to a wall (e.g., a substantially vertical surface) such that at least a portion of the attachment surface 120 abuts at least a portion of the wall. The attachment surface 120 (e.g., the members forming the attachment surface 120) includes one or more openings 121 (e.g., holes, slots, apertures, etc.), which may receive connecting elements (not shown) that may be used to attach the surface mount 102 to the mounting surface.

As shown in FIGS. 9-12, the surface mount 102 includes an upper cross member 122, a lower cross member 123, a right side member 124, and a left side member 125. The members may form a generally rectangular frame. As shown in FIG. 10, the upper cross member 122 may include a base 122a that defines a portion of the attachment surface 120. The base 122a may be configured as a plate including a surface (e.g., an exterior surface) that is configured to engage the mounting surface. The base 122a may include one or more openings 121 that may receive one or more connecting elements. For example, the base 122a may include a plurality of openings 121 configured as slots that extend parallel to a longitudinal direction (e.g., a horizontal direction) of the upper cross member 122. The openings 121 in the base 122a may have a predetermined spacing, such as a spacing arranged to correspond to the regular spacing for wall studs. The base 122a may optionally include additional openings, such as for attaching a catch, if provided. The upper cross member 122 may optionally include a flange, a gusset, and/or other features, which may provide further utility to the upper cross member 122, such as increasing its strength and/or allow coupling of the upper cross member 122 to another member. As shown in FIG. 11, the upper cross member 122 includes a flange 122b extending from an upper portion (e.g., upper edge) of the base 122a. As shown in FIG. 10, the upper cross member 122 includes a pair of opposing side flanges 122c. Each side flange 122c may include one or more features (e.g., openings) to facilitate coupling the upper cross member 122 to the side members 124, 125 of the surface mount 102 (or to another member).

The lower cross member 123 may be configured similar to or different than the upper cross member 122. For example, the lower cross member 123 may be configured symmetrically opposite (or generally symmetrically opposite, such as having a symmetric basic shape with different hole patterns) to the upper cross member 122. As shown in FIGS. 9 and 10, the lower cross member 123 includes a base 123a including a plurality of openings 121, a lower flange 123b extending from a lower portion (e.g., a lower edge) of the base 123a, and a pair of opposing side flanges 123c configured to facilitate coupling the lower cross member 123 to the side members 24, 125 of the surface mount 102.

The right side member 124 may be configured the same as, similar to, or different than the left side member 125. As shown in FIGS. 9-12, the right side member 124 is symmetrically opposite to the left side member 125. Therefore, for the embodiment shown in FIGS. 9-12, a description of only the right side member 124 is provided, and it should be understood that the similar reference numerals (e.g., 125a, 125b, etc.) for the left side member 125 correspond to similar features having similar reference numerals (e.g., 124a, 124b, etc.) described for the right side member 124. As shown, the right side member 124 includes a base 124a and a pair of spaced apart legs 124b extending away from the base 124a to form a generally U-shaped (e.g., an inverted U-shaped, a C-shaped, etc.) cross section. At least one leg (e.g., the outer leg 124b) of the right side member 124 may include a first opening 124c configured to receive a first portion of the extension assembly 104 (or a connecting element to operatively couple the first portion of the extension assembly 104 to the right side member 124). As shown in FIG. 12, the first opening 124c is configured as a slot having generally a J-shape. For example, the slot may include a first portion that is substantially straight and a second portion that is curved (e.g., arcuate), where the second portion extends from the first portion to form a continuous first opening 124c. At least one leg 124b (e.g., both legs) may include a second opening 124d configured to receive a second portion of the extension assembly 104 (or a connecting element to operatively couple the second portion of the extension assembly 104 to the right side member 124). As shown in FIG. 12, the second opening 124*d* is configured having a generally circular shape. Thus, the first opening 124*c* may allow the first portion of the extension assembly 104 to pivot (e.g., rotate) and/or move (e.g., slide, translate, displace, etc.) therein relative to the right side member 124, and the second opening 124*d* may allow the second portion of the extension assembly 104 to pivot relative to the right side member 124.

The surface mount 102 may optionally include other elements or features. For example, the surface mount 102 may include one or more spacer engagement features (not shown). The one or more spacer engagement features may be configured as disclosed, for example, in U.S. patent application Ser. No. 12/704,777, which is incorporated by reference herein in its entirety.

The extension assembly 104 may include a movable mount 140 and an arm assembly 146. The movable mount 140 is configured to support the display device (either directly or through the one or more device mounts 106), and the arm assembly 146 is configured to allow adjustment of the position of the movable mount 140 relative to the surface mount 102. As shown in FIGS. 13-17, the extension assembly 104 includes a pair of arm assemblies 146, with each arm assembly 146 disposed on one side (e.g., left side, right side) of the movable mount 140. However, in other embodiments, the extension assemblies 104 may be configured having more or fewer of the arm assemblies 146.

The movable mount 140 includes one or more members interconnected together to form a mount structure, which may be configured to support another object, such as a display device and/or a device mount 106. As shown in FIG. 15, the movable mount 140 includes an upper cross member 141, a lower cross member 142, a right side member 143, and a left side member 144. The members of the movable mount 140 may be coupled (e.g., connected) together using connecting elements, other suitable elements, or other suitable methods (e.g., welding).

As shown in FIGS. 15-17, the upper cross member 141 is configured as a channel including a base 141*a*, a forward leg 141*b*, and a rearward leg 141*c* spaced apart from the forward leg 141*b*, where both legs extend away from the base 141*a* forming an open end. In other words, the upper cross member 141 may have a generally U-shaped cross section. For example, each leg may extend in a general upwardly direction away from the base 141*a*. According to an exemplary embodiment, the rearward leg 141*c* is taller (e.g., extends farther from the base 141*a*) than the forward leg 141*b*. This arrangement may advantageously help in coupling each device mount 106 to the movable mount 140, such as, for example by having a first portion of the device mount 106 rest on (e.g., contact) an end (e.g., an upper surface) of the forward leg 141*b*, a second portion of the device mount 106 abut a surface (e.g., a front surface) of the rearward leg 141*c*, and a third portion of the device mount 106 engage the channel (e.g., the space between the legs of the upper cross member 141) to secure the device mount 106 to the upper cross member 141. This arrangement may utilize gravity to help secure the coupled device mount 106 and upper cross member 141. The upper cross member 141 may include openings, such as to allow the upper cross member 141 to be coupled to other members, and/or may include other features (e.g., flanges, gussets, etc.).

As shown, the lower cross member 142 is configured as a channel including a base 142*a*, a forward leg 142*b*, and a rearward leg 142*c* spaced apart from the forward leg 142*b*, where both legs extend away from the base 142*a*. For example, each leg may extend in a general downwardly direction away from the base 142*a*. The arrangement of having the open end of the channel (e.g., that is provided between the two legs) of the lower cross member 142 face away from the open end of the upper cross member 141 may advantageously help in coupling each device mount 106. For example, each device mount 106 may include a feature that is configured to engage the channel of the lower cross member 142 through the open end (e.g., from the underside of the movable mount 140), then the device mount 106 may be rotated (e.g., about the feature engaging the channel of the lower cross member 142) until another feature of the device mount 106 engages the upper cross member 141. The device mount 106 may then be secured to the movable mount 140, such as through fasteners or other suitable connecting elements. Alternatively, an upper feature of the device mount 106 may be moved into engagement with the channel of the upper cross member 141, then the device mount 106 may be rotated about the upper feature until a lower feature of the device mount 106 engages the channel of the lower cross member 142. The device mount 106 may then be secured to the movable mount 140, such as through fasteners or other suitable connecting elements. The lower cross member 142 may include openings, such as to allow the lower cross member 142 to be coupled to other members, and/or may include other features (e.g., flanges, gussets, etc.).

As shown, the right side member 143 is configured symmetrically opposite to the left side member 144. Therefore, for the embodiments shown in FIGS. 15-17, a description of only the right side member 143 is provided, and it should be understood that the similar reference numerals for the left side member 144 correspond to similar features described for the right side member 143. The right side member 143 is configured as a channel including a base 143*a* and a pair of spaced apart legs 143*b* extending away from the base 143*a*. In other words, the upper cross member 141 may have a generally U-shaped cross section. The right side member 143 may include openings, such as to couple other elements of the mounting system 101 to the side member. For example, at least one leg 143*b* of the right side member 143 may include a first opening 145*a* configured to facilitate operatively coupling a portion of an arm assembly 146 to the right side member 143. As shown in FIG. 17, the first opening 145*a* is configured as a slot, which may extend generally parallel to the base 143*a*. The slot shaped first opening 145*a* may allow a portion of an arm assembly 146 to pivot and/or move (e.g., slide, translate, displace, etc.) in the opening 145*a* relative to the right side member 143. Also, for example, at least one leg 143*b* of the right side member 143 may include a second opening 145*b* configured to facilitate operatively coupling another portion of an arm assembly 146 to the right side member 143. As shown in FIG. 17, the second opening 145*b* is configured having a generally circular shape, which may allow a portion of the arm assembly 146 to pivot in the opening 145*a* relative to the right side member 143. The right side member 143 may include additional openings, such as, for example, a third opening 145*c* to facilitate coupling the side member 143 to the upper cross member 141 and/or a fourth opening 145*d* to facilitate coupling the side member 143 to the lower cross member 142.

Each arm assembly 146 may be configured to operatively couple to both the surface mount 102 and the movable mount 140, and may be further configured to be adjustable (e.g., reconfigurable, movable, etc.) to allow the movable mount 140 to be adjusted (e.g., reconfigured, moved, etc.) relative to the surface mount 102. For example, each arm assembly 146 may be movable between a first position (e.g., a retracted position) and a second position (e.g., an extended position) to thereby move the movable mount 140 between a retracted position and an extended position. Each arm assembly 146 may be configured the same as, similar to, or different than the other arm assemblies 146 of the extension assembly 104. For example, the extension assembly 104 may be configured having two arm assemblies 146 that are symmetrically opposite to the other arm assembly 146.

Each arm assembly 146 includes at least one arm that is configured to provide the adjustability of the extension assembly 104. As shown in FIGS. 13-17, each arm assembly 146 includes a first arm 147 and a second arm 148. As shown, the first arm 147 includes a first end 147a and a second end 147b. The first end 147a is configured to be coupled to the surface mount 102 and the second end 147b is configured to be coupled to the movable mount 140. According to an exemplary embodiment, the first end 147a may be disposed in the first opening 124c of the surface mount 102 and the second end 147b may be disposed in the slotted first opening 145a of the movable mount 140. Thus, the first end 147a may move (e.g., slide, ride, translate, etc.) in the slotted first opening 124c of the surface mount 102 and the second end 147b may move in the slotted first opening 145a of the movable mount 140 during adjustment of the extension assembly 104. The first and second ends 147a, 147b of the first arm 147 may be coupled to the surface mount 102/movable mount 140 either directly or indirectly, such as through a pivot member. Each pivot member may be configured as a bushing, a pin, a rod, a sleeve, or any other suitable pivot device.

As shown, the second arm 148 includes a first end 148a and a second end 148b. The first end 148a is configured to be coupled to the surface mount 102 and the second end 148b is configured to be coupled to the movable mount 140. According to an exemplary embodiment, the first end 148a may be disposed in the second opening 124d of the surface mount 102 and the second end 148b may be disposed in the second opening 145b of the movable mount 140. Thus, the first end 148a may be pivotally (e.g., rotatably) coupled to the second opening 124d of the surface mount 102 and the second end 148b may be pivotally coupled to the second opening 145b of the movable mount 140 to facilitate adjustment of the extension assembly 104. The first arm 147 and second arm 148 may optionally be pivotally coupled together. As shown in FIG. 17, the first arm 147 includes an opening 147c provided between its first and second ends 147a, 147b that is pivotally coupled to an opening 148c of the second arm 148 that is provided between its first and second ends 148a, 148b. The first and second ends 148a, 148b of the second arm 148 may be coupled to the surface mount 102/movable mount 140 either directly or indirectly, such as through a pivot member. The first and second arms 147, 148 may be coupled together via a pivot member. Each pivot member may be configured as a bushing, a pin, a rod, a sleeve, or any other suitable pivot device.

As noted, the extension assembly 104 is configured to allow adjustment of the movable mount 140 relative to the fixed surface mount 102. The adjustability may be configured to provide different positions of the display device coupled to the mounting system 101, or may aid in the service of the display device. For example, the retracted position of the extension assembly 104 may be utilized as a first viewing position of the display device and the extended position may be utilized as a second viewing position of the display device. The extended position may also be utilized as a service position. For example, when the extension assembly 104 of the mounting system 101 is in the extended (e.g., service) position, the area of access, such as to the rear of the attached display device, may be increased to make it easier for connecting/disconnecting various cables to the device and/or conducting other service activities.

FIGS. 18-21 illustrate an exemplary embodiment of a device mount 106 for use with the mounting system 101. The mounting system 101 may include one or more than one device mount 106, and each device mount 106 may be configured to operatively couple a display device to the movable mount 140. Each device mount 106 includes a device mounting bracket 161 and a mount engagement bracket 163.

The device mounting bracket 161 is configured to support a display device operatively coupled thereto. As shown, the device mounting bracket 161 includes a base 161a and a wall 161b extending away from the base 161a. The base 161a includes a plurality of holes 161c (e.g., apertures, openings, etc.) to facilitate coupling the display device to the base 161a, such as through one or more connecting elements. The device mounting bracket 161 may be configured to adjustably move along its length (e.g., in its longitudinal direction) relative to the mount engagement bracket 163 to provide additional adjustability. The device mounting bracket 161 may be operatively coupled directly to the mount engagement bracket 163, or as shown in the exemplary embodiment of FIGS. 18-21, indirectly through an intermediate bracket 165. The intermediate bracket 165 may include a base 165a and a wall 165b extending from the base 165a. The wall 165b of the intermediate bracket 165 may be adjustably coupled to the wall 161b of the device mounting bracket 161, such that the device mounting bracket 161 may move in the longitudinal direction relative to the intermediate bracket 165. This arrangement advantageously allows the device mounting bracket 161 (and the display device coupled thereto) to move, such as upwardly and downwardly in the longitudinal direction relative to the mount engagement bracket 163 (and the movable mount 140). The walls of the device mounting bracket 161 and/or the intermediate bracket 165 may include openings (e.g., slots), which may allow the brackets to be adjustably coupled together through one or more connecting elements.

Each device mount 106 may include an adjusting member that is configured to provide relative adjustment (e.g., in the longitudinal direction) between the device mounting bracket 161 and the intermediate bracket 165. As shown in FIG. 20A, the adjusting member 162 is configured to adjust a spacing between a flange 165d (e.g., tab, ear, extension, etc.) of the intermediate bracket 165 and a flange 161d of the device mounting bracket 161. Rotation of the adjusting member 162 in a first direction (e.g., clockwise) is configured to increase the spacing between the flanges 161d, 165d, while rotation of the adjusting member 162 in a second direction (e.g., counter-clockwise) is configured to decrease the spacing between the flanges 161d, 165d. As the spacing changes, the relative position between the brackets changes a corresponding amount. The adjusting member 162 may include a threaded portion 162a coupled to the flange 161d of the device mounting bracket 161, such as through a threaded mesh. An end of the threaded portion 162a is configured to contact (e.g., abut) a surface of the flange 165d of the intermediate bracket 165 to influence (e.g., change) the spacing upon rotation of the adjusting member 162. The adjusting member 162 may also include a head 162b that is coupled to the threaded portion 162a, such that rotation of the head 162b rotates the threaded portion 162a. The head 162b may be configured as a knob or any other suitable feature that makes it easier for a user to rotate the adjusting member 162.

The intermediate bracket 165 may be operatively coupled to the mount engagement bracket 163 to advantageously allow for relative adjustment (e.g., movement) therebetween. For example, the intermediate bracket 165 may be configured to move in a direction that is transverse to the longitudinal adjustment of the device mounting bracket 161 (e.g., in a fore-and-aft direction) relative to the mount engagement bracket 163. Each device mount 106 may include one or more adjusting member 164 that is configured to facilitate relative movement between the intermediate bracket 165 and the mount engagement bracket 163. As shown in FIGS. 20A and 21, each device mount 106 may include two adjusting members 164, with one adjusting member 164 provided near an upper end of the device mount 106 and the other adjusting member 164 provided near a lower end of the device mount 106 to provide adjustability at both the upper and lower ends of the device mount 106. The dual adjusting members 164 allow for some pivoting movement (e.g., when one adjusting member is adjusted) as well as translational movement (e.g., when both adjusting members are adjusted a substantially similar amount), depending on how the adjusting members 164 are adjusted. Each adjusting member 166 includes a threaded portion coupled to a flange 163d of the mount engagement bracket 163, such as through a threaded mesh. An end of the threaded portion of the adjusting member 164 is configured to contact (e.g., abut) a surface of the intermediate bracket 165 to influence a spacing (between the flange and surface) upon rotation of the adjusting member 164. Each adjusting member 164 may also include a head that is coupled to the threaded portion, such that rotation of the head rotates the threaded portion. The head of the adjusting member 164 may be configured as a knob or any other suitable feature that makes it easier for a user to rotate the adjusting member 164.

The mount engagement bracket 163 includes a base 163a, which may be configured having an opening that is configured to couple the mount engagement bracket 163 to another member. For example, the base 163a may include a plurality of openings configured to adjustably couple the intermediate bracket 165 to the mount engagement bracket 163. Also, for example, the base 163a may include a second plurality of openings configured to receive the connecting elements 111 (shown in FIG. 21) to adjustably couple the latching bracket 167, if provided on the system.

The mount engagement bracket 163 may be configured to be operatively coupled to the movable mount 140 to secure the device mount 160 to the movable mount 140. As shown in FIG. 20B, the mount engagement bracket 163 includes a portion 163e in the form of a downward extension that engages the channel of the upper cross member 141 of the movable mount 140 through its open end. Once the portion 163e engages the channel of the upper cross member 141, the device mount 106 is able to hang from the upper cross member 141 in a secured manner under the influence of gravity. The portion 163e may extend from the base 163a. A flange may extend away from the portion 163e, such as a bottom end of the portion 163e, where the flange may be configured to receive a connecting element to further secure the mount engagement bracket 163 to the movable mount 140.

Each device mount 106 may optionally include a latching bracket 167 that is configured to help secure the device mount 106 to the movable mount 140. As shown in FIG. 21, the latching bracket 167 includes a base 167a, a wall 167b that extends away from the base 167a, and a latch 167c. The base 167a of the latching bracket 167 is adjustably coupled to the base 163a of the mount engagement bracket 163 via connecting elements 111. For example, the base 167a of the latching bracket 167 may include slotted openings that receive the connecting elements that are fixed to the base 163a of the mount engagement bracket 163 through circular openings sized for the connecting elements 111. This arrangement may advantageously allow the latching bracket 167 to move (e.g., in the longitudinal direction) relative to the mount engagement bracket 163, such as for the latch 167c to engage/disengage a feature of another member of the system. For example, the latch 167c may be configured to engage/disengage the channel in the lower cross member of the movable mount 140. The latch 167c may be configured as a detent or a protrusion that fits in the channel to secure the latching bracket 167 (and the device mount 106) to the movable mount 140. The latch 167c may include a leading surface (i.e., the surface that first contacts the member it engages) that is configured to help move the latching bracket 167 in an unlocking (e.g., disengaging) direction. For example, the leading surface may be configured at an angle relative to the longitudinal direction, where upon contact with another member, the force of contact moves the latching bracket 167 to an unlocked (e.g., disengaged) position.

Each device mount 106 may include a biasing member 168 that is configured to bias the movable latching bracket 167. As shown in FIG. 21, the biasing member 168 biases the latching bracket 167 upwardly in the longitudinal direction, which is in the locking direction of the latching bracket 167. The biasing member 168 may be a spring, such as an extension spring having a first end that is coupled to the latching bracket 167 and a second end that is coupled to another member, such as the mount engagement bracket 163. The biasing member 168 may help secure the latching bracket 167 to the other member that the latching bracket 167 engages to affix the device mount 106 to the movable mount 140.

According to an exemplary embodiment, the portion 163e of the device mount 106 may be disposed in the channel of the upper cross member 141, then the device mount 106 may be pivoted about the portion 163e until the latch 167c of the latching bracket 167 comes in contact with the lower cross member 142. Upon further pivoting of the device mount 106, the latching bracket 167 is configured to move in the unlocking direction via contact between the leading surface of the latch 167c and a feature of the lower cross member 142 (e.g., a leg), which causes the biasing member 168 to extend and absorb energy. Once the detent of the latch 167c moves over the leg of the lower cross member 142, the energy from the biasing member 168 moves the latching bracket 167 relative to the lower cross member 142 in the locking direction and the detent of the latch 167c engages the channel.

Figure 2:
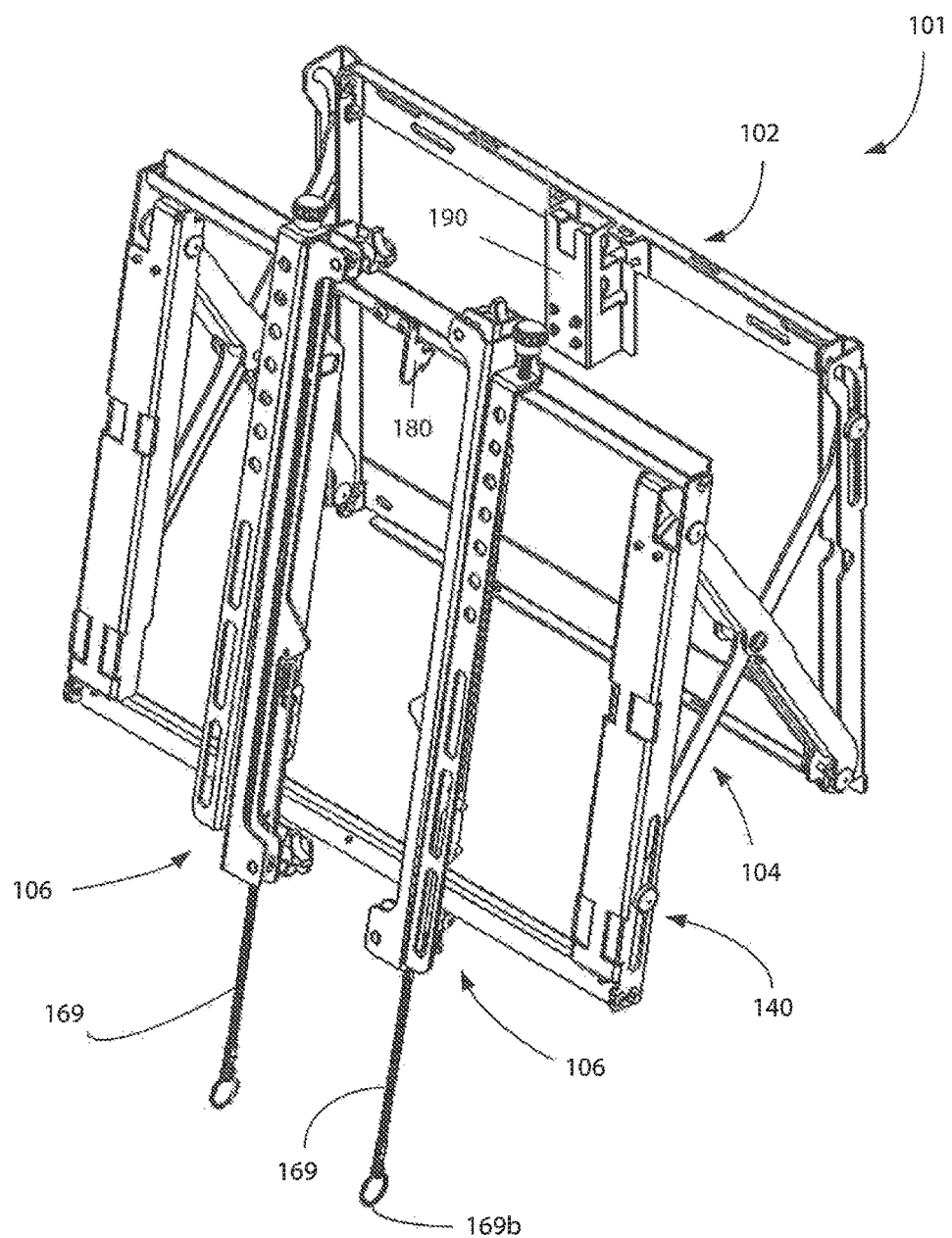
FIG. 2 is another perspective view of the mounting system of FIG. 1.
Figures 5, 6:
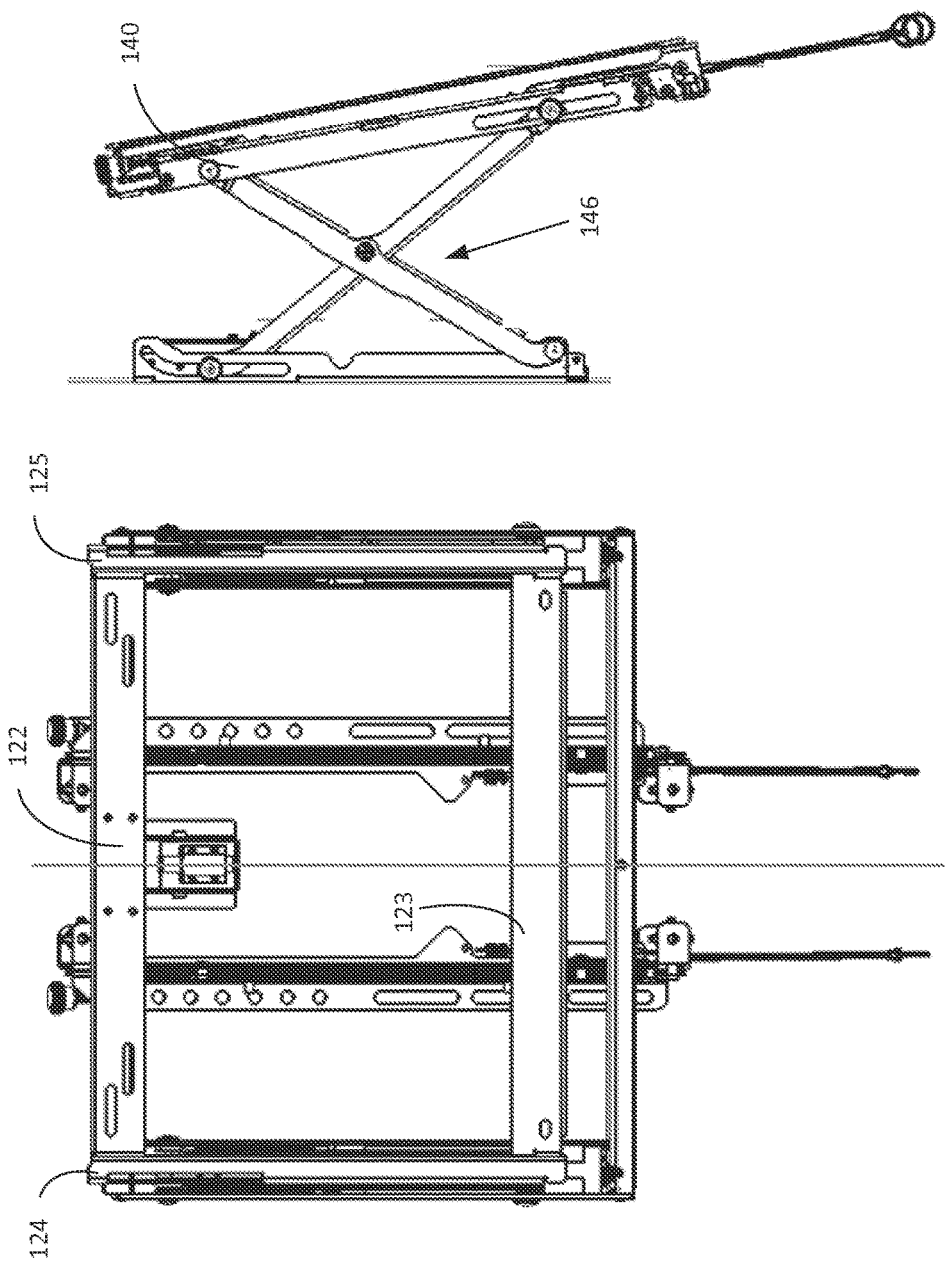
FIG. 5 is a rear view of the mounting system of FIG. 1.
FIG. 6 is a left-side view of the mounting system of FIG. 1.
Figure 7:
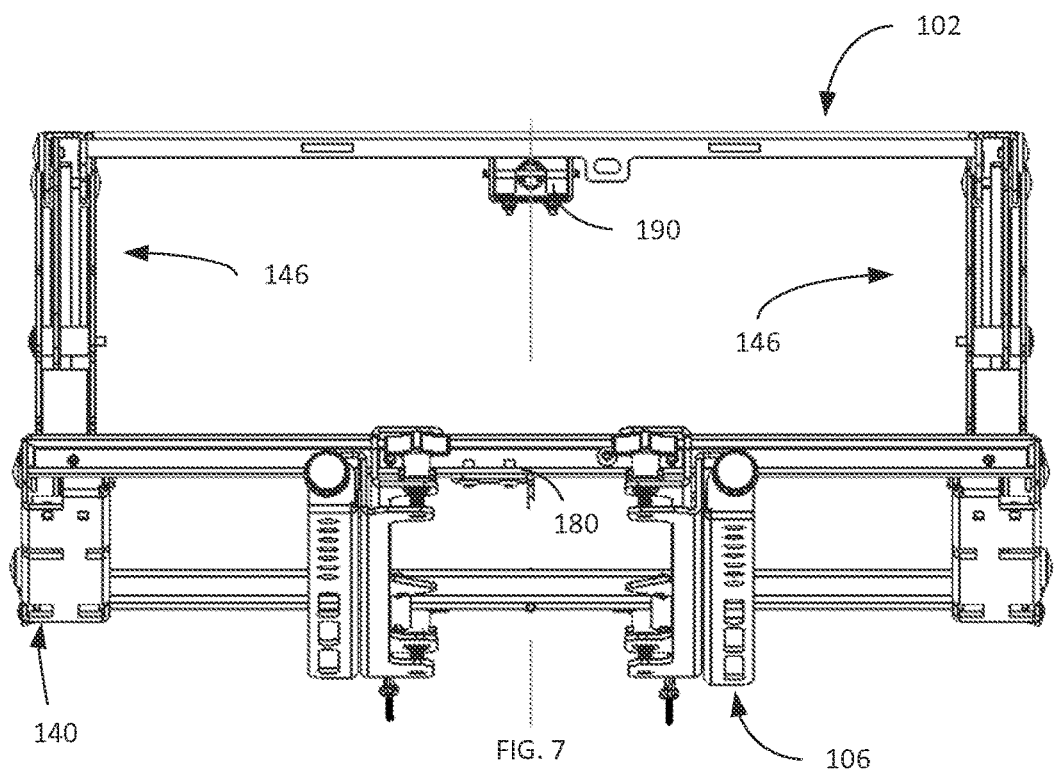
FIG. 7 is a top view of the mounting system of FIG. 1.
Figure 8:
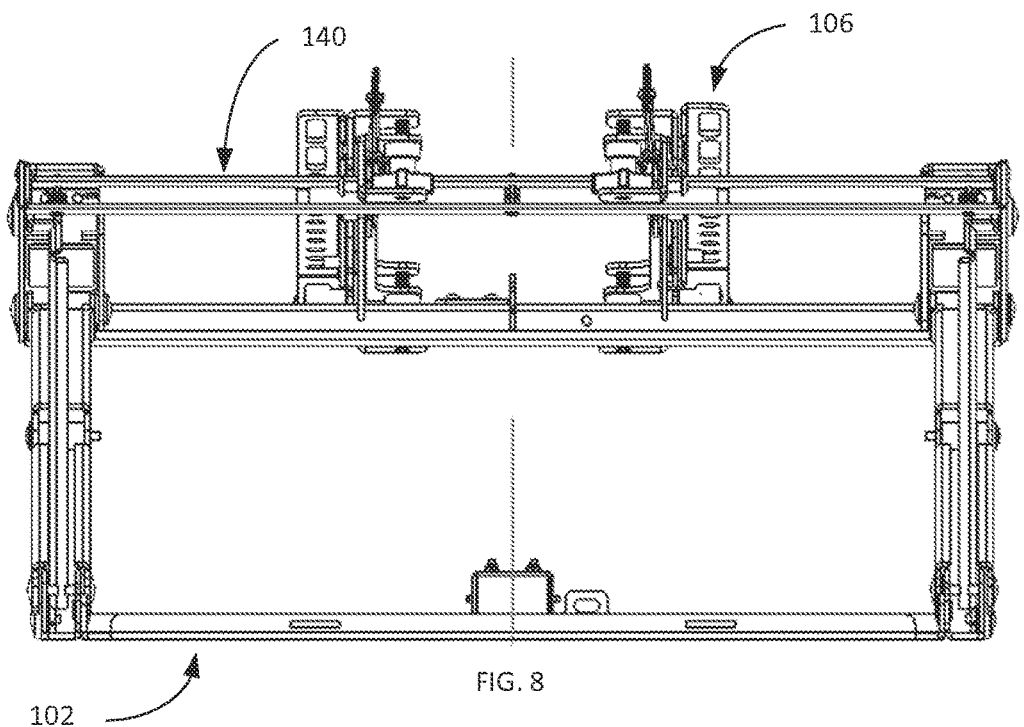
FIG. 8 is a bottom view of the mounting system of FIG. 1.

Each device mount 106 may optionally include an element that is configured to facilitate disengaging the latching bracket 167 from the movable mount 140. As shown in FIG. 2, each device mount 106 includes an actuator 169 that is configured to move the latching bracket 167 from the engaged (e.g., locked) position to the disengaged (e.g., unlocked) position. The actuator 169 includes a first end 169a (see FIG. 21) that is coupled to the latching bracket 167. The actuator 169 may extend downwardly beyond a bottom portion of the structure of the device mount 106 to allow access to the actuator 169 by a user. The user may actuate the actuator 169, such as by pulling on the actuator 169 in the unlocking direction, which drives movement of the latching bracket 167 in the unlocking direction. The actuator 169 may be configured as a cable, a cord, a chain, a rod, or any other suitable device that can drive movement of the latching bracket 167 when actuated. The actuator 169 may include a ring 169b or other suitable feature that makes it easier for the user to actuate (e.g., grasp) the actuator 169.

Although the mounting system 101 shown in FIGS. 1-25 includes four device mounts 106, the mounting system may be configured having a greater or fewer number of device mounts 106. As an example, FIGS. 26 and 27 illustrate a mounting system 201 that includes a surface mount 102, an extension assembly 104, and a pair of device mounts 106 that are coupled to a movable mount 140 of the extension assembly 104. Each device mount 106 may be adjusted laterally (i.e., in a direction from side-to-side) along the movable mount 140. The extension assembly 104 includes a pair of arm assemblies 146 that allow for adjustment of the device mounts 106 in a direction that is generally transverse to the lateral direction (e.g., in a fore-and-aft direction) relative to the surface mount 102.

The mounting system 101 may include a locking device that is configured to secure the system in its one or more adjustable positions. According to an exemplary embodiment, the mounting system 101 includes a latch 180 and a catch 190, where the latch 180 is configured to detachably engage the catch 190 to secure the system in the retracted position. As shown in FIGS. 1-3, the catch 190 is coupled to the surface mount 102, and the latch 180 is coupled to the movable mount 140. When the movable mount 140 is moved relative to the surface mount 102 from the retracted position to an extended position, the latch 180 disengages the catch 190. When the movable mount 140 is moved relative to the surface mount 102 from the extended position to the retracted position the latch 180 engages the catch 190 to secure the mounting system 101 in the retracted position.

Figure 24:
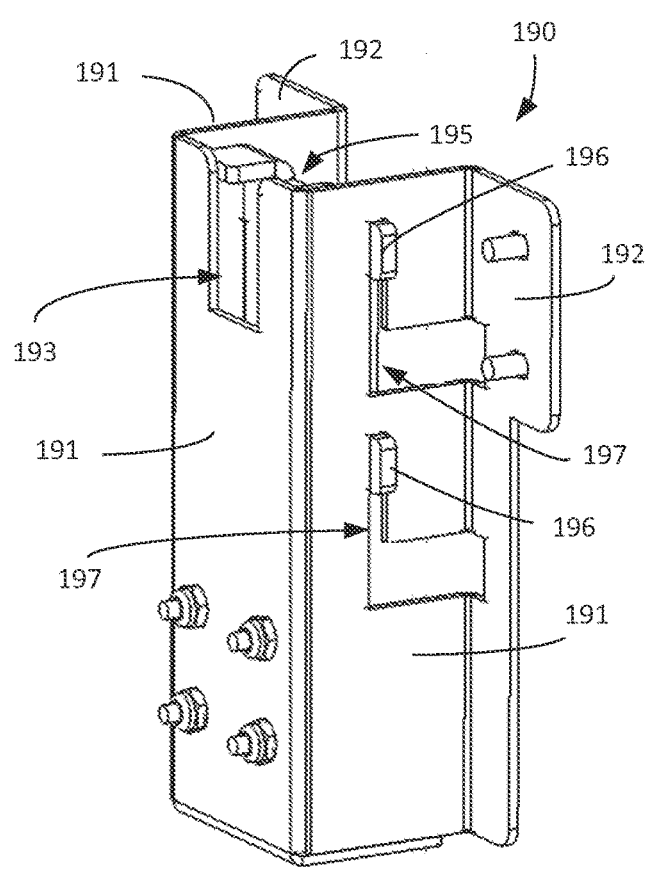
FIG. 24 is a perspective view of an exemplary embodiment of a catch for use in a mounting system, such as the mounting system of FIG. 1.
Figure 25:
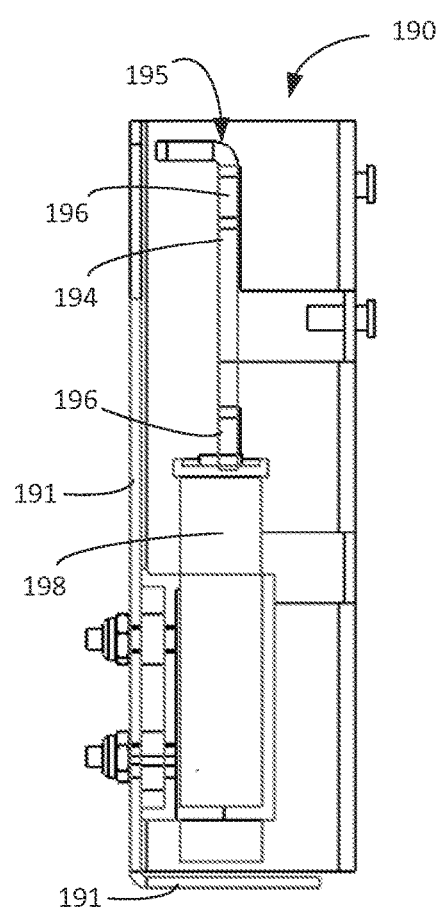
FIG. 25 is a side cross-sectional view of the catch of FIG. 23.
Figure 29:
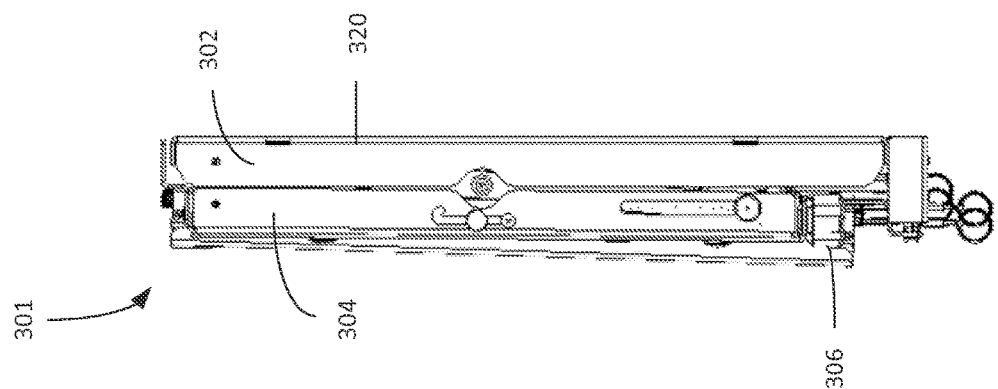
FIG. 29 is a side view of the mounting system of FIG. 28 shown in the retracted position.
Figure 28:
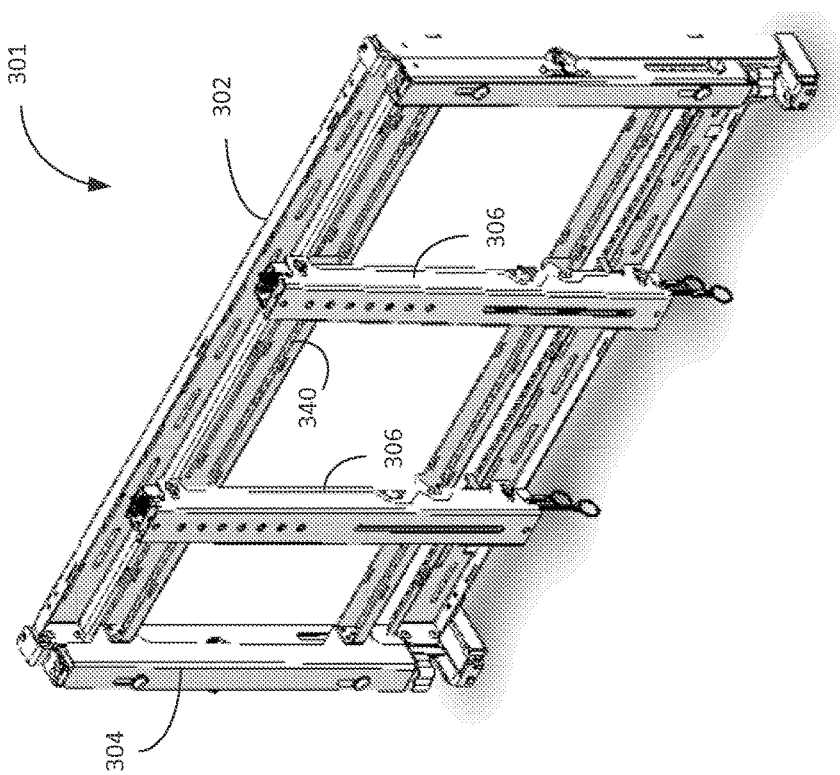
FIG. 28 is a perspective view of a mounting system, according to another exemplary embodiment, shown in the retracted position.
Figure 31:
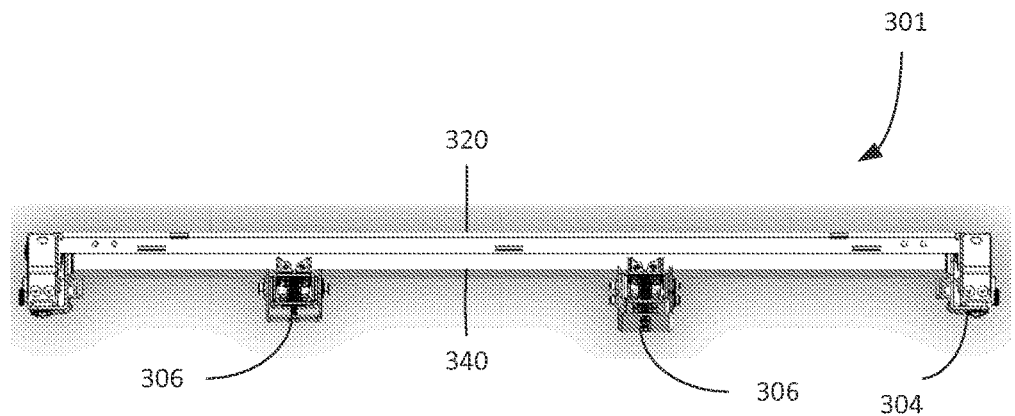
FIG. 31 is a top view of the mounting system of FIG. 28 shown in the retracted position.
Figure 30:
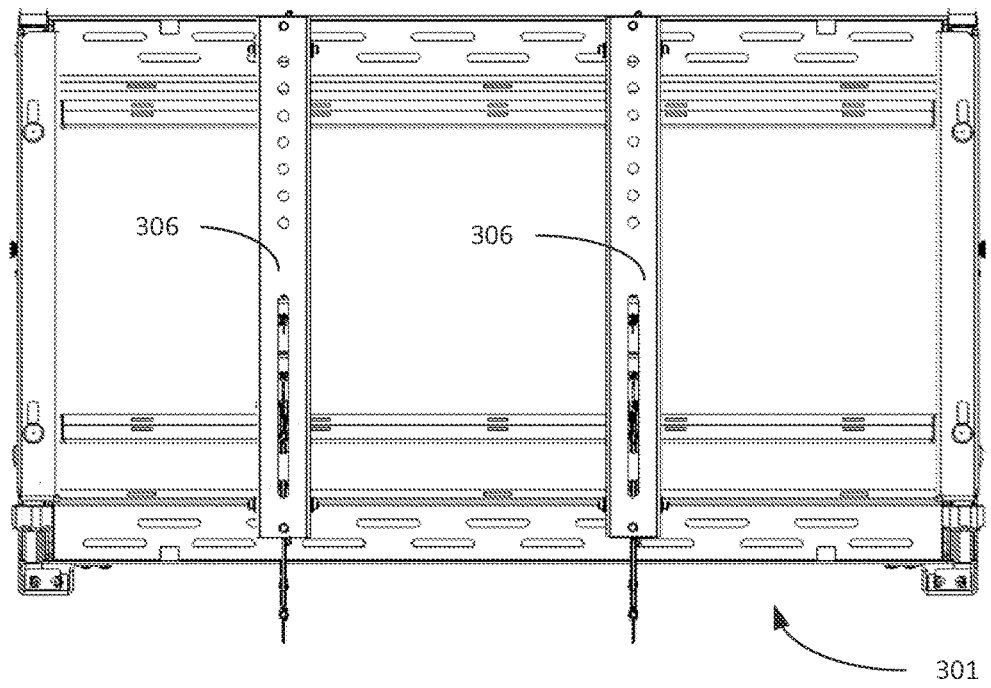
FIG. 30 is a front view of the mounting system of FIG. 28 shown in the retracted position.

As shown in FIGS. 9 and 10, the catch 190 is coupled to the upper cross member 122 of the surface mount 102. The catch 190 may be coupled to an interior surface (opposite the attachment surface 120) of the upper cross member 122 using one or more connecting elements or any other suitable element. Alternatively, the catch 190 may be integrally formed with the surface mount 102, such as the upper cross member 122. FIGS. 24 and 25 illustrate an exemplary embodiment of the catch 190. The catch 190 includes a plurality of walls 191 defining a generally hollow rectangular structure. The catch 190 may include a flange 192 extending from a wall 191, where the flange 192 includes one or more than one opening configured to receive a connecting element to couple the catch 190 to another member, such as the upper cross member 122. The front wall 191 of the catch 190 may include a notch 193, which may be configured to receive a portion of the latch 180. For example, the latch 180 may be configured to engage the front wall 191, such as a portion of the front wall 191 that is directly below the notch 193.

Alternatively, the latch 180 may be configured to engage another feature of the catch 190. For example, the catch 190 may include an internal locking plate 194, a locking mechanism, or another suitable device. As shown in FIG. 25, the locking plate 194 is disposed within a cavity defined by the walls 191 of the catch 190. The locking plate 194 may include a recess 195 (e.g., a notch) that is configured to receive the latch 180. The locking plate 194 may be movable relative to the one or more walls 191, such as when the locking plate 194 is engaged by the latch 180. For example, the latch 180 may include a leading surface that is configured to move (e.g., slide, translate, etc.) the locking plate 194 (e.g., in a downward direction for the embodiment shown in FIG. 25) to allow an engaging (e.g., a detent) member to pass beyond the locking plate, whereby the locking plate 194 may move (e.g., in the upward direction for the embodiment shown in FIG. 25) to engage a feature (e.g., a recess) of the latch 180 to detachably lock the latch 180 and catch 190 to secure the mounting system 101 in position (e.g., in its retracted position). The locking plate 194 may include tabs 196 (e.g., ears, arms, etc.) that are disposed in slotted holes 197 in the one or more walls 191 to allow the tabs 196 to move in the slotted holes 197. Thus, the slotted holes 197 may guide the movement of the tabs 196.

The catch 190 may optionally include a biasing member that is configured to impart a biasing force on the locking plate 194. As shown in FIG. 25, the biasing member 198 is disposed in the cavity and configured to bias the locking plate 194 in an upward (e.g., locking) direction, to bias the locking plate 194 into a locking arrangement with the latch 180, once the latch 180 has moved to the locking position. The biasing member 198 may include a spring, which may be disposed in a case (e.g., housing), or may include any other suitable element that is capable of biasing the locking plate 194 in a direction. The locking mechanism may optionally include a release element, where the locking plate 194 may retain the latch 180 until released by actuation of the release element. For example, the release element may be configured to move the locking plate 194 (e.g., in a downward direction for the embodiment shown in FIG. 25) to allow the latch 180 to disengage from the locking plate 194 to allow mounting system 101 to be moved to a different position, such as the extended position.

Figure 13:
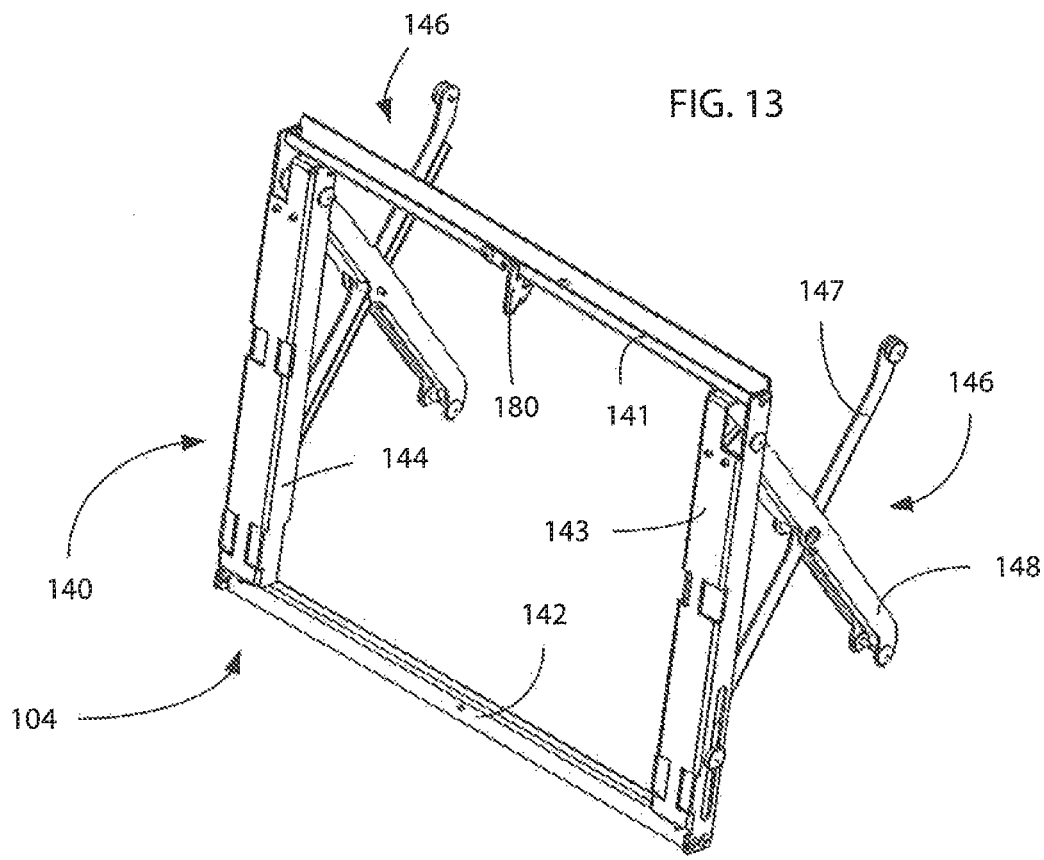
FIG. 13 is a perspective view of an exemplary embodiment of an extension assembly for use in a mounting system, such as the mounting system of FIG. 1.
Figure 14:
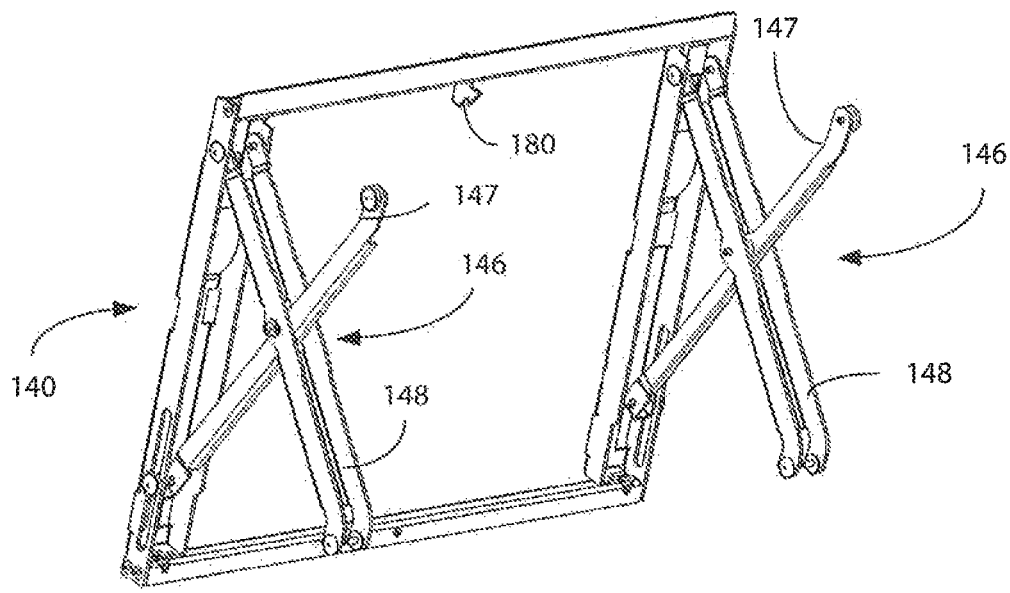
FIG. 14 is another perspective view of the extension assembly of FIG. 13.
Figure 22:
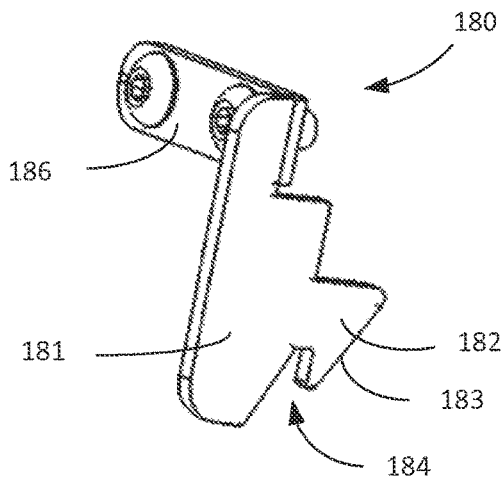
FIG. 22 is a perspective view of an exemplary embodiment of a latch for use in a mounting system, such as the mounting system of FIG. 1.
Figure 23:
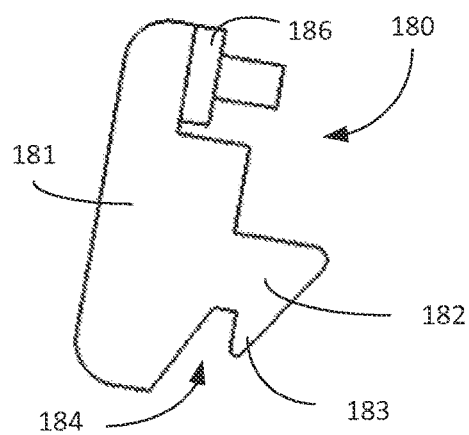
FIG. 23 is a side view of the latch of FIG. 22.

As shown in FIGS. 13-15, the latch 180 is coupled to the upper cross member 141 of the movable mount 140. The latch 180 may be coupled to the upper cross member 141 through one or more connecting elements or any other suitable method, such as welding. FIGS. 22 and 23 illustrate an exemplary embodiment of a latch 180. The latch 180 includes a body 181 and an engaging member 182 that is configured to engage the catch 190. The engaging member 182 may extend from the body 181 or be a portion of the body 181. The engaging member 182 includes a leading surface 183 that is configured at an angle relative to the direction of engagement (i.e., the direction that the latch 180 moves in to engage the catch 190). The leading surface 183 of the latch 180 may be configured to be brought into contact with a portion of the catch 190, such as a latching element (e.g., the locking plate 194), such that further relative movement between the latch 180 and the catch 190 moves the latching element.

Also shown in FIG. 22, the latch 180 also includes a recess 184 (e.g., notch) that is defined by the engaging member 182 and a leading surface 188 of the body 181 (e.g., a second leading surface). For example, the recess 184 may be defined by the leading surface 188 and a detent 187 at a lower portion of the engaging member 182. The detent 187 may be configured as a projection that extends between the leading surface 183 and a trailing surface 189. As shown, the detent 187 has a generally triangular shape with the leading surface 183 and the trailing surface 189 converging at a distance from a root of the recess 184. Thus, the recess 184 may be located between the trailing surface 189 of the detent 187 and the leading surface 188 of the body 181. The detent 187 of the engaging member 182 is configured to engage a portion of the catch 190 during engagement of the latch 180 and catch 190, such that a portion of the catch 190 engages the recess 184 to secure the latch 180 and catch 190 together when engaged.

The latch 180 may optionally include a flange 186 that extends away from the body 181, such as in a transverse direction to the body 181, where the flange 186 is configured to couple the latch 180 to another element, such as the upper cross member 141 of the movable mount 140. The flange 186 may include one or more openings that are configured to receive one or more connecting elements to secure the flange 186 (and latch 180) to the other element.

FIGS. 28-53 illustrate another exemplary embodiment of a mounting system 301. The mounting system 301 includes a surface mount 302, an extension assembly 304, and a pair of spaced apart device mounts 306. The surface mount 302 may be detachably affixed (e.g., secured, coupled, etc.) to a mounting surface through one or more connecting element (e.g., bolt, screw, other fasteners, hook, etc.) or other suitable elements. The surface mount 302 includes an attachment surface 320 that is configured to abut a portion of the mounting surface when the surface mount 302 is attached thereto. A display device may be detachably affixed to the one or more device mounts 306, such as, for example, through one or more connecting elements. Each device mount 306 may be detachably affixed to the extension assembly 304, such as a movable mount 340. The extension assembly 304 is adjustable, such as extendible between a retracted position and an extended position to allow relative adjustment of each device mount 306 relative to the surface mount 302, so that a user can adjust the position (e.g., alignment, location, etc.) of the display device coupled to the mounting system 301. Each device mount 306 may be adjustable, such as relative to the extension assembly 304 (e.g., the movable mount 340) to provide additional adjustment of the display device coupled to the mounting system 301.

Figures 32, 33:
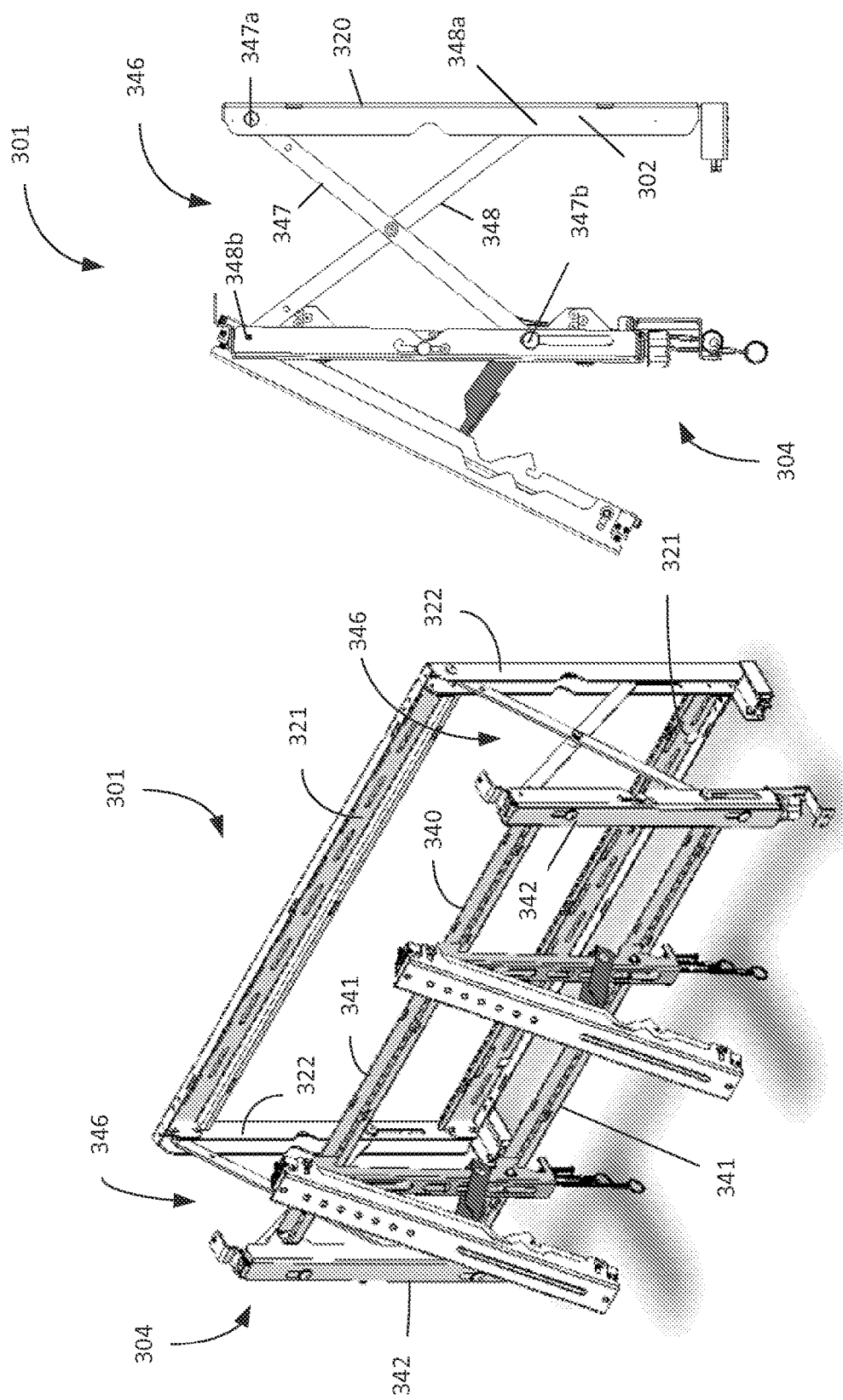
FIG. 32 is a perspective view of the mounting system of FIG. 28 shown in the extended and tilted positions.
FIG. 33 is a side view of the mounting system of FIG. 32.
Figure 35:
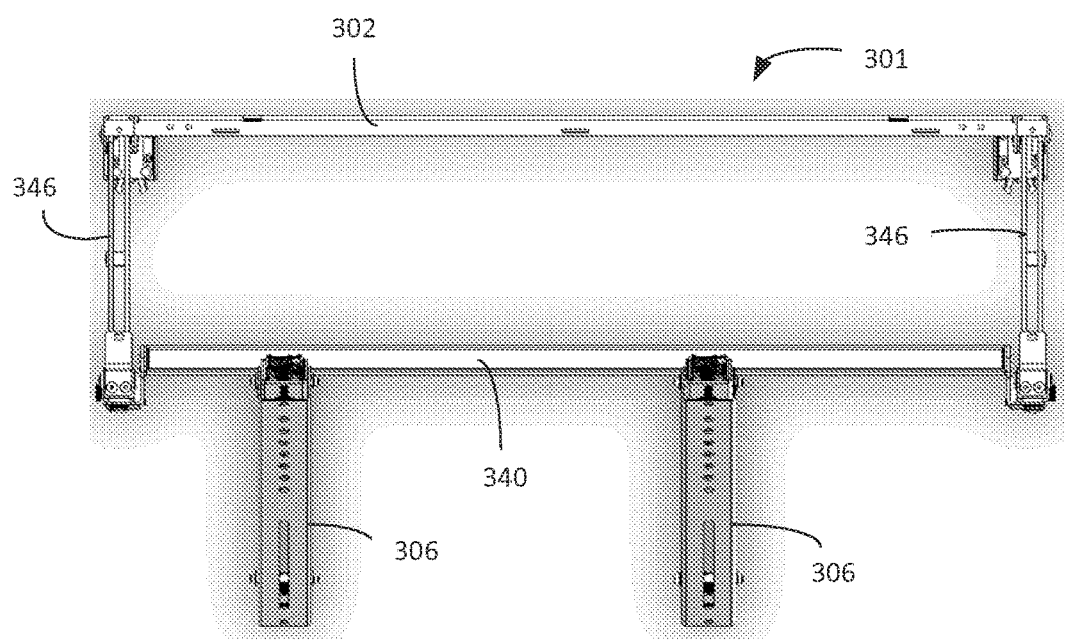
FIG. 35 is a top view of the mounting system of FIG. 32.
Figure 34:
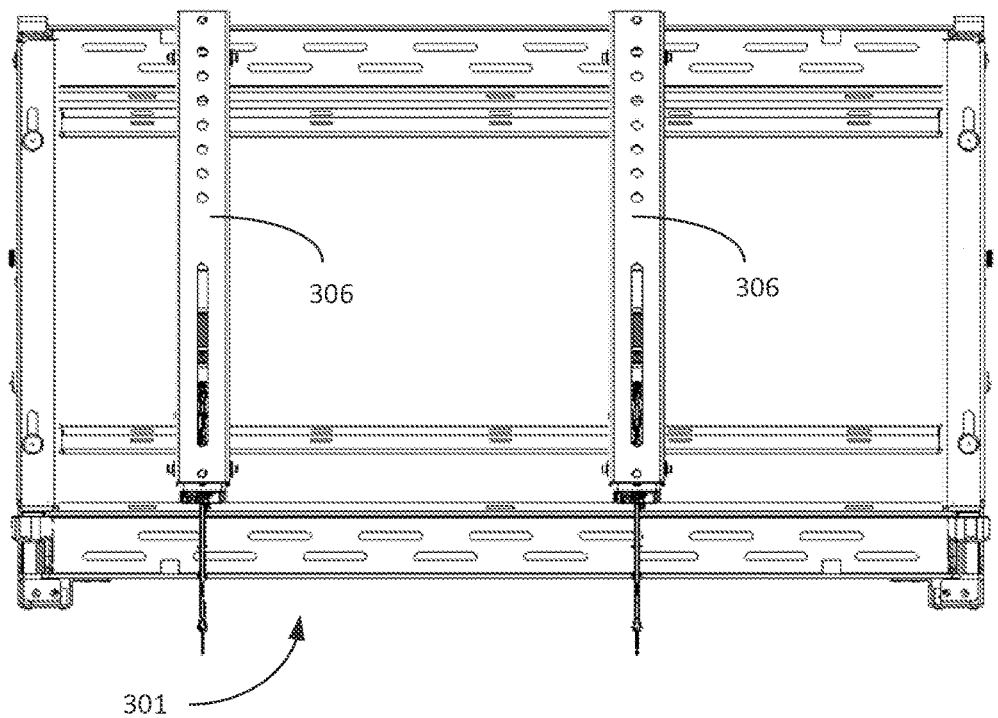
FIG. 34 is a front view of the mounting system of FIG. 32.
Figure 36:
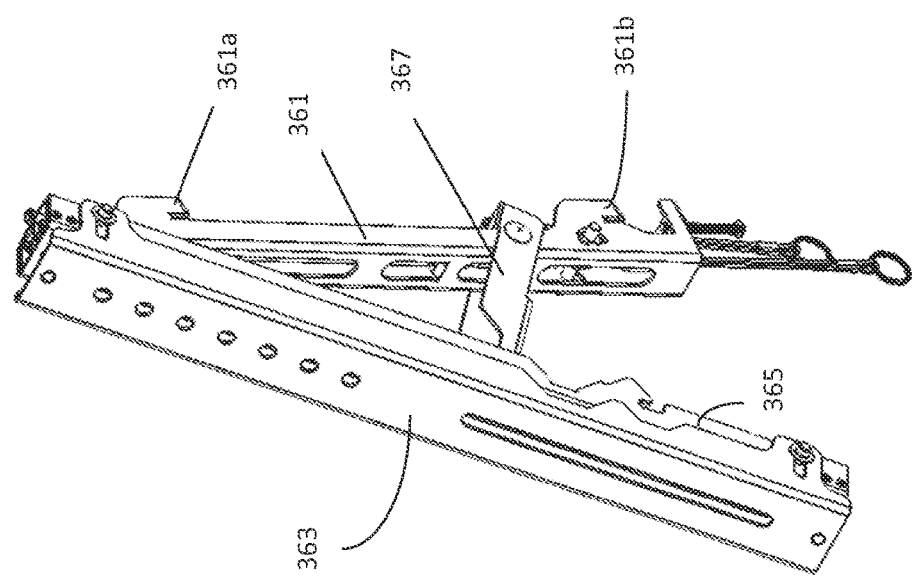
FIG. 36 is a perspective view of an exemplary embodiment of a device mount for use in a mounting system, such as the mounting system of FIG. 28.

As shown in FIG. 32, the surface mount 302 includes a pair of spaced apart cross members 321 interconnected with a pair of spaced apart side members 322 to form a generally rectangular frame. The members of the surface mount 302 may be configured similar to, the same as, or different than the members of the surface mount 102.

As shown in FIGS. 32 and 33, the extension assembly 304 includes a movable mount 340 and two spaced apart arm assemblies 346 configured to extend the movable mount 340. As shown, the movable mount 340 includes a pair of spaced apart cross members 341 interconnected with a pair of spaced apart side members 342 to form a generally rectangular frame. The members of the movable mount 340 may be configured similar to, the same as, or different than the members of the movable mount 140.

Each arm assembly 346 includes a first arm 347 and a second arm 348, which may be pivotally coupled together at a pivot, such that the first and second arms may rotate about the pivot relative to one another. As shown in FIG. 33, the first arm 347 includes a first portion 347a (e.g., end) pivotally coupled to a member of the surface mount 302, and a second portion 347b (e.g., end) movably and pivotally coupled to a member of the movable mount 340. For example, the second portion 347b may be directly coupled or indirectly coupled (e.g., through a pivot member) to a slot of the movable mount 340. As shown, the second arm 348 includes a first portion 348a (e.g., end) movably and pivotally coupled to a member of the surface mount 302, and a second portion 348b pivotally coupled to a member of the movable mount 340. For example, the first portion 348a may be directly coupled or indirectly coupled (e.g., through a pivot member) to a slot in the surface mount 302.

The mounting system 301 may optionally include a latch 380 and a catch 390 configured to secure the system in place, such as in a position (e.g., the retracted position). As shown in FIGS. 47 and 48, the mounting system 301 includes a latch 380 coupled to a side member 342 of the movable mount 340, and the system further includes a catch 390 coupled to a side member 322 of the surface mount 302. The latch 380 is configured to detachably engage the catch 390, such as to retain the mounting system 301 in the retracted position until a threshold force is applied to separate the latch and catch to move the movable mount 340 to an extended position relative to the surface mount 302.

As shown in FIG. 47, the latch 380 includes a first portion 381 (e.g., an attachment portion) that is configured to couple the latch 380 to a member of the movable mount 340, such as a side member 342. The first portion 381 may include one or more openings configured to receive connecting elements to couple the latch 380 to the side member 342. The latch 380 also includes a second portion 382 (e.g., retaining portion) that is configured to engage the catch 390. The second portion 382 may include a pair of surfaces (e.g., two opposing side surfaces) that may be retained by the catch 390 when the latch 380 engages the catch 390. The latch 380 may optionally include a third portion 383 (e.g., an intermediate portion) that interconnects the first and second portions. As shown, the third portion 383 extends from a bottom of the first portion 381 in a transverse direction (compared to the first portion 381), and the second portion 382 extends from an end of the third portion 383, such as in a transverse direction (compared to the third portion 383), which may be parallel to the first portion 381.

As shown in FIG. 47, the catch 390 includes a frame 391 and two spaced apart arms 392 that are pivotally coupled to the frame 391. Each arm 392 may be pivotally coupled to the frame 391 via a pivot 393. The arms 392 are spaced apart by a distance, which may be varied upon rotation of the arms 392. Each arm 392 may be configured to rotate in a first (e.g., engaging) direction and a second (e.g., disengaging) direction. The arms 392 are configured to engage the second portion 382, such as the side surfaces of the second portion 382, when the latch 380 engages the catch 390. Each arm 392 may be biased, such as in the engaging direction. The catch 390 may include a biasing member, such as a spring, that is configured to bias one or more arms 392 in the engaging direction. The biasing member may help the catch 390 retain the latch 380 when engaged by imparting a force on the arms 392, which is then imparted into the latch 380.

The mounting system 301 may optionally include a lock that is configured to lock the system in place, such as in a position. As shown in FIG. 49, the mounting system 301 includes a locking member 313 that is configured to lock the mounting system 301 in its retracted position. The locking member 313 includes a first portion 313a and a second portion 313b. The first portion 313a is coupled to the movable mount 340. As shown, two connecting elements are used to couple the locking member 313 to the side member 342. The second portion 313b is coupled to the surface mount 302 to lock the mounting system 301 in the retracted position. As shown, the second portion 313b includes an opening 313c that is configured to receive a connecting element (not shown) to couple the locking member 313 to the side member 322. The mounting system 301 may be moved to the extended position, once the connecting element coupling the locking member 313 to the side member 322 is removed (or alternatively, once the connecting elements coupling the locking member 313 to the side member 342 are removed).

FIGS. 36-40 illustrate an exemplary embodiment of a device mount 306. The device mount 306 includes a mount engaging member 361 (e.g., engagement member), a device mount member 363, a pivot member 365, and a support member 367. The mount engaging member 361 is configured to detachably couple to the movable mount 340. As shown in FIGS. 50-53, the mount engaging member 361 includes an upper hook 361a configured to engage the channel of the upper cross member 341 of the movable mount 340 and a lower hook 361b configured to engage the channel of the lower cross member 341 of the movable mount 340. As shown in FIGS. 37B and 37C, the mount engaging member 361 may be configured as a channel having a generally C-shaped cross section that includes a pair of spaced apart upper hooks 361a and a pair of spaced apart lower hooks 361b.

The mount engaging member 361 may be pivotally coupled to the pivot member 365. For example, an end 361c of the mount engagement member 361 may be pivotally coupled to the pivot member 365 through a pivot to allow relative rotation between the mount engagement member 361 and pivot member 365. The pivot may be a stud, post, rod, bushing, sleeve, or any suitable element that allows for relative rotation between two other elements. The pivot member 365 may pivot (e.g., tilt) relative to the mount engagement member 361 between a first (e.g., collapsed, retracted, etc.) position and a second (e.g., tilted, extended, etc.) position. FIGS. 36-40 illustrate the pivot member 365 (and the device mount member 363 coupled thereto) in its tilted position relative to the mount engaging member 361.

Figure 37A:
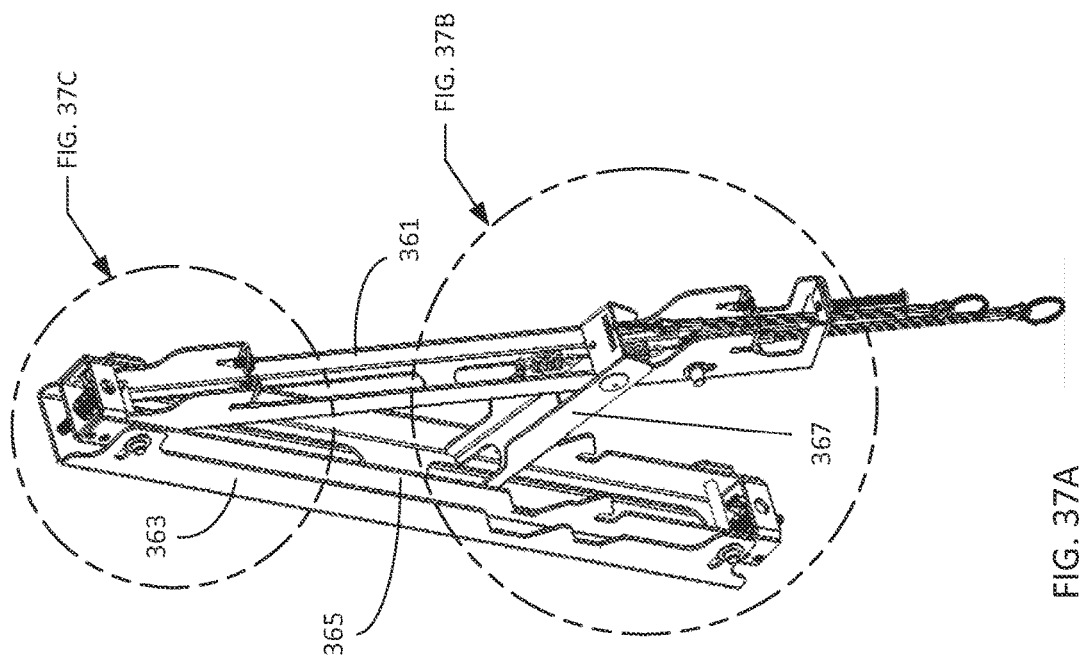
FIG. 37A is another perspective view of the device mount of FIG. 36.
Figure 37C:
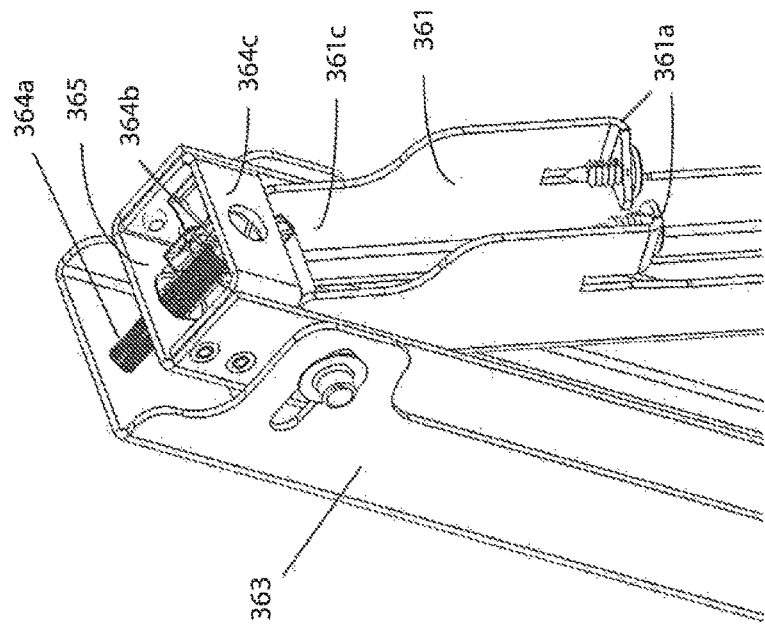
FIG. 37C is another detail view of the device mount of FIG. 37A.
Figure 37B:
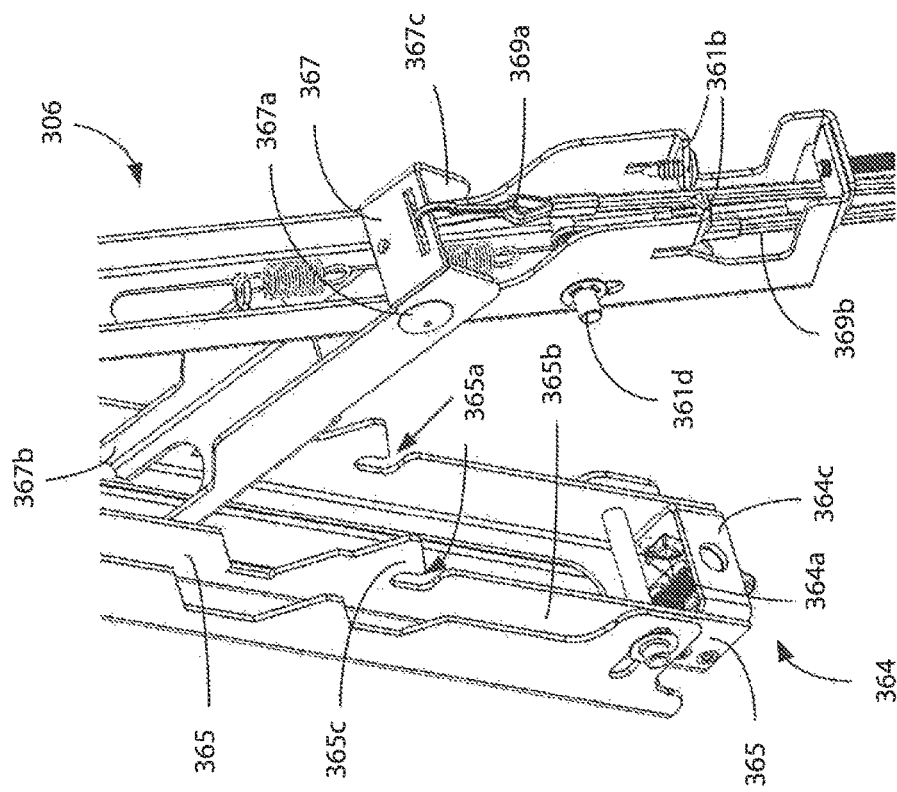
FIG. 37B is a detail view of the device mount of FIG. 37A.
Figure 40:
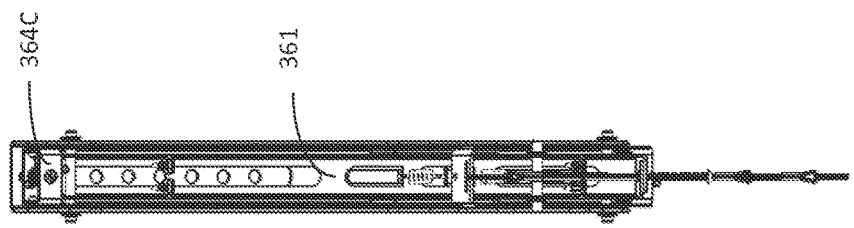
FIG. 40 is a rear view of the device mount of FIG. 36.
Figure 39:
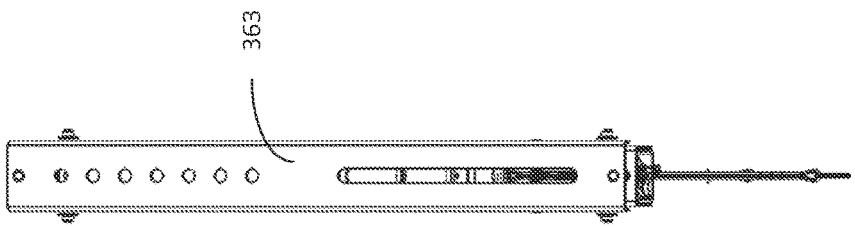
FIG. 39 is a front view of the device mount of FIG. 36.
Figure 38:
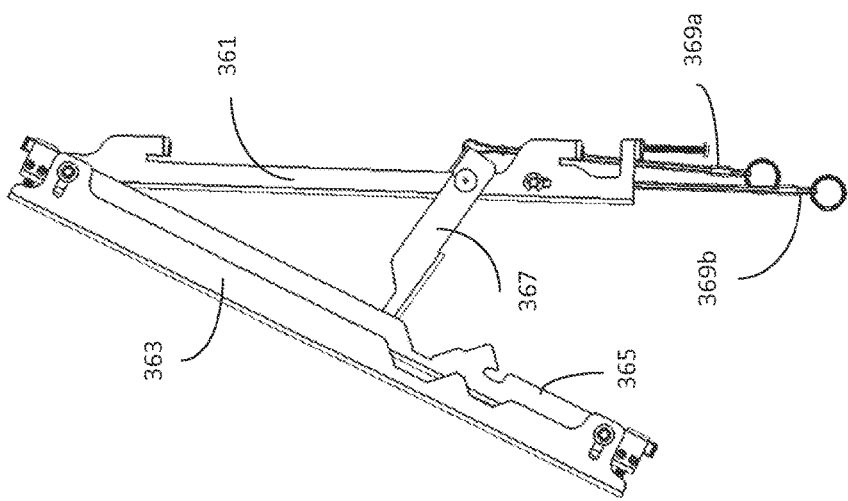
FIG. 38 is a side view of the device mount of FIG. 36.
Figure 42:
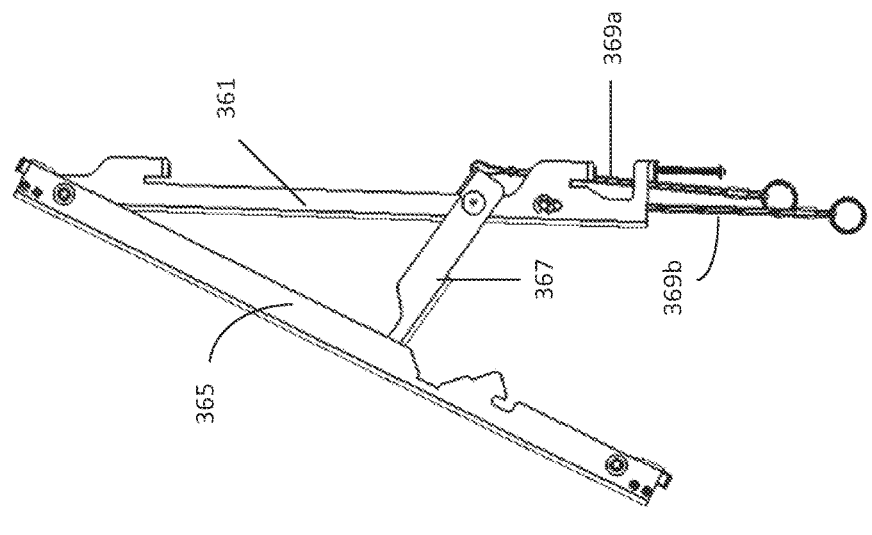
FIG. 42 is a side view of the portion of the device mount of FIG. 41.
Figure 41:
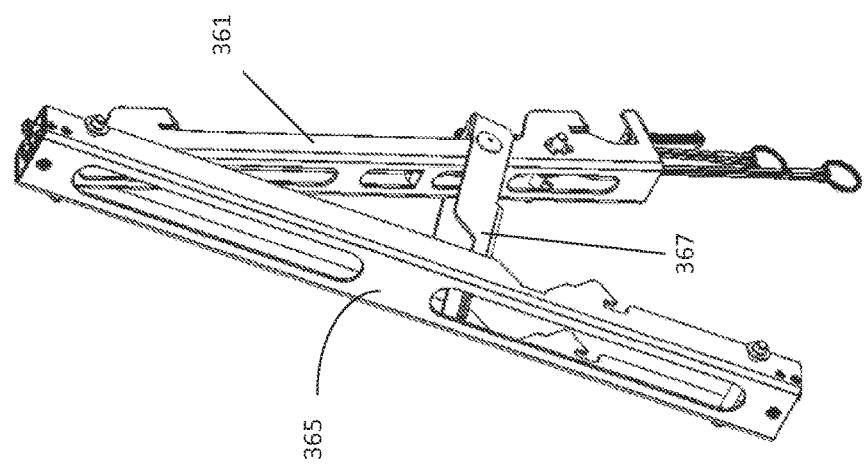
FIG. 41 is a perspective view of a portion of the device mount of FIG. 36.
Figure 51:
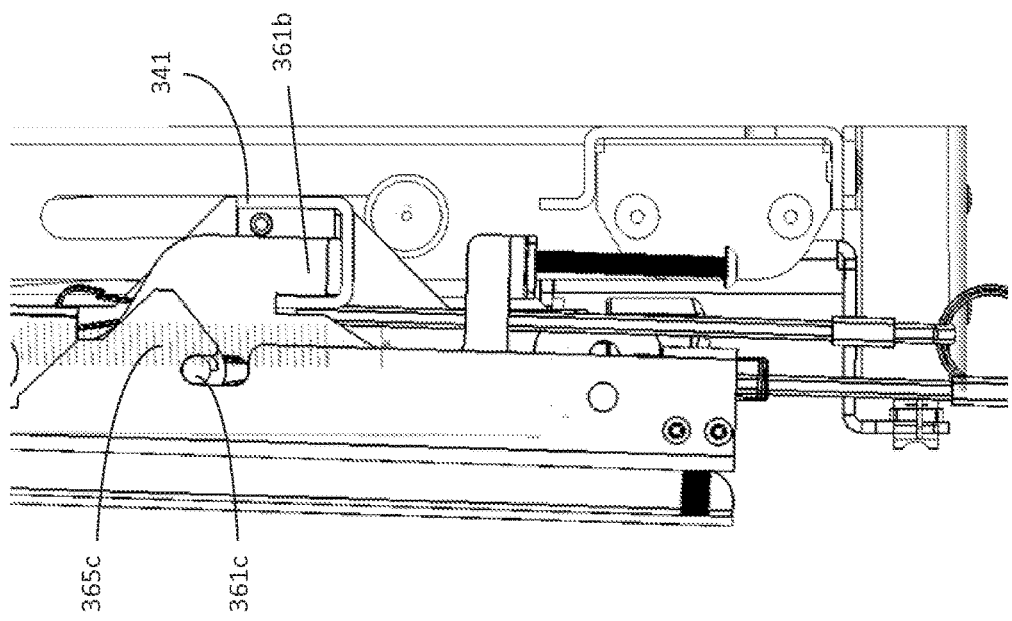
FIG. 51 is a side cross-sectional view of the portion of the device mount FIG. 50.
Figure 50:
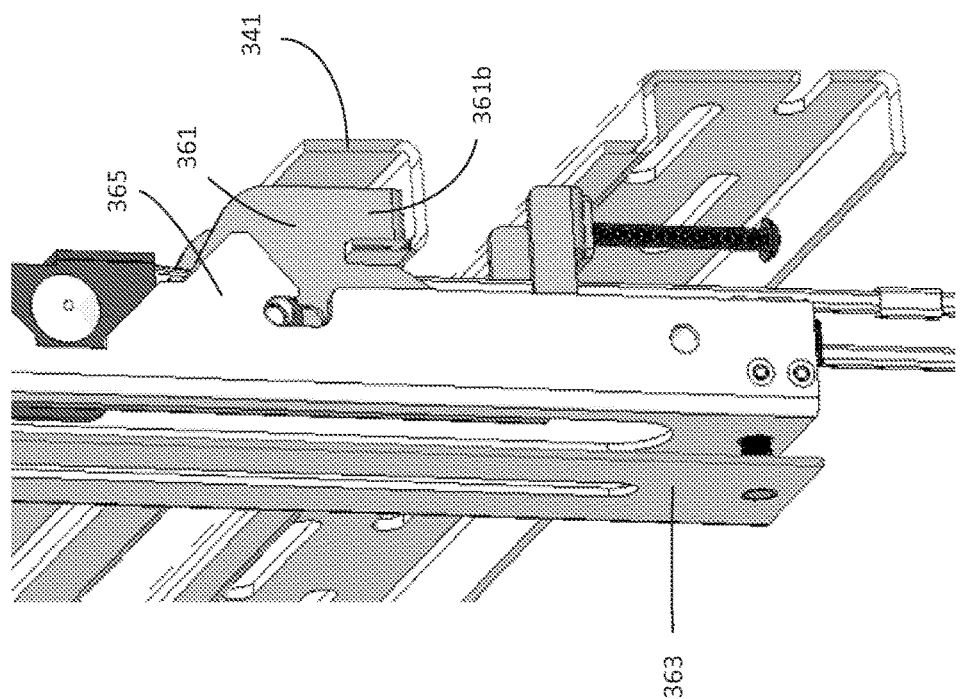
FIG. 50 is a perspective cross-sectional view of another portion of the device mount of FIG. 36.
Figure 53:
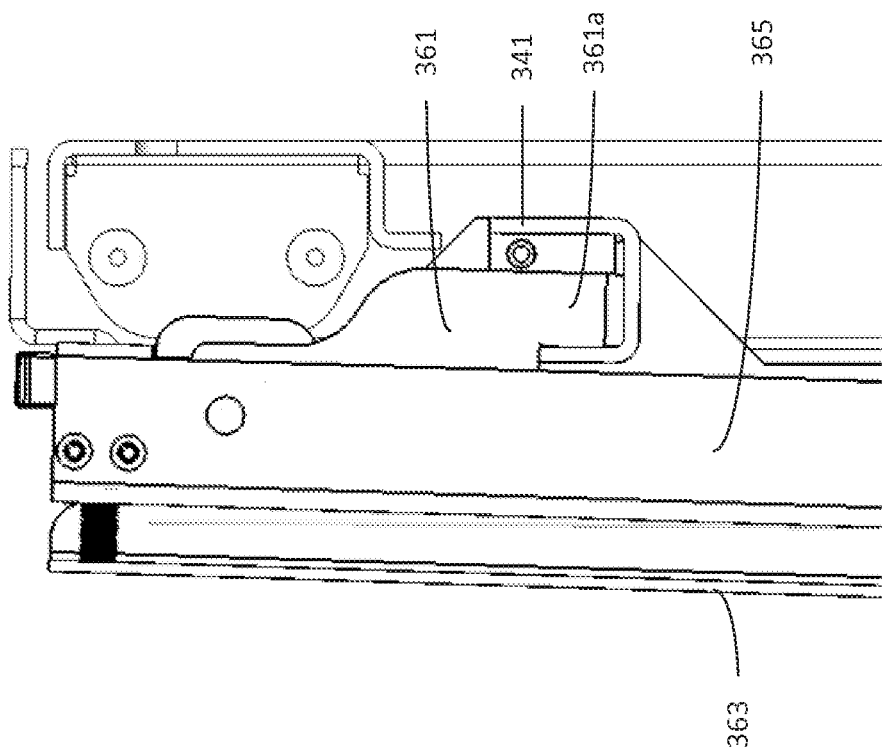
FIG. 53 is a side cross-sectional view of the portion of the device mount FIG. 52.
Figure 52:
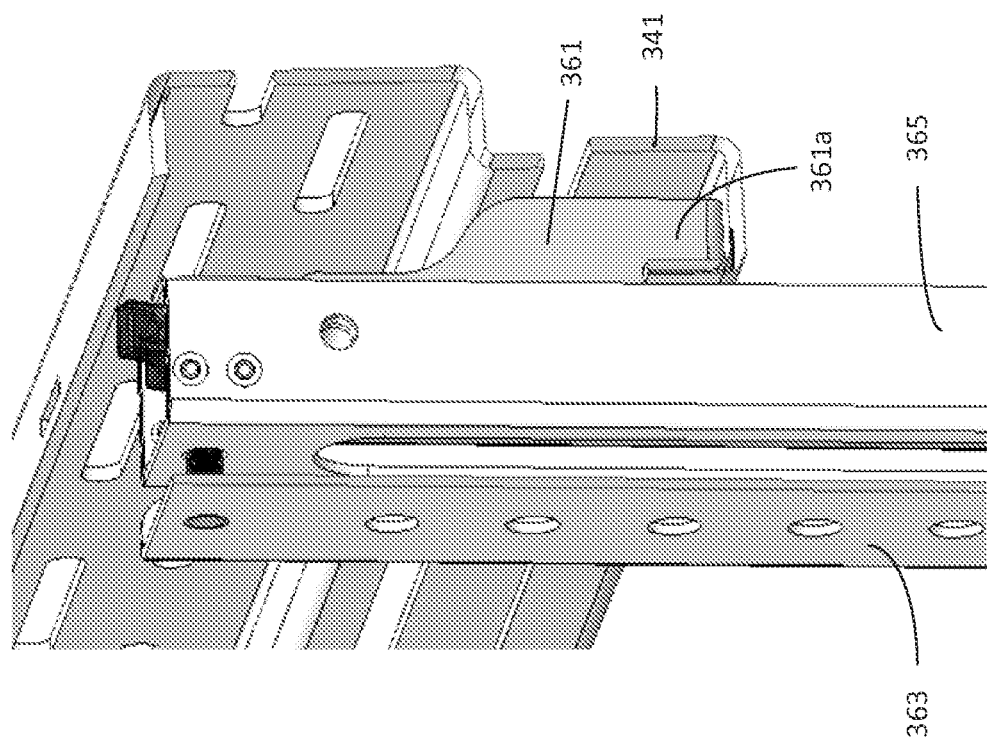
FIG. 52 is a perspective cross-sectional view of another portion of the device mount of FIG. 36.
Figures 54, 55:
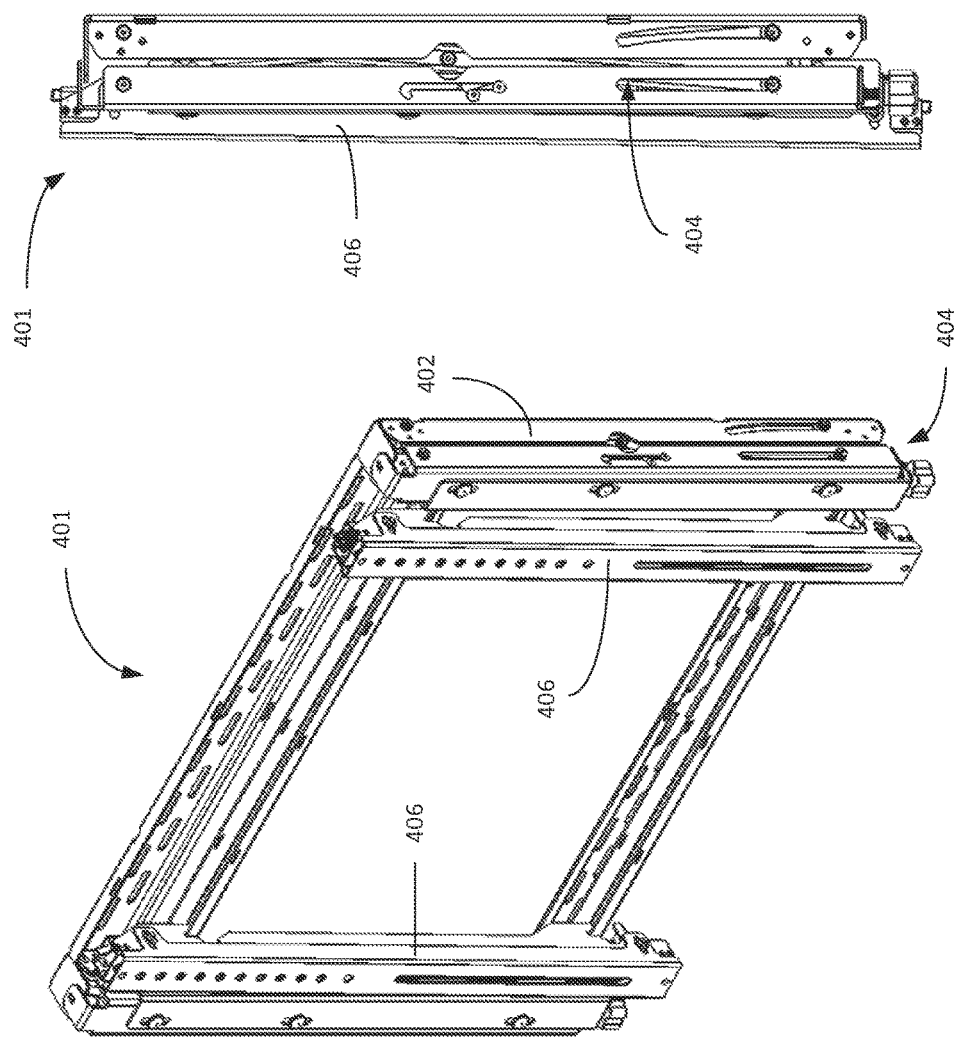
FIG. 54 is a perspective view of a mounting system, according to yet another exemplary embodiment, shown in the retracted position.
FIG. 55 is a side view of the mounting system of FIG. 54.
Figure 57:
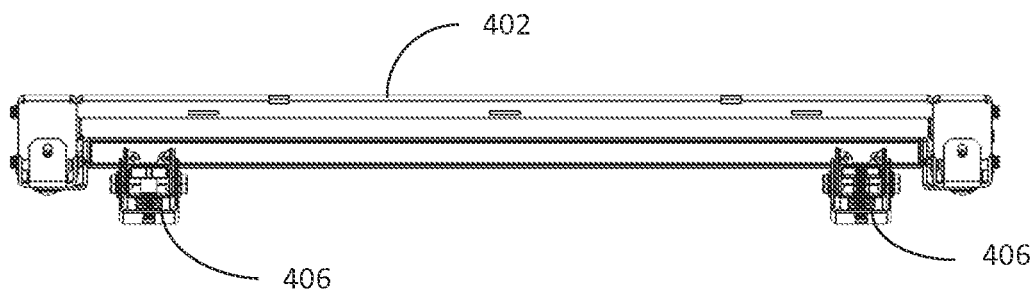
FIG. 57 is a top view of the mounting system of FIG. 54.
Figure 56:
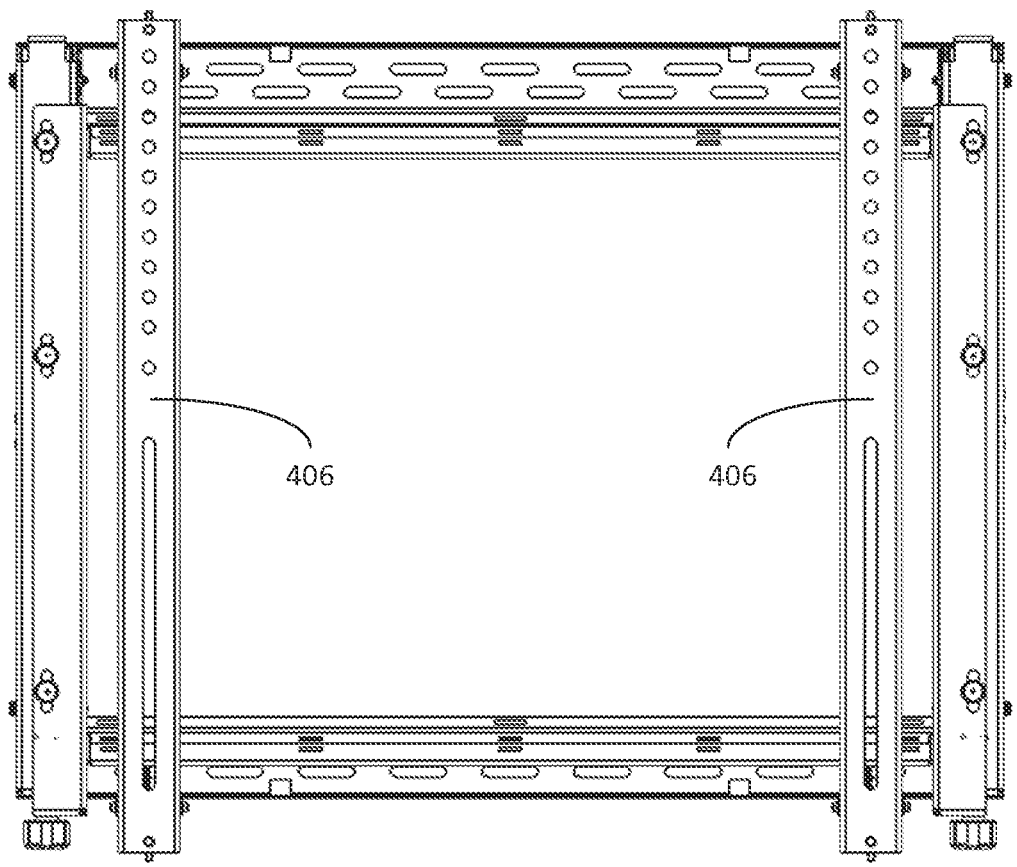
FIG. 56 is a front view of the mounting system of FIG. 54.

The mount engagement member 361 and the pivot member 365 may include mating features that help secure the members together when in the collapsed position. As shown in FIG. 37B, the mount engagement member 361 may include a post 361d that is configured to engage a slotted opening 365a in a wall 365b of the pivot member 365 to secure the members together when in the collapsed position. The slotted opening may include a first portion (e.g., leading portion) that extends in a circumferential direction related to the pivot between the mount engagement member 361 and the pivot member 365, and may further include a second portion (e.g., a transverse portion) that extends in a radial direction toward the pivot from the first portion (e.g., at a trailing end thereof). The two portions of the slotted opening 365a allow the post 361d to enter the opening through the first portion, then move in a radial direction in the second portion, where a detent member 365c may retain the post 361d. The detent member 365c may include an exterior surface that is angled to direct the post 361d into the first portion of the slotted opening 365a. The post 361d may be biased in a direction. For example, the device mount 306 may include a biasing member that is configured to bias the post 361d in the radial direction (when in the opening 365a) or in a longitudinal direction (of the mount engagement member 361 when not in the opening 365a), such as in the locking direction (e.g., the upward direction shown in FIG. 37B).

The device mount member 363 is coupled to the pivot member 365. As shown in FIGS. 36-40, the device mount member 363 is movably (e.g., pivotally, slideably, etc.) coupled to the pivot member 365 at an upper pivot (which may be the same pivot between the pivot member 365 and the mount engagement member 361) and at a lower pivot. The device mount member 363 may be moved relative to the pivot member 365 about the upper pivot and/or the lower pivot, such that the device mount member 363 may slide relative to the pivot member 365 when moved at both ends (i.e., about both pivots) or the device mount member 363 may pivot relative to the pivot member 365 when moved at one end. The device mount member 363 may include an upper opening 363a (e.g., slot) that is provided in a side wall 363c and is configured to receive the upper pivot. The device mount member 363 may also include a lower opening 363b (e.g., slot) that is provided in the side wall 363c and is configured to receive the lower pivot. The device mount member 363 may include a base 363d that is provided between two spaced apart walls 363c, where the base 363d includes one or more holes (e.g., openings) that are configured to secure a display device to the device mount member 363 through one or more connecting elements.

The device mount 306 may include one or more adjusting members 364 that are configured to provide adjustment between the device mount member 363 and the pivot member 365. As shown in FIGS. 43 and 44, an adjusting member 364 may be provided at both an upper portion of the device mount 306 (e.g., between an upper portion of the device mount member 363 and an upper portion of the pivot member 365) and at a lower portion of the device mount 306 (e.g., between a lower portion of the device mount member 363 and a lower portion of the pivot member 365). As shown, each adjusting member 364 includes a threaded portion 364a and a head 364b (e.g., a knob). The threaded portion 364a is coupled to a portion of the pivot member 365 (e.g., a base thereof) through a threaded connection, and an end of the threaded portion 364a contacts a surface (an interior surface) of the device mount member 363, such that upon rotation of the adjusting member 364 in a first rotational direction, the end of the threaded portion 364a moves the device mount member 363 away from the pivot member 365. Rotation of the adjusting member 364 in the opposite rotational direction moves the end of the threaded portion 364a toward the pivot member 365, such as to allow the device mount member 363 to be moved toward the pivot member 365. The head 364b may be configured as a knob to make it easier for a user to rotate the adjusting member 364. Each adjusting member 364 may optionally include a retaining bracket 364c that is configured to retain the adjusting member 364 in place between the retaining bracket 364c and the pivot member 365.

The support member 367 may be pivotally coupled to the mount engagement member 361 at a pivot 367a. As shown in FIG. 37B, the support member 367 includes a first end 367b and a second end 367c. The first end 367b is configured to contact the pivot member 365, such as an interior surface thereof, to move the pivot member 365 (and the device mount 306) to the tilted position from the collapsed position upon rotation of the support member 367. The second end 367c includes a feature (e.g., an opening) that is configured to operatively connect to a first actuator 369a. As shown in FIG. 37B, the first actuator 369a includes an end that is operatively coupled to the second end 367c of the support member 367 (e.g., through a slotted opening), so that the first actuator 369a may be used (e.g., pulled) by a user to rotate the support member 367 about the pivot 367a causing the first end 367b to rotate the pivot member 365 relative to the mount engagement member 361.

Each device mount 306 may include one or more additional actuators. As shown in FIG. 37B, the device mount 306 includes a second actuator 369b that is configured to move the post 361d. For example, an end of the second actuator 369b may be operatively coupled to the post 361d, such that when a user moves (e.g., pulls on) the second actuator 369b, the post 361d is moved from a first position (e.g., locking position, engaging position, etc.) to a second position (e.g., unlocking position, disengaging position). When coupled to the pivot member 365, the post 361d may be moved (e.g., slid, translated, etc.) in the longitudinal direction (e.g., radial direction when coupled to the pivot member 365) to move the post 361d from within the second portion of the slot (e.g., from its locking position) into the first portion of the slot (e.g., into its non-locking position). Thus, the user must apply a threshold force to the second actuator 369b to overcome the biasing force on the post 361d from the biasing member in order to move the post 361d into the unlocked (e.g., non-locking) position.

FIGS. 54-66 illustrate another exemplary embodiment of a mounting system 401. The mounting system 401 includes a surface mount 402, an extension assembly 404, and two spaced apart device mounts 406. The surface mount 402 may be detachably affixed to a mounting surface through one or more connecting elements. The surface mount 402 includes an attachment surface that is configured to contact the mounting surface when the surface mount 402 is attached thereto. A display device may be detachably affixed to the one or more device mounts 406, such as through one or more connecting elements. Each device mount 406 may be detachably affixed to the extension assembly 404. The extension assembly 404 is adjustable, such as extendible between a retracted position and an extended position, to allow relative adjustment of each device mount 406 relative to the surface mount 402 to adjust the configuration (e.g., alignment, location, etc.) of the display device coupled to the mounting system 401. Each device mount 406 may be adjustable, such as relative to the extension assembly 404 to provide additional adjustment of the display device coupled to the mounting system 401.

The surface mount 402 may include one or more members. For example, the extension assembly 404 may include a movable mount 440 including one or more members. Also, for example, the extension assembly 404 may also include at least one arm assembly 446 that includes at least one arm to allow the movable mount 440 to be moved between its extended and retracted positions.

Figure 64:
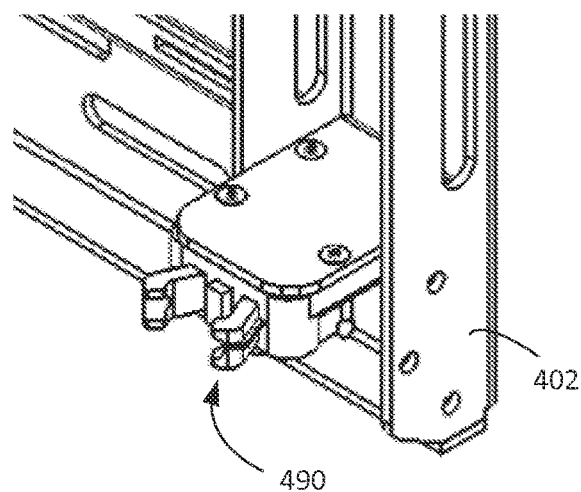
FIGS. 64 and 65 are perspective views of portions of the mounting system of FIG. 54.
Figure 65:
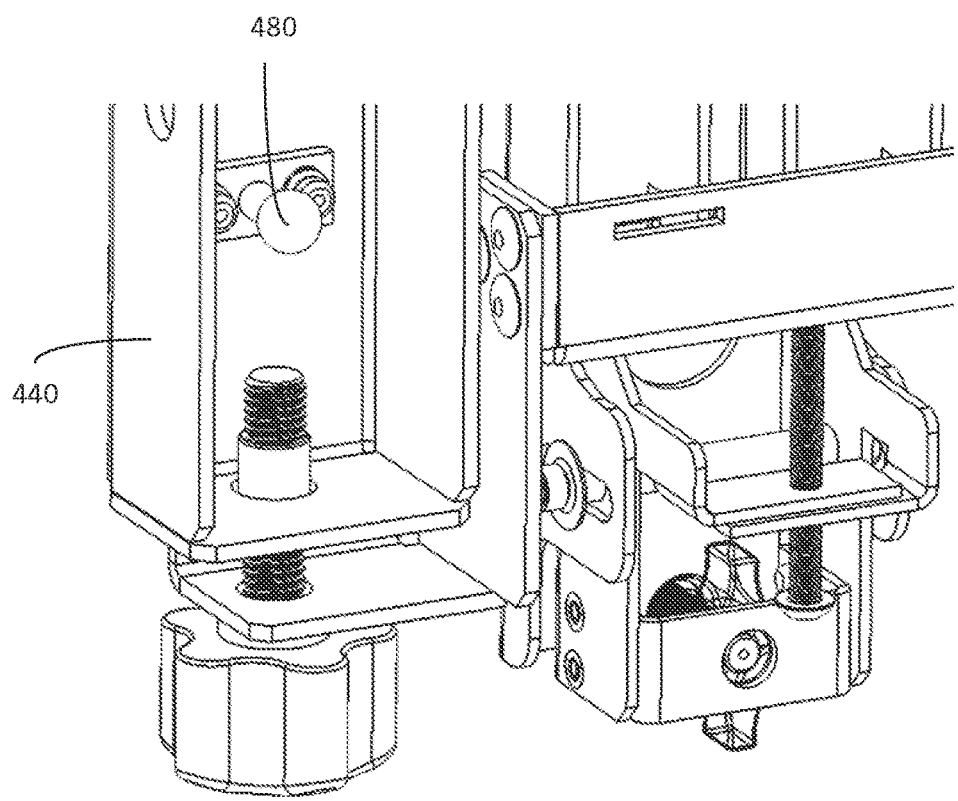
Figure 66:
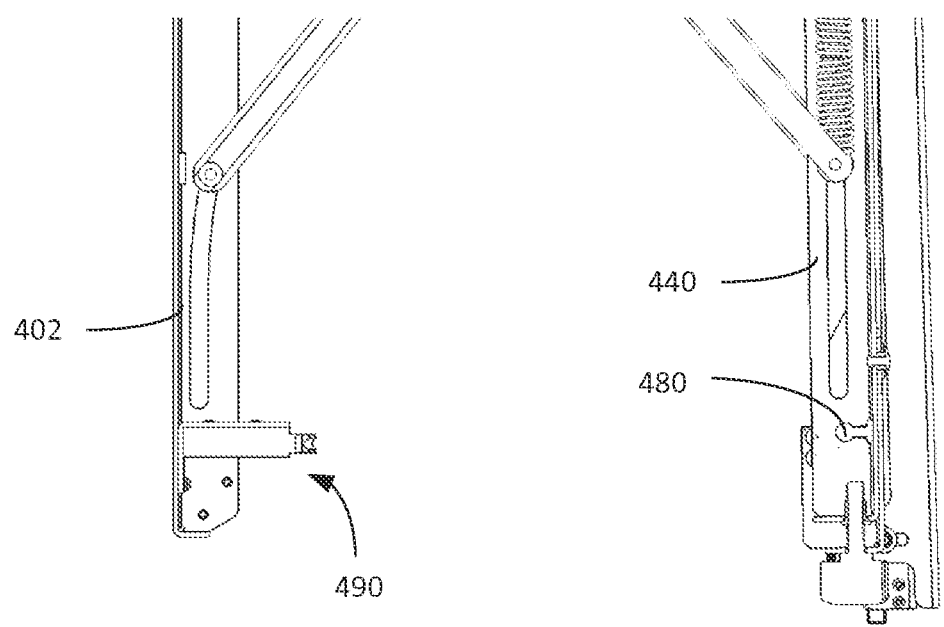
FIG. 66 is a side cross-sectional view of a portion of the mounting system of FIG. 54.

The mounting system 401 may include a catch and a latch to help retain the system in a position, such as the retracted position. FIGS. 64-66 illustrate an exemplary embodiment of a latch 480 and a catch 490 that are configured to detachably engage one another to secure the system in the retracted position. As shown, the catch 490 is configured generally the same as the catch 390. However, the catch 490 may be configured differently. The catch 490 is shown coupled to the surface mount 402, and the latch 480 is shown coupled to the movable mount 440. According to another embodiment, the catch 490 is coupled to the movable mount 440, and the latch 480 is coupled to the surface mount 402.

As shown, the latch 480 includes a sphere shaped element that is configured to engage the catch 490 to secure them together. The latch 480 may also include a generally cylindrical portion that connects the spherical portion to a member of the movable mount 440. The cylindrical portion may have a smaller diameter than the spherical portion.

Figure 58:
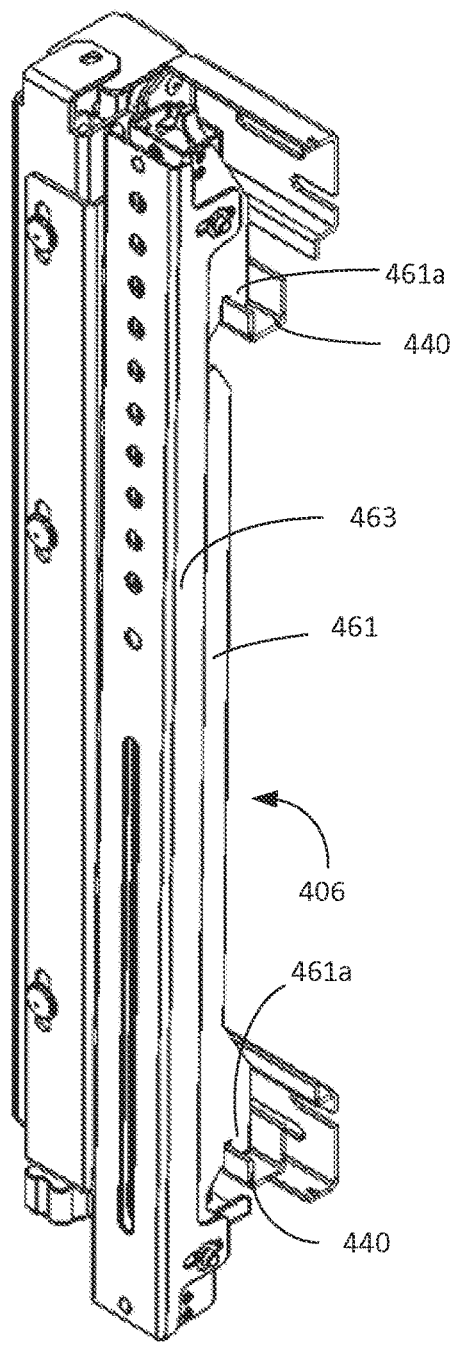
FIG. 58 is a perspective view of a portion of the mounting system of FIG. 54.
Figure 59:
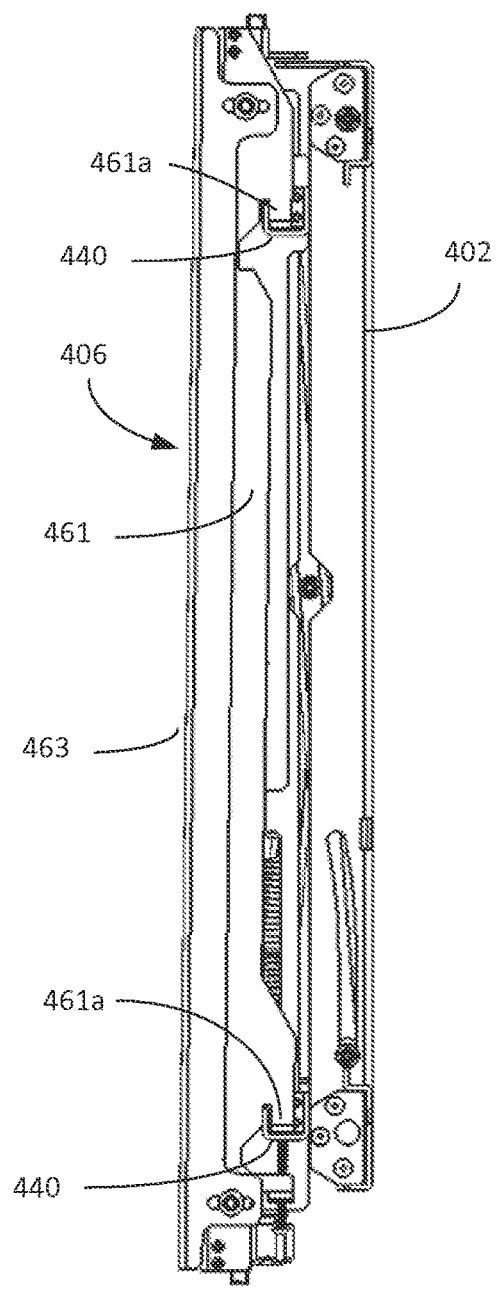
FIG. 59 is a side view of the portion of the mounting system of FIG. 58.
Figure 60:
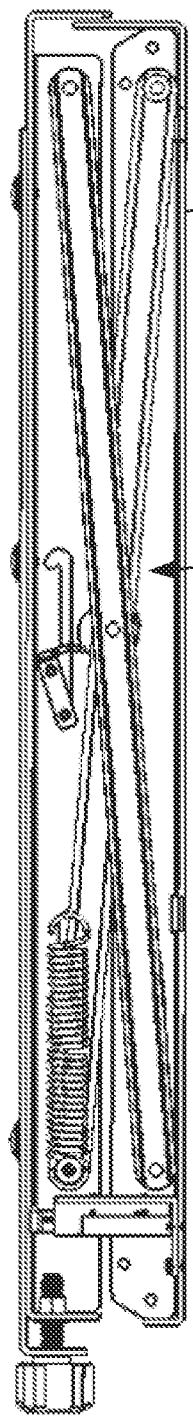
FIG. 60 is a cross-sectional view of the mounting system of FIG. 54.
Figure 61:
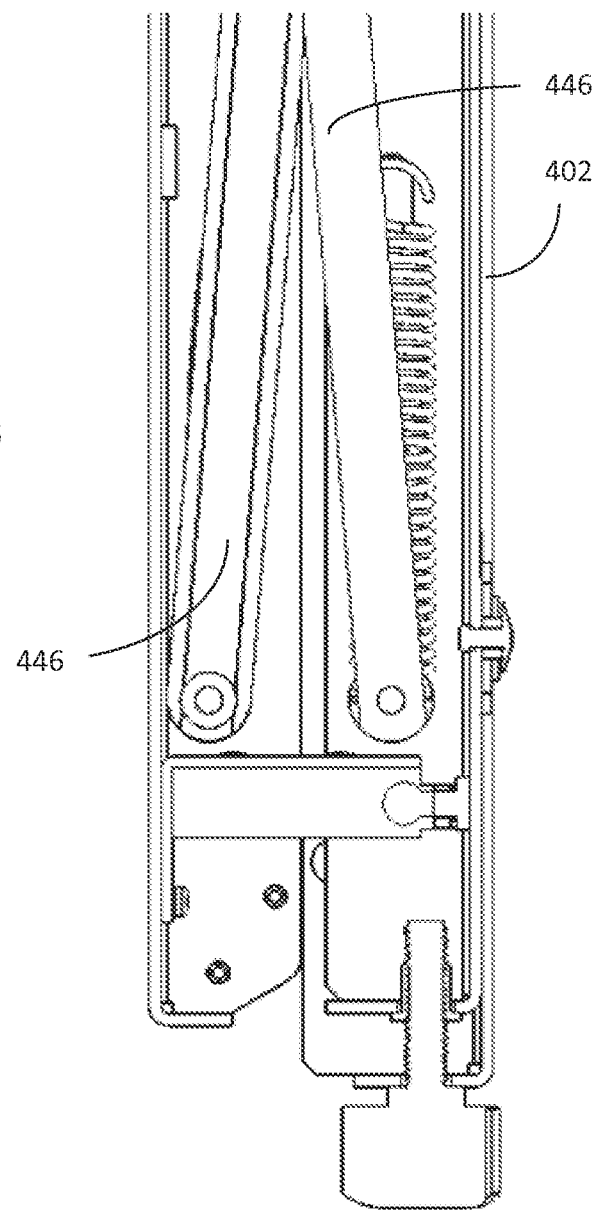
FIG. 61 is another cross-sectional view of the mounting system of FIG. 54.
Figure 63:
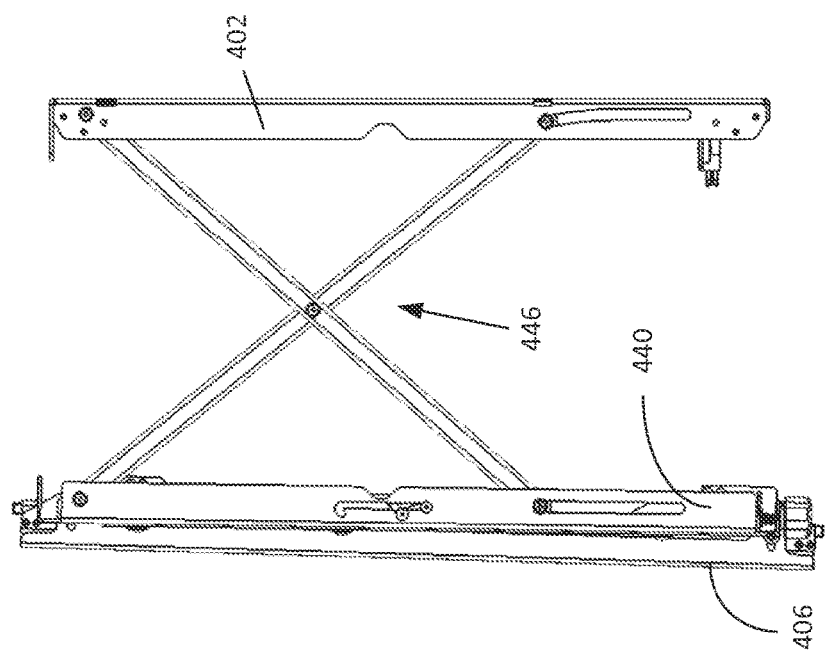
FIG. 63 is a side view of the mounting system of FIG. 62.
Figure 62:
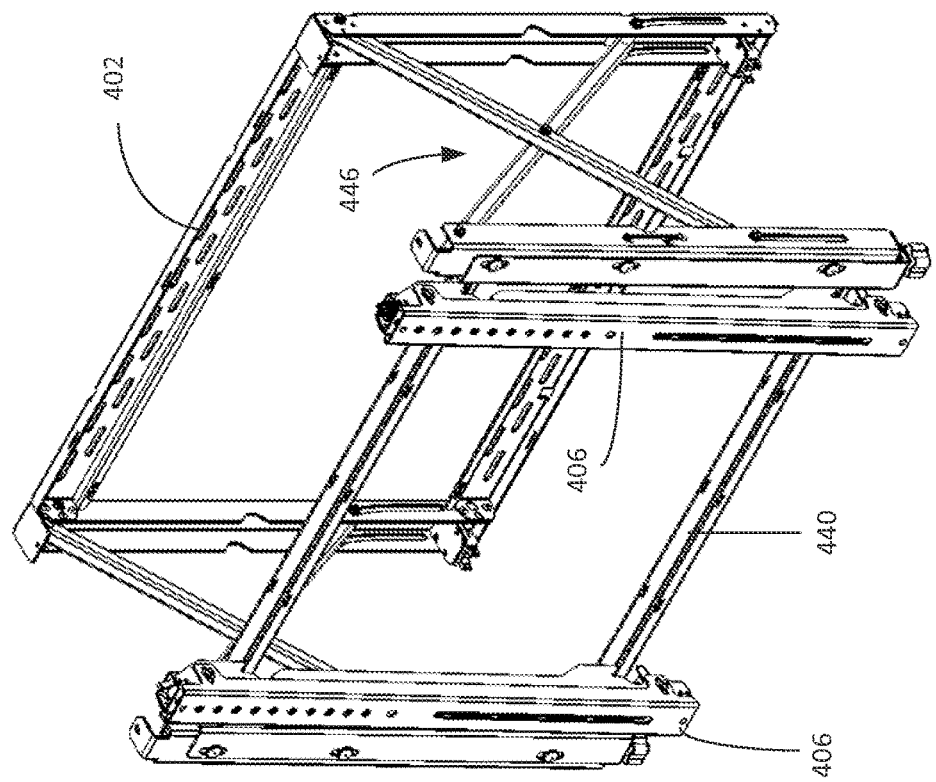
FIG. 62 is a perspective view of the mounting system of FIG. 54, shown in the extended position.

As shown in FIGS. 58 and 59, each device mount 406 includes a mount engagement member 461 and a device mount member 463. The device mount member 463 is adjustably coupled to the mount engagement member 461 through an upper connecting element and a lower connecting element. The mount engagement member 461 includes features 461a (e.g., hooks) that are configured to engage channels of the movable mount 440 to secure each device mount 406 to the movable mount 440.

Figure 67:
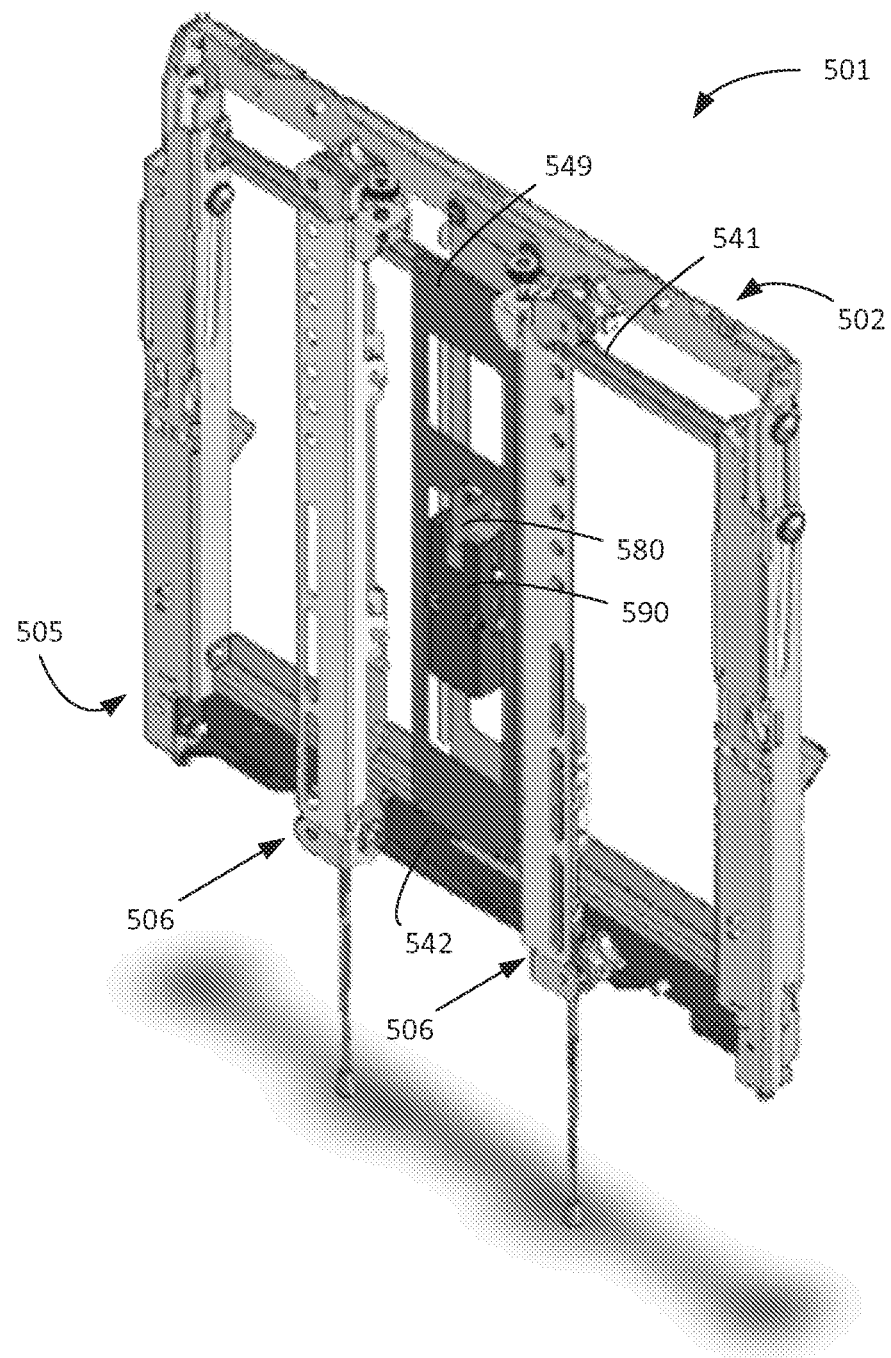
FIG. 67 is a perspective view of a mounting system constructed in accordance with another exemplary embodiment, where the mounting system is shown in a collapsed or retracted position.
Figure 68:
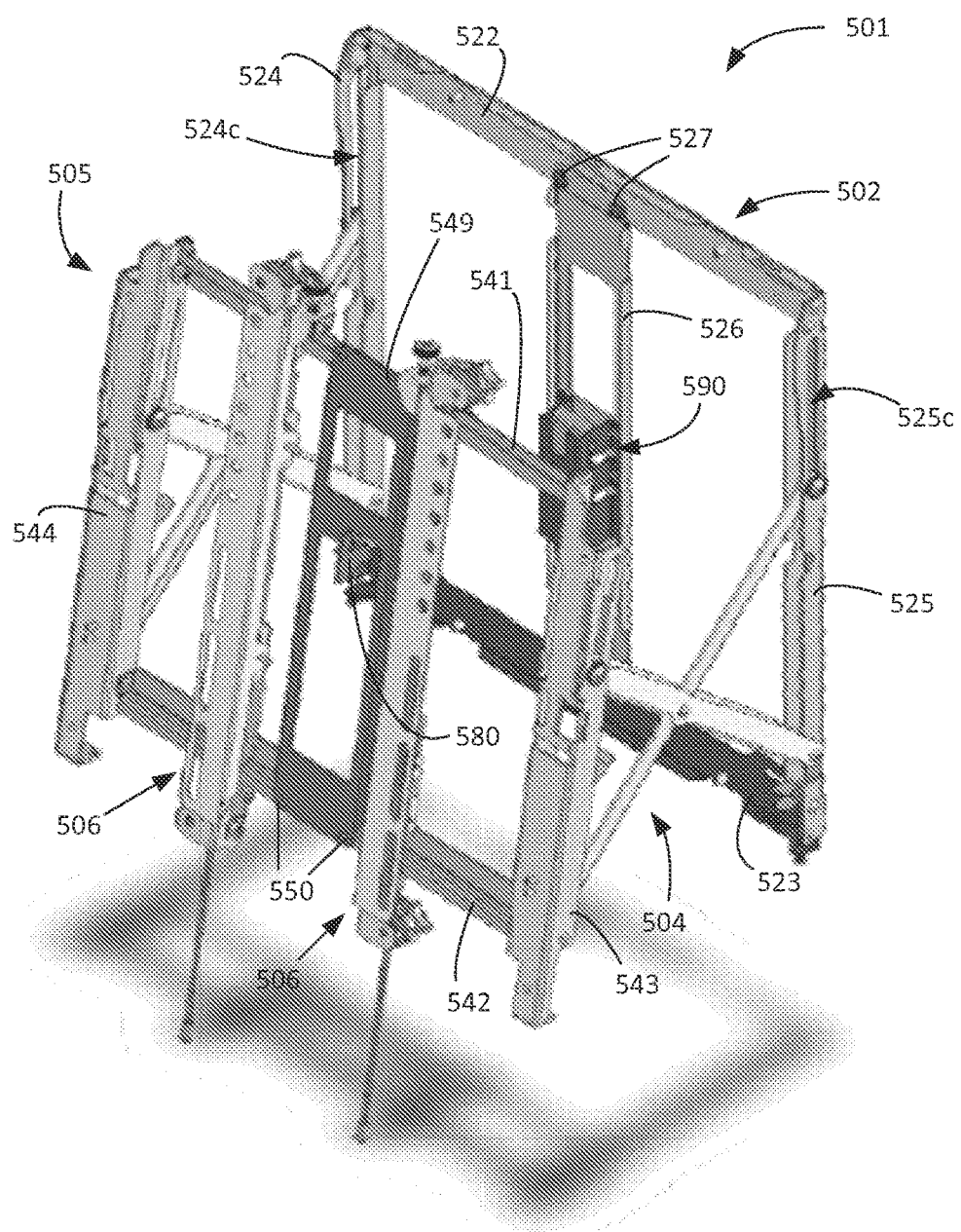
FIG. 68 is a perspective view of the mounting system of FIG. 67 when in a non-collapsed or extended position.

FIGS. 67 and 68 illustrate an exemplary embodiment of a mounting system 501 that includes a surface mount 502, an adjustment (e.g., extension) assembly 504, a support mount 505, and at least one device mount 506. The surface mount 502 is configured to be operatively coupled to an attachment (e.g., mounting) surface (e.g., a wall, fixture, etc.) that supports the mounting system 501. The support mount 505 is movable between a collapsed position (FIG. 67) and an extended position (FIG. 68) relative to the surface mount 502 via the adjustment assembly 504, which is connected to the surface mount 502 and the support mount 505. The mounting system 501 may include a locking device (e.g., latch assembly) that is configured to selectively lock (e.g., secure) the system in a position, such as the collapsed position. The locking device is discussed in more detail below. Each device mount 506 may be adjustably coupled to the support mount 505, such as to allow the device mount 506 to be moved relative to the support mount 505 (e.g., in a lateral direction that is substantially transverse to a direction that the support mount 505 moves when extending or retracting relative to the surface mount 502).

The surface mount 502 may be configured similar to the other surface mounts described in this application. According to an exemplary embodiment, the surface mount 502 is configured basically the same as the surface mount 102, except where otherwise noted. The surface mount 502 includes an orthogonal member 526 (e.g., a vertical member) that extends between upper and lower cross members 522, 523, and is spaced apart from and provided between left and right side members 524, 525. The orthogonal member 526 is configured to be coupled to each of the upper and lower cross members 522, 523 via fasteners 527 (e.g., rivets) at spaced apart mounting locations. The orthogonal member 526 may be configured having a plate with two spaced apart side walls extending perpendicularly from the plate. Each end of the plate may include openings configured to accommodate the fasteners 527. The orthogonal member 526 may be configured to support part of the locking device, such as a latch or a catch. As shown in FIG. 68, the orthogonal member 526 supports a catch 590. Each side member 524, 525 includes an opening 524c, 525c the slideably supports a portion of the adjustment assembly 504. As shown, each opening 524c, 525c is a straight slot that allows an end of an arm of the adjustment assembly 504 to move linearly in the opening 524c, 525c when the adjustment assembly is 504 collapsed or expanded. Each side member 524, 525 is configured to be coupled to each cross member 522, 523 at least at one mounting location.

The support mount 505 may be configured similar to the other support mounts, movable mounts, and/or other similar mounts described in this application. According to an exemplary embodiment, the support mount 505 is configured basically the same as the movable mount 140, except where otherwise noted. The support mount 505 includes an orthogonal member 549 (e.g., a vertical member) that extends between upper and lower cross members 541, 542, and is spaced apart from and provided between left and right side members 543, 544. The orthogonal member 549 is configured to be coupled to each of the upper and lower cross members 541, 542 via fasteners 550 (e.g., rivets) at spaced apart mounting locations. The orthogonal member 549 may be configured having a plate with two spaced apart side walls extending perpendicularly from the plate. Each end of the plate may include openings configured to accommodate the fasteners 550. The orthogonal member 549 may be configured to support part of the locking device, such as a latch or a catch. As shown in FIG. 68, the orthogonal member 549 supports a latch 580 that is configured to releasably (e.g., detachably) engage the catch 590. Thus, the orthogonal member 549 of the support mount 505 may be configured to oppose the orthogonal member 526 of the surface mount 502 when in the collapsed position to allow the latch 580 to engage the catch 590 to secure the mounting system 501 in place.

Each device mount 506 may be configured similar to, the same as, or different than any other device mount disclosed in this application. For example, each device mount 506 may be configured substantially the same as the device mount 106 described above, except where otherwise noted.

The adjustment assembly 504 may be configured similar to, the same as, or different than any other adjustment assembly (e.g., extension assembly, arm assembly, etc.) disclosed in this application. For example, the adjustment assembly 504 may include a pair of spaced apart arm assemblies 546, which may be configured substantially the same as each arm assembly 146 described above, except where otherwise noted.

As noted above, the mounting system 501 may include a locking device that is configured to selectively secure the system in a position. As shown in FIGS. 67 and 68, the locking device includes the latch 580 and the catch 590, which are coupled to and supported by the orthogonal members 549, 526, respectively. By coupling the latch and catch to the opposing orthogonal members, the mounting system 501 may advantageously provide for easier engagement and disengagement of the latch 580 and catch 590, since the latch and catch should flex less compared to if they were cantilevered from one member (e.g., the upper or lower cross member). Flexing of the catch 590 and/or latch 580 during engagement may drive up the engagement/release efforts, since the flexing may create a binding effect, such as from a biasing force generated by the flexing of the element (s). Moreover, at least one of the orthogonal members 549, 526 may be adjustably coupled to the respective mount (i.e., the surface mount 502 or the support mount 505) to allow for the at least one member to be adjusted to advantageously align the catch 590 and the latch 580. For example, each orthogonal member 549, 526 may be configured to be adjustably coupled to the respective mount. This adjustment may also help provide for easier engagement and disengagement of the latch and the catch.

The latch 580 and the catch 590 may be configured similar to, the same as, or different than any other latch/catch disclosed in this application. For example, the latch 580 may be configured substantially the same as the latch 180, except where otherwise noted. Also, for example, the catch 590 may be configured substantially the same as the catch 190, except where otherwise noted.

FIGS. 69-82 illustrate an exemplary embodiment of a mounting system 601 that includes a surface mount 602, a support mount 605, and a latching device. The mounting system 601 may also include at least one device mount 606 and/or an adjusting device 604 movably coupling the support and surface mounts. The surface mount 602 is configured to be operatively coupled to an attachment (e.g., mounting) surface that supports the mounting system 601. The attachment surface may be a wall (e.g., vertical wall), a fixture, or any other suitable object that is cable of support the weight of the mounting system 601 and the weight of a display device (e.g., a flat-panel television) attached to the mounting system 601.

The surface mount 602 may be configured the same as, similar to, or different than the other surface mounts (e.g., the surface mount 102, 302, 402, 502) described in this application. According to an exemplary embodiment, the surface mount 602 is configured having a similar geometry (e.g., overall basic shape and features) as the surface mount 502, except the surface mount 602 is a unitary structure (i.e., formed of a single integrally formed element/member), rather than a plurality of separately formed elements that are coupled together, and where otherwise noted. The unitary surface mount 602 includes a generally rectangular frame having an orthogonal (e.g., a vertical) portion 626 that extends between a bottom of an upper portion 622 and a top of a lower portion 623 of the frame. The orthogonal portion 626 is spaced apart from and provided between left and right side portions 624, 625 of the frame, which are also connected to the upper and lower portions 622, 623. The unitary orthogonal portion 626 may advantageously reduce the assembly time and cost by eliminating fasteners that interconnect the various portions, as well as the time required to assembly the surface mount 602.

Figure 73:
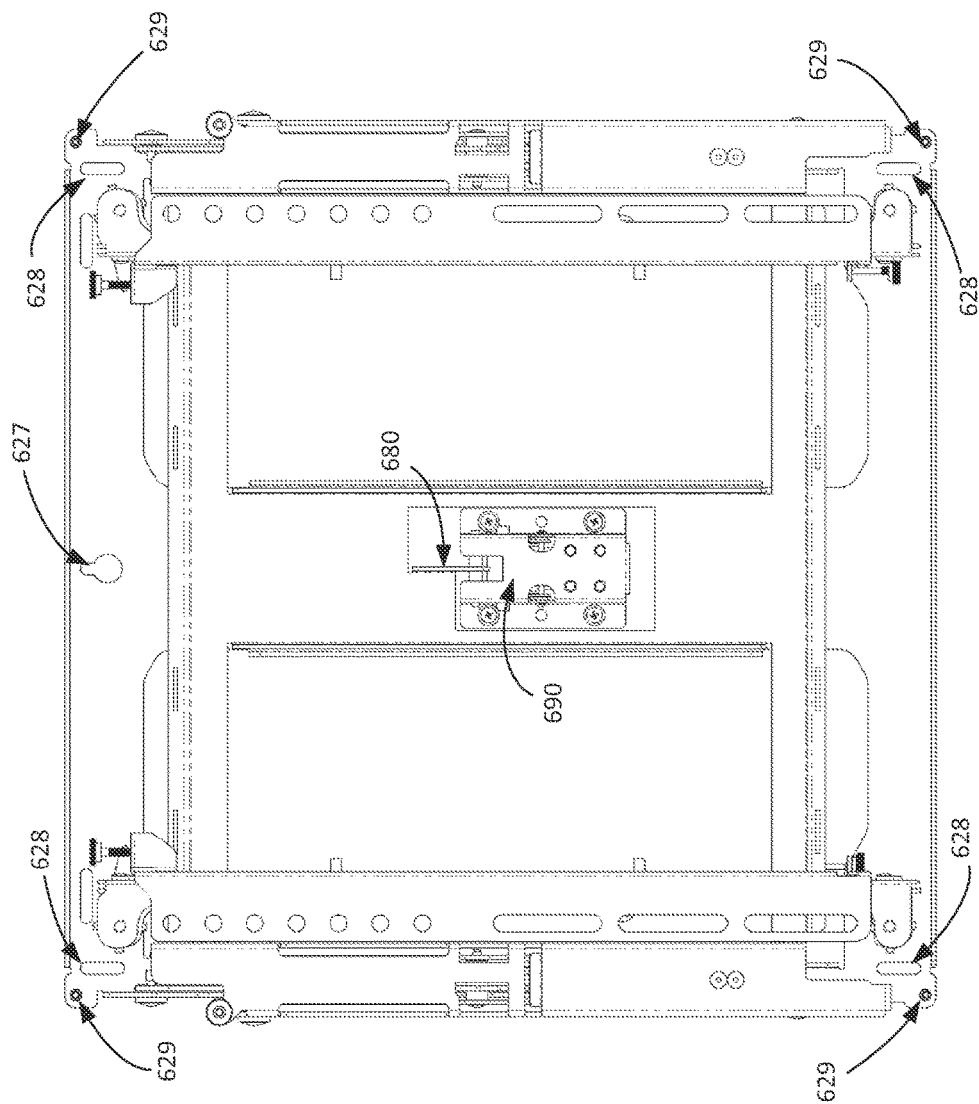
FIG. 73 is a front view of the mounting system of FIG. 69, shown in the collapsed position.
Figure 77:
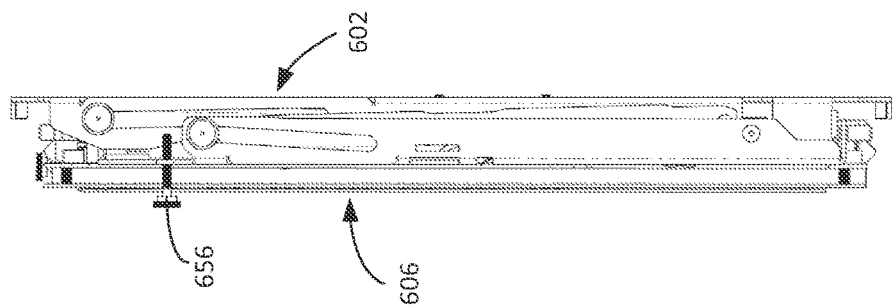
FIG. 77 is another side view of the mounting system of FIG. 69, shown in the collapsed position.
Figure 76:
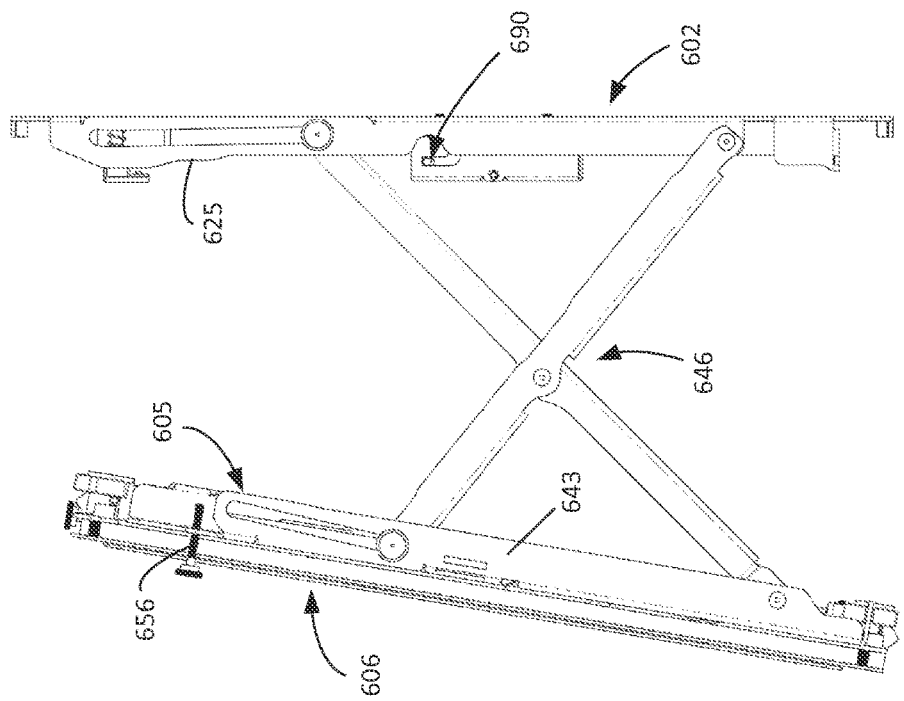
FIG. 76 is a side view of the mounting system of FIG. 69, shown in the extended position.

As shown in FIG. 73, the surface mount 602 may also include a keyhole slot 627 that is configured to make installation of the system easier. The keyhole slot 627 may be configured having a first portion (e.g., lower portion) having a first diameter and a second portion (e.g., upper portion) that extends upwardly from the first portion. The second portion includes a slot with a curved end portion having a second diameter that is less than the first diameter. According to the example shown, the keyhole slot 627 is provided in the upper portion 622 of the frame of the surface mount 602 at a central lateral location above the orthogonal portion 626. By providing the keyhole slot 627 centrally (e.g., in a lateral direction), the surface mount 602 may be supported by a single fastener (e.g., a screw) that is configured to engage the keyhole slot 627 during installation, such as mounting the surface mount 602 to a surface (e.g., wall), and the surface mount 602 may maintain a proper alignment (e.g., with the orthogonal portion aligned vertically) to ease installation.

Also shown in FIG. 73, the surface mount 602 includes slots 628 configured to allow mounting of a strut (e.g., gas strut, uni-strut, etc.) to the mounting system 601, such as to provide for easier movement of the support mount 605 relative to the surface mount 602. For example, a vertically elongated slot 628 may be provided proximate to any one of or combination of corners of the surface mount 602 (e.g., where each upper portion and side portion meet and where each lower portion and side portion meet). Each slot 628 is configured to facilitate coupling a strut, which may be additionally coupled to another element of the system 601 (e.g., the support mount 605, an adjustment assembly 604, etc.). Thus, the system 601 may include one or more struts to make moving the support mount 605 easier.

The surface mount 602 includes one or more holes (e.g., openings, apertures, etc.) that are configured to facilitate attaching the surface mount 602 to another object, such as a wall or fixture. Also shown in FIG. 73, the surface mount 602 includes a pin stud 629 provided in each corner that is configured to receive a fastener. By being located in a corner, each pin stud 629 is more accessible by an installer, such as when a spacer is utilized to fix the position of the surface mount 602. According to an exemplary embodiment, PEM® fasteners (which are a registered trademark of Penn Engineering) are used with reusable spacers to position surface mounts 602 of multiple mounting systems 601 relative to each other.

Figure 69:
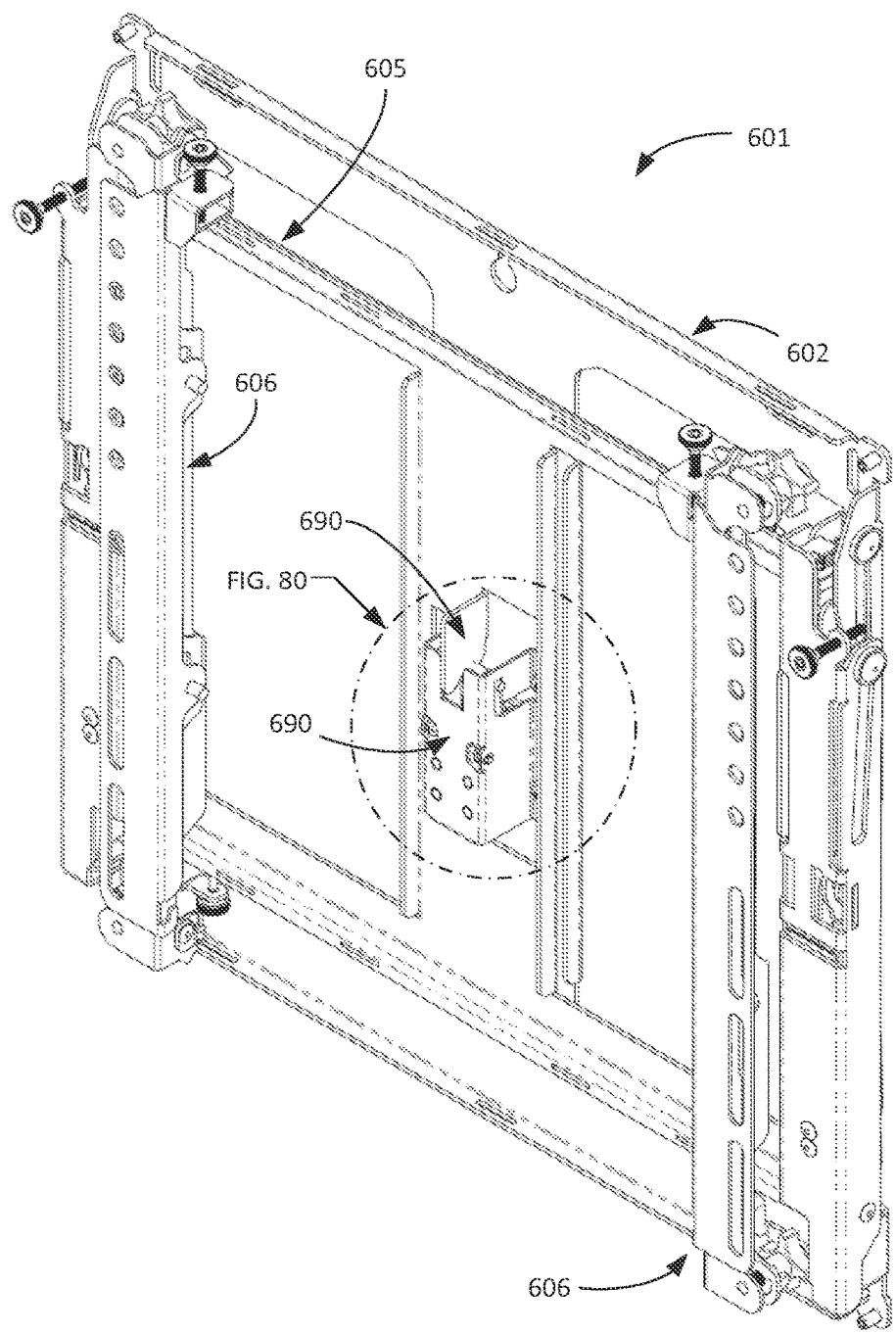
FIG. 69 is perspective view of another exemplary embodiment of a mounting system, shown in a collapsed position.
Figure 70:
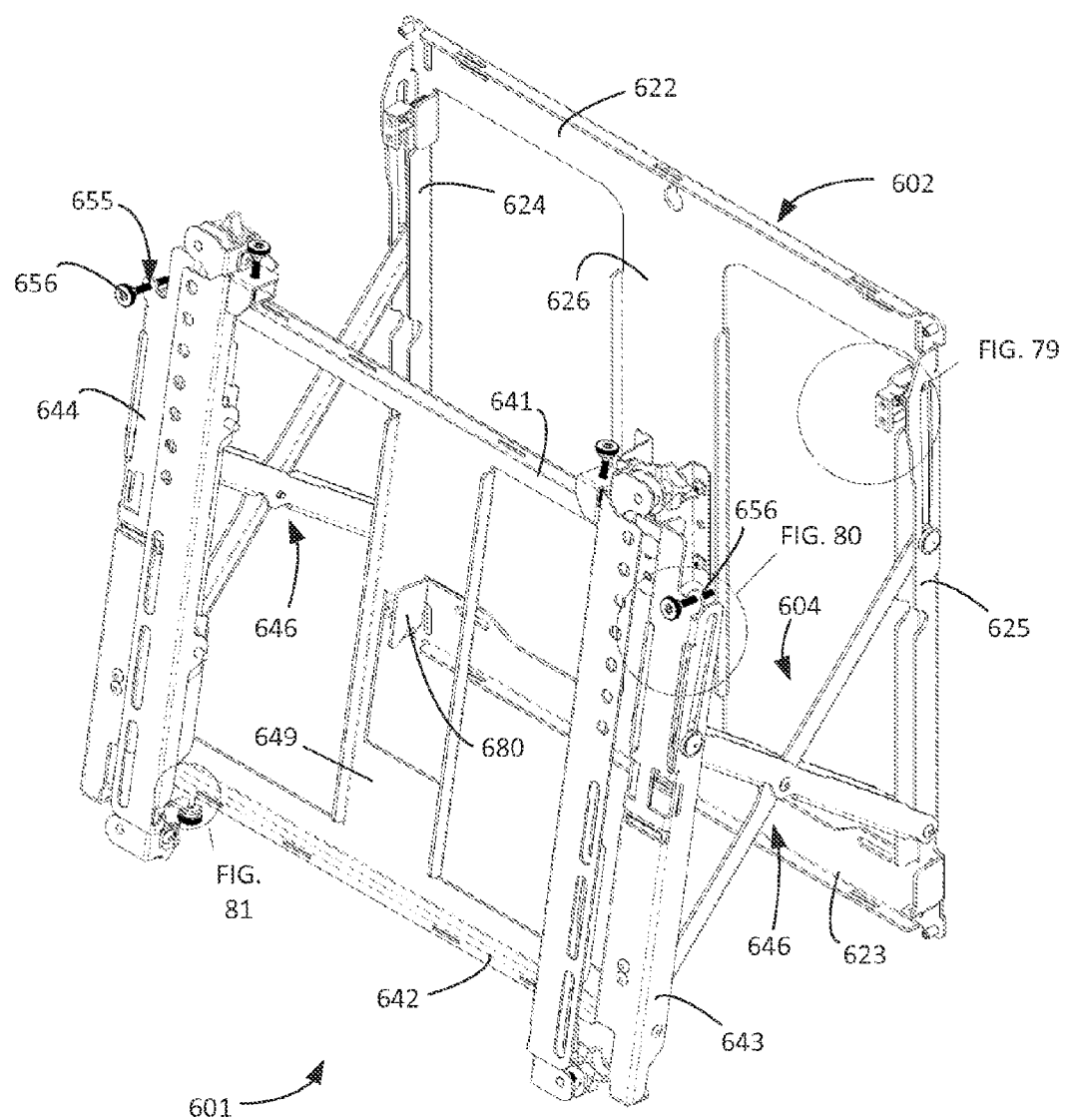
FIG. 70 is another perspective view of the mounting system of FIG. 69, shown in an extended position.
Figure 79:
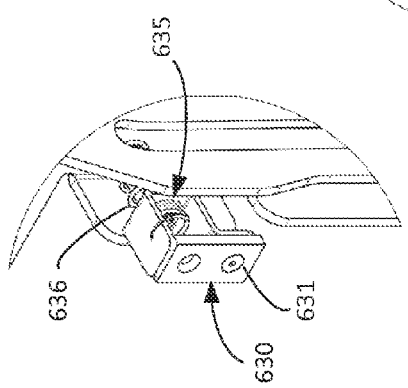
FIG. 79 is a detail view of a portion of the mounting system of FIG. 69, taken from FIG. 70.

As shown best in FIGS. 70 and 79, the mounting system 601 includes a magnetic element 630 coupled to the surface mount 602 proximate each upper, outer corner of the frame. As shown, a first magnetic element 630 is coupled to the right side portion 625 near where the right side portion meets the upper portion 622, and a second magnetic element 630 is coupled to the left side portion 624 near where the left side portion meets the upper portion 622. Each magnetic element 630 includes a contact surface 631 that is configured to contact a mating surface of the support mount 605, such as when the system is in a collapsed position (FIG. 69), to help keep the support mount 605 and the surface mount 602 coupled together. Each magnet imparts a magnetic force on the portion of the support mount 605 having the mating contact surface, which includes a ferromagnetic material (e.g., iron, nickel, cobalt, etc.). When the mating surfaces come into close proximity the magnetic forces act to couple and keep coupled the mounts 602, 605. It is noted that each magnet may be coupled to the support mount 605 and the configured to engage a mating surface of the surface mount 602. Each magnetic element 630 may be disposed on an end of a spring loaded mechanism 635 that is allows the magnetic element 630 to move relative to the mounts 602, 605. For example, the magnetic element 630 may be allowed to move in a generally fore and aft direction (e.g., away from and toward the mounts). This movement allows for the magnetic element 630 to sit flush on the mating contact surface despite tolerances that might otherwise create a gap or interference fit between them. The mechanism 635 may include a biasing member 636 (e.g., spring) that is configured to bias the magnetic element 630 in a direction, such as outwardly away from the surface mount 602 and toward the support mount 605. The magnetic elements 630 may advantageously greatly reduce or eliminate any wobble between the surface mount 602 and the support mount 650 when connected together (e.g., in the collapsed position) due to locating the latch and catch centrally.

The support mount 605 may be adjustably coupled to the surface mount 602, such as through an adjustment assembly 604. The support mount 605 may be configured the same as, similar to, or different than the other surface mounts (e.g., the support mount 105, 305, 405, 505) described in this application. According to an exemplary embodiment, the support mount 605 is configured having a similar geometry (e.g., overall basic shape and features) as the support mount 505, except the support mount 605 is a unitary structure (i.e., formed of a single integrally formed element/member), rather than a plurality of separately formed elements that are coupled together, and where otherwise noted. As shown in FIG. 70, the unitary support mount 605 includes a generally rectangular frame having an orthogonal (e.g., a vertical) portion 649 that extends between a bottom of an upper portion 641 and a top of a lower portion 642 of the frame. The orthogonal portion 649 is spaced apart from and provided between left and right side portions 644, 643 of the frame, which are also connected to the upper and lower portions 641, 642. The unitary orthogonal portion 649 may advantageously reduce the assembly time and cost by eliminating fasteners that interconnect the various portions, as well as the time required to assembly the support mount 605.

Figure 80:
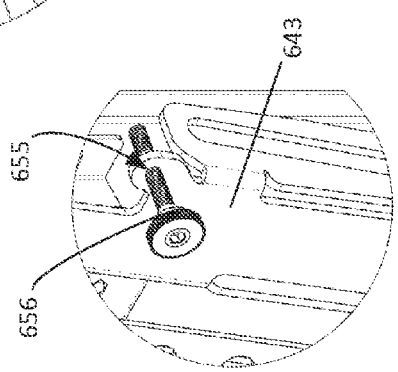
FIG. 80 is a detail view of another portion of the mounting system of FIG. 69, taken from FIG. 70.

As shown best in FIGS. 70 and 80, each side portion 643, 644 of the support mount 605 includes an internally threaded opening 655 that is configured to receive a threaded stud 656. Each threaded opening 655 may be provided in an ear of the side portion, such that each stud 656 is located outwardly in a side to side manner. Each stud 656 includes an externally threaded shaft that threads with the threads of the opening 655 to allow the shaft to thread to the opening upon relative rotation. Each stud 656 also includes a head that is disposed on an end of the shaft and is configured to support a display device attached to the mounting system 601. For example, each stud 656 is configured to be moved into a position where the head of the stud 656 supports the display device (e.g., a backside of the display device) by rotating the stud 656 in a first direction (e.g., counterclockwise). The stud 656 can be rotated in a second opposing direction (e.g., clockwise) such as to move into a non-supporting position, such as during installation or removal of the display device from the mounting system 601. As shown in FIG. 70, two studs 656 are provided on respective outboard left and right sides of the system. By positioning the studs 656 outboard, the studs 656 may advantageously help reduce or eliminate flexure of the display device (e.g., screen flex), which may potentially damage the display device.

The adjustment assembly 604 may be configured similar to, the same as, or different than any other adjustment assembly (e.g., extension assembly, arm assembly, etc.) disclosed in this application. For example, the adjustment assembly 604 may include a pair of spaced apart arm assemblies 646, which may be configured substantially the same as each arm assembly 146 described above, except where noted otherwise.

The mounting system 601 may include two device mounts 606 as shown in FIG. 69 (or may include any number of device mounts). Each device mount 606 may be configured similar to, the same as, or different than any other device mount disclosed in this application. For example, each device mount 606 may be configured substantially the same as the device mount 106 described above, except where otherwise noted. As shown best in FIGS. 70 and 81, each device mount 606 includes a flange 661 that extends from a bracket 660 of the device mount 606 and is configured to support a fastener 670. The flange 661 includes a threaded opening 662 that receives a threaded portion of the fastener 670, to allow quick adjustment of the fastener 670 relative to the flange 661. The fastener 670 may include a shaft having at least a portion threaded and a head disposed at a first end of the shaft. A second end of the shaft of the fastener 670 may be used to secure the device mount 606 to another element of the system 601, such as, for example, the lower portion 642 of the support mount 605. As shown, the flange 661 is provided near a bottom end of the device mount 606, which advantageously provides an installer better access to the fastener 670 to secure the device mount 606 in place. The location allows the device mount 606 to be secured in place even when a display device is attached to the device mount 606. This arrangement also advantageously allows for adjustment of the fastener 670 with a fewer number of turns (e.g., rotations) of the fastener 670.

The mounting system 601 may include a locking device that is configured to selectively secure the system in a position, such as a collapsed (e.g., retracted) position. For example, the locking device of the mounting system 601 includes a latch 680 and a catch 690, which are configured to be detachably coupled together to secure the system in the desired position. One of the latch 680 and the catch 690 may be associated with (e.g., coupled to, integrally formed with, etc.) the surface mount 602 and the other of the latch and the catch may be associated with the support mount 605 to secure the mounts in a collapsed position. Thus, when the mounting system 601 is moved from a retracted (e.g., collapsed) position to an extended (e.g., expanded) position, the latch 680 disengages the catch 690, and when the mounting system 601 is moved from the extended position to the retracted position the latch 680 engages the catch 690 to secure the mounting system 601 in the retracted position.

Figure 82:
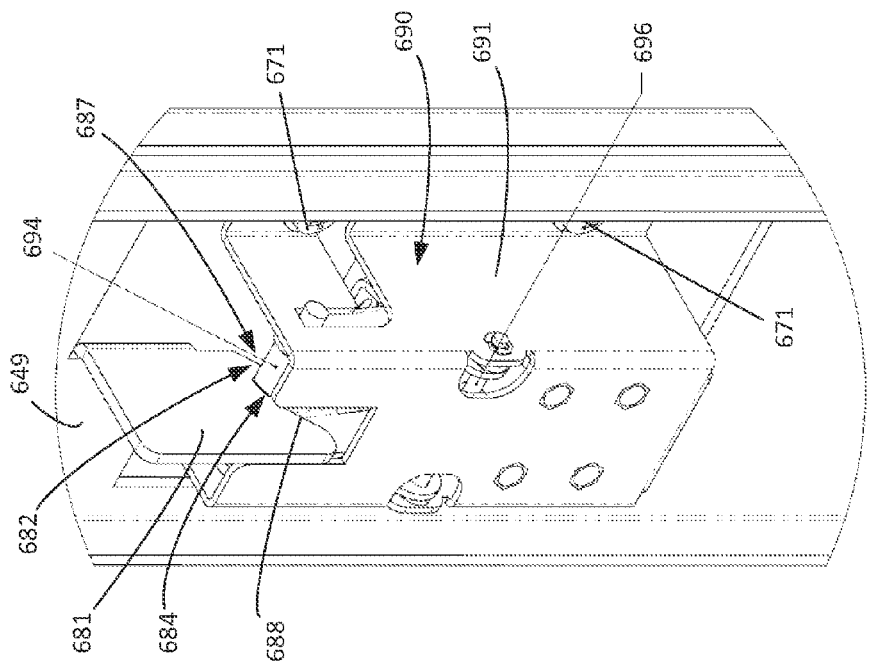
FIG. 82 is a detail view of another portion of the mounting system of FIG. 69, taken from FIG. 69.
Figure 81:
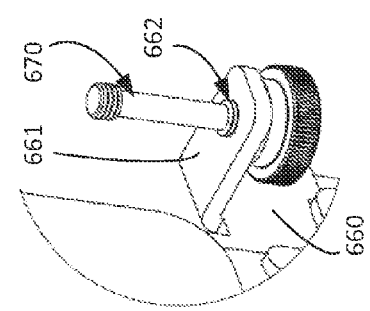
FIG. 81 is a detail view of another portion of the mounting system of FIG. 69, taken from FIG. 70.

As shown best in FIGS. 70 and 82, the latch 680 is integrally formed with the orthogonal portion 649 of the support mount 605. According to an exemplary embodiment, the latch 680 is configured substantially the same as the latch 180, except the latch 680 is integrally formed with the support mount 605, such that they form one unitary element/member, and where otherwise noted. The latch 680 includes a body 681 and an engaging member 682 that extends from the body 681 and is configured to engage a portion of the catch 690. The engaging member 682 includes a leading surface that is configured at an angle (e.g., oblique angle) relative to a direction of engagement and is configured to be brought into contact with a portion of the catch 690, such as a latching element in the form of a roller. Further relative movement between the latch 680 and the catch 690 moves the latching element to a non-locking position. Also shown in FIG. 82, the latch 680 also includes a recess 684 (e.g., notch) that is defined by a trailing surface of the engaging member 682 and a leading surface 688 of the body 681. The portion of the engaging member 682 defining the recess 684 may be configured as a detent 687 (e.g., a projection that extends between the leading surface of the engaging member 682 and the trailing surface of the engaging member. The detent of the engaging member 682 is configured to secure the connection between the latch 680 and the catch 690, until released.

As shown, the catch 690 is coupled to the orthogonal portion 626 of the surface mount 602 using fasteners 671 (e.g., screws, bolts, etc.). According to other examples, the catch 690 or portions thereof may be integrally formed with the surface mount 602, may be coupled to the support mount 605, such as when the latch is associated with the surface mount 602, or to another element of the system 601. According to an exemplary embodiment, the latch 680 is configured substantially the same as the latch 180, except where otherwise noted.

As shown in FIG. 82, the latch 680 is configured to engage the roller 694 of the catch 690, rather than a locking plate. The use of a roller 694 may advantageously provide for easier latching and unlatching. As shown, the roller 694 is configured as a cylindrical shaped pin that extends between slots in two opposing side walls of a frame of the catch 690 to allow the roller 694 to be able to move in the slots between a locking position and a non-locking position. For example, when the surface and supports mounts 602, 605 are brought toward the collapsed position, the leading edge of the engaging member 682 of the latch 680 makes first contact with the roller 694, which is in the locking position. Further movement into the collapsed position causes the leading edge of the engaging member 682 to drive the roller 694 (e.g., downward) into the non-locking position, since the slots that the roller 694 moves in are aligned generally transverse to the direction that the latch moves relative to the catch when expanding/collapsing the system. Once the detent 687 passes the roller 694, the roller 694 moves (e.g., upward) into the locking position from the non-locking position to rest in the recess 684 of the latch 680. The latch 680 and catch 690 remain engaged until release, which may be actuated by a release, a movement of the system (e.g., the support mount in an expanding direction), or another suitable way.

Also shown in FIG. 82, the catch 690 includes a pair of spaced apart walls 691 configured to pivotally support a pin 696 (e.g., a pivot pin). Each wall 691 includes an opening (e.g., hole, aperture, etc.) that pivotally supports one end of the pin 696. The pin 696 acts as a pivot for at least a portion of the locking device. For example, the pin 696 may act as a pivot for the roller 694, such as to facilitate movement of the roller 694 between the non-locking and locking positions. The pin 696 may advantageously reduce the friction (e.g., coefficient of friction) produced by relative movement between the pin 696 and other elements (e.g., the side walls 691), such as compared to rivets or other types of pivots that induce additional friction by compression (e.g., squeezing) forces induced at assembly. The higher the force from friction, the higher the force to move the latch and/or a latching element to secure and/or release the locking device. Therefore, a reduction in friction results in a reduction in the force to latch and unlatch the locking device.

The catch 690 may optionally include a biasing member, such as a spring, that is configured to impart a force that biases the roller 694 in a direction. For example, the biasing member of the catch 690 may be disposed in a cavity between the two side walls of the catch and may be configured to bias the roller 694 in a locking (e.g., upward) direction to try to move the roller 694 into and retain the roller 694 in the locking position. The locking device may optionally include a release element (e.g., lever, handle, strap, pull strap, etc.) that is configured to move the roller 694 from the locking position to the non-locking position, such as to allow the support mount 605 to be moved relative to the surface mount 602 to an extended position. For example, the release element may be configured to move the roller 694 in a downward direction to allow the latch 680 to disengage from the roller 694 to allow mounting system 601 to be moved to the extended position.

By coupling the latch 680 and catch 690 to the opposing orthogonal portions of the support and surface mounts, the mounting system 601 may advantageously provide for easier engagement and disengagement of the latch 680 and catch 690, since the latch and catch may flex less than if cantilevered from a cross member. Flexing of the catch 690 and/or latch 680 during engagement may drive up the engagement/release efforts, since the flexing may create a binding effect, such as from a biasing force generated by the flexing of the element(s).

The mounting systems 101, 201, 301, 401, 501, 601 disclosed herein may provide additional advantages over the advantages discussed above. For example, the mounting systems may advantageously allow the system (e.g., the movable member, device mounts) to move substantially in the horizontal direction when initially travelling (e.g., for the first several inches of travel) from the support wall, such as from the retracted position toward the extended position, while as the system moves farther from the wall, the system may move downwardly, as well as horizontally, and tilt out. This kinematic motion of the system may make it easier to service the system and/or a display device coupled to the system.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the mounting systems as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., surface mount, extension assembly, device mount, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A mounting system for supporting a display device, comprising:
    a surface mount configured to operatively couple to an attachment surface;
    a movable mount;
    at least one arm assembly including at least one arm having a first end operatively coupled to the surface mount and a second end operatively coupled to the movable mount, wherein each arm assembly is adjustable, such that the second end is movable relative to the first end to move the movable mount relative to the surface mount in a first direction;
    at least one device mount configured to support the display device and operatively coupled to the movable mount, such that each device mount is movable in a second direction that is different than the first direction;
    a latch coupled to one of the surface mount and the movable mount; and
    a catch coupled to the other of the surface mount and the movable mount, wherein the latch detachably engages the catch to secure the relative position between the movable mount and the surface mount;
    wherein each device mount includes a device mounting bracket that is configured to support the display device, a mount engagement bracket including a portion that is configured to detachably engage a first member of the movable mount to secure the portion to the first member, and a latching bracket that is movably coupled to the mount engagement bracket, wherein the latching bracket includes a latching bracket latch that is configured to detachably engage a second member of the movable mount to secure the latching bracket to the second member.

2. The mounting system of claim 1, wherein each device mount further includes an intermediate bracket operatively coupled to the mount engagement bracket, such that the intermediate bracket is movable in the first direction relative to the mount engagement bracket, wherein the intermediate bracket is also operatively coupled to the device mounting bracket, such that the device mounting bracket is movable relative to the intermediate bracket in a third direction that is different that the first and second directions.

3. The mounting system of claim 2, wherein each device mount further includes:
    a first adjusting member that controls movement between a first end of the intermediate bracket and a first end of the mount engagement bracket, and
    a second adjusting member that controls movement between a second end of the intermediate bracket and a second end of the mount engagement bracket,
    wherein each first adjusting member and each second adjusting member includes a threaded portion that threads to a portion of the respective end of the mount engagement bracket, and wherein each adjusting member includes an end that contacts a surface of the respective end of the intermediate bracket to move the intermediate bracket relative to the mount engagement bracket upon rotation in a first rotational direction of the adjusting member.

4. A mounting system for supporting a display device, comprising:
    a surface mount configured to operatively couple to an attachment surface;
    a movable mount;
    at least one arm assembly including at least one arm having a first end operatively coupled to the surface mount and a second end operatively coupled to the movable mount, wherein each arm assembly is adjustable, such that the second end is movable relative to the first end to move the movable mount relative to the surface mount in a first direction;

at least one device mount configured to support the display device and operatively coupled to the movable mount, such that each device mount is movable in a second direction that is different than the first direction;

a latch coupled to one of the surface mount and the movable mount; and a catch coupled to the other of the surface mount and the movable mount, wherein the latch detachably engages the catch to secure the relative position between the movable mount and the surface mount;

wherein the catch includes a frame and a locking plate, wherein the frame is fixedly coupled to the one of the movable mount and the surface mount and the locking plate is movably coupled to the frame, wherein the latch includes a body, an engaging member extending away from the body, and a recess provided between the body and the engaging member defining a detent member of the engaging member, and wherein a leading surface of the engaging member is configured to move the locking plate to allow the locking plate to engage the recess to detachably secure the latch to the catch with the locking plate in the recess between the body and the detent member.

5. The mounting system of claim 4, wherein the latch is coupled to an upper cross member of the movable mount and the catch is coupled to an upper cross member of the surface mount, and wherein movement of the movable mount to a retracted position engages the latch to the catch to retain the movable mount in the retracted position relative to the surface mount.

6. The mounting system of claim 4, wherein the latch is coupled to a movable mount orthogonal member, the movable mount orthogonal member extending between upper and lower cross members of the movable mount and disposed between two spaced apart side members of the movable mount, and wherein the catch is coupled to a surface mount orthogonal member, the surface mount orthogonal member extending between upper and lower cross members of the surface mount and disposed between two spaced apart side members of the surface mount.

* * * * *

UNITED STATES PATENT AND TRADEMARK OFFICE
CERTIFICATE OF CORRECTION

PATENT NO. : 10,024,490 B2
APPLICATION NO. : 15/307297
DATED : July 17, 2018
INVENTOR(S) : Derrik Lam et al.

It is certified that error appears in the above-identified patent and that said Letters Patent is hereby corrected as shown below:

In the Claims

Claim 2, Column 28, Line 42, "that" should be --than--.

Signed and Sealed this
Eighteenth Day of September, 2018

Andrei Iancu
*Director of the United States Patent and Trademark Office*